US011325029B2

(12) United States Patent
Nakamura

(10) Patent No.: US 11,325,029 B2
(45) Date of Patent: May 10, 2022

(54) VIRTUAL REALITY ENVIRONMENT GENERATING APPARATUS AND CONTROLLER APPARATUS

(75) Inventor: Norio Nakamura, Ibaraki (JP)

(73) Assignees: NATIONAL INSTITUTE OF ADVANCED INDUSTRIAL SCIENCE AND TECHNOLOGY, Tokyo (JP); MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 12/678,134

(22) PCT Filed: Sep. 12, 2008

(86) PCT No.: PCT/JP2008/066583
§ 371 (c)(1),
(2), (4) Date: Mar. 12, 2010

(87) PCT Pub. No.: WO2009/035100
PCT Pub. Date: Mar. 19, 2009

(65) Prior Publication Data
US 2010/0245237 A1    Sep. 30, 2010

(30) Foreign Application Priority Data

Sep. 14, 2007   (JP) ................................ 2007-240111

(51) Int. Cl.
*G08B 6/00* (2006.01)
*G09G 5/00* (2006.01)
(Continued)

(52) U.S. Cl.
CPC .......... *A63F 13/285* (2014.09); *A63F 13/211* (2014.09); *A63F 13/218* (2014.09);
(Continued)

(58) Field of Classification Search
CPC .......... G06F 3/011; G06F 3/016; A63F 13/02; A63F 13/06; A63F 13/10;
(Continued)

(56) References Cited

U.S. PATENT DOCUMENTS 5,555,894 A * 9/1996 Doyama ................ G05G 9/047
600/595
2007/0091063 A1* 4/2007 Nakamura ............... H04B 3/36
345/156

(Continued)

FOREIGN PATENT DOCUMENTS

JP         02-218060        8/1990
JP       H 07-146751 A      6/1995
(Continued)

OTHER PUBLICATIONS

Office Action dated Aug. 20, 2020 in corresponding Japanese Patent Application No. 2019-238751, 5 pages.*

(Continued)

*Primary Examiner* — Amare Mengistu
*Assistant Examiner* — Jennifer L Zubajlo
(74) *Attorney, Agent, or Firm* — Oblon, McClelland, Maier & Neustadt, L.L.P.

(57) ABSTRACT

The present invention provides a virtual reality environment generating apparatus including a non-base type interface configured to allow a user to haptically touch virtual objects and game characters. The virtual reality environment generating apparatus includes a content creating device 102 configured to create a content based on information from various sensors 108 to 111 and content data, an illusionary tactile force sense evoking device 103 configured to use illusionary tactile force sense data to generate an illusionary tactile force sense evoking function 1713 adapted for the content, an illusionary tactile force sense interface device (Continued)

101 including a illusionary tactile force sense device 107, and an illusionary tactile force sense device driving control device 112 configured to drivingly control the illusionary tactile force sense device. The virtual reality environment generating apparatus utilizes an illusionary tactile force sense to control reaction based on the illusionary tactile force sense, in accordance with motion of the user's finger and body. The virtual reality environment generating apparatus thus expresses not only three-dimensional videos and sound images but also senses of friction and roughness corresponding to the presence, shape, and texture of a virtual object.

52 Claims, 46 Drawing Sheets

(51) Int. Cl.
*A63F 13/285* (2014.01)
*A63F 13/211* (2014.01)
*A63F 13/218* (2014.01)
*G06F 3/01* (2006.01)

(52) U.S. Cl.
CPC .............. *G06F 3/011* (2013.01); *G06F 3/016* (2013.01); *A63F 2300/1037* (2013.01); *A63F 2300/1043* (2013.01); *A63F 2300/8082* (2013.01)

(58) Field of Classification Search
CPC ...... A63F 2300/1037; A63F 2300/1043; A63F 2300/8082; A63F 13/211; A63F 13/218; A63F 13/285
USPC ........................................................ 345/156
See application file for complete search history.

(56) References Cited

U.S. PATENT DOCUMENTS

| | | | |
|---|---|---|---|
| 2008/0094417 A1* | 4/2008 | Cohen | A63F 13/52 345/632 |
| 2010/0033030 A1* | 2/2010 | Amemiya | H02K 33/00 310/12.16 |

FOREIGN PATENT DOCUMENTS

| | | | |
|---|---|---|---|
| JP | 8-254472 A | * | 10/1996 |
| JP | H09-155785 A | | 6/1997 |
| JP | 2000089895 | | 3/2000 |
| JP | 2001-22267 A | | 1/2001 |
| JP | 2001-025510 | | 1/2001 |
| JP | 2001-51726 A | | 2/2001 |
| JP | 2001-282539 | | 10/2001 |
| JP | 2002-182817 A | * | 6/2002 |
| JP | 2005-70843 A | | 3/2005 |
| JP | 2005-190465 | | 7/2005 |
| JP | 2005190465 A | * | 7/2005 |
| JP | 2006-115066 A | | 4/2006 |
| JP | 2006-312207 A | | 11/2006 |
| KR | 101009946 | | 1/2011 |
| KR | 20100068770 | | 5/2012 |
| WO | WO 2007/086426 A1 | * | 8/2007 |
| WO | WO 2009/035100 A1 | * | 3/2009 |

OTHER PUBLICATIONS

Office Action dated Sep. 4, 2020 in corresponding Japanese Patent Application No. 2019-238752, 3 pages.*
International Search Report dated Oct. 21, 2008 for PCT/JP2008/066583, 6 pages.
Nakamura, N. and Y. Fukui, "An Innovative Non-grounding Haptic Interface 'GyroCubeSensuous' displaying illusion Sensation of Push, Pull, and Lift," Proceedings of ACM Siggraph 2005, 1 page.
Nakamura, N., "Non-grounding force sense presenting interface giving illusionary senses of push, pull, and lift," Inspection Engineering, Japan Industrial Publishing Co., Ltd, vol. 11, No. 2, pp. 6-11 (Feb. 2006).
Tanaka, Y. et al., "Mobile Torque Display and Haptic Characteristics of Human Palm," International Conference on Artificial Reality and Telexistence, pp. 115-120 (Dec. 2001).
Notice of Allowance from related Korean Application No. KR 10-2010-7007941, dated May 18, 2012, 2 pages.
Masashi Konyo, et al., "Reflective Grasp Force Control of Humans Induced by Distributed Vibration Stimuli on Finger Skin with ICPF Actuators" The Virtual Reality Society of Japan, vol. 11, No. 1, Mar. 31, 2006, pp. 3-10 (with Cover Page and English Abstract).
Written Opposition issued Apr. 1, 2016 in Japanese Application No. 2016-700054.
Written Opposition issued Apr. 1, 2016 in Japanese Patent No. 5750717.
"Stretch Reflex", Encyclopadia Britannica 3, 1993 (Japanese edition), along with a partial English translation.
Takashi, Maeno, "Learn from Tactile Sensation System", 2006 Journal of the Japan Society of Mechanical Engineers, along with a partial English translation.
Mori, et al., "Method for Displaying Partial Slip Used for Virtual Grasp", 2004 JSME Conference on Robotics and Mechatronics, along with a partial English translation.
Konyo, et al., "Reflective Grasp Force Control of Humans Induced by Distributed Vibration Stimuli on Finger Skin with ICPF Actuators", 2006 Transactions of the Virtual Reality Society of Japan, along with a partial English translation.
Modeling of Tactile Sense and Finite Element Analysis:, 2004 Journal of the Virtual Reality Society of Japan, along with a partial English translation.
Takashi, Maeno, "Tactile Sensors and Displays for Non-conscious Tactile Sensation", Mechanical Engineering Congress, 2004 Japan, along with a partial English translation.
Office Action dated Jan. 22, 2013, in Japanese Patent Application No. 2009-532251 w/English Machine Translation.
Office Action dated Jul. 5, 2016, in Japanese Patent Application No. 2015-088432 w/English Machine Translation.
Japanese Office Action dated Jun. 29, 2021 in Japanese Patent Application No. 2018-109086, 4 pages.
Japanese Office Action dated Jul. 6, 2021 in Japanese Patent Application No. 2018-109086, 1 page.

* cited by examiner (a)

(b)

(a) Content creating device (b)

(c)

(b)

(a)

FIG. 8-2
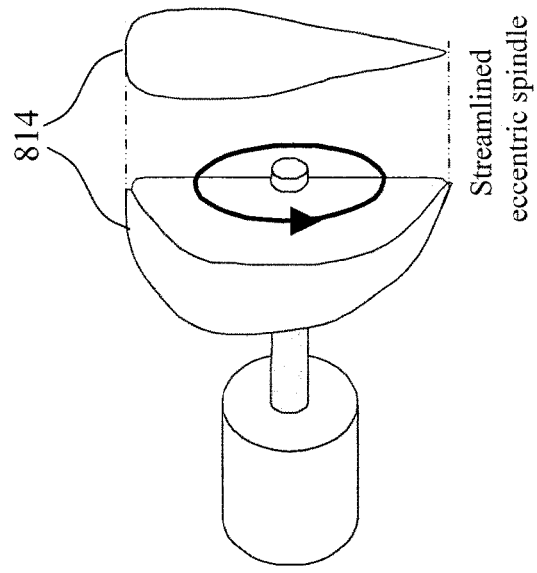
(a)
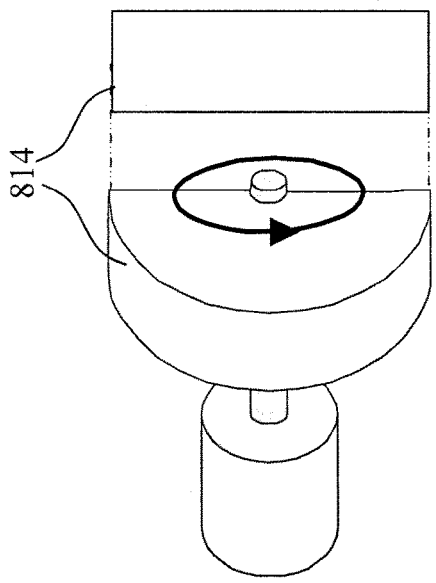
(b) Streamlined eccentric spindle
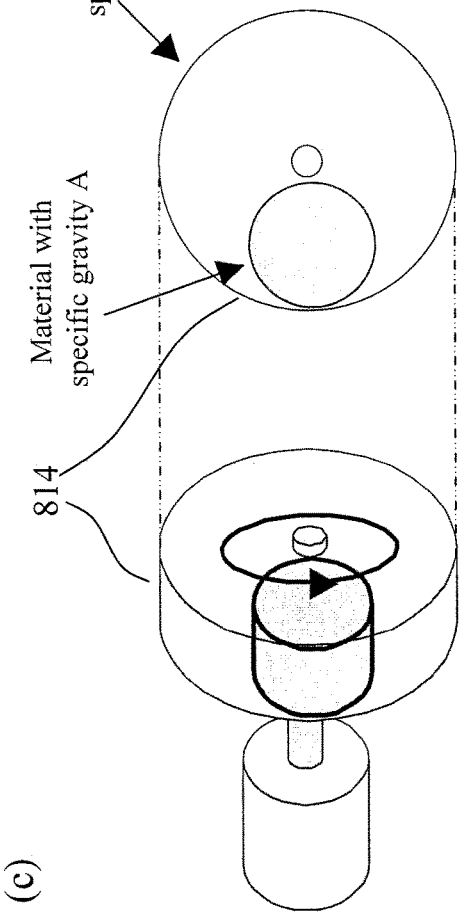
(c) Disk-like eccentric weight formed of materials with different specific gravities
Material with specific gravity B
Material with specific gravity A (a)

(b)

(c)

(d)

(e)

(f)

(a)

(b)

(a)

(c)

(b)

(d)

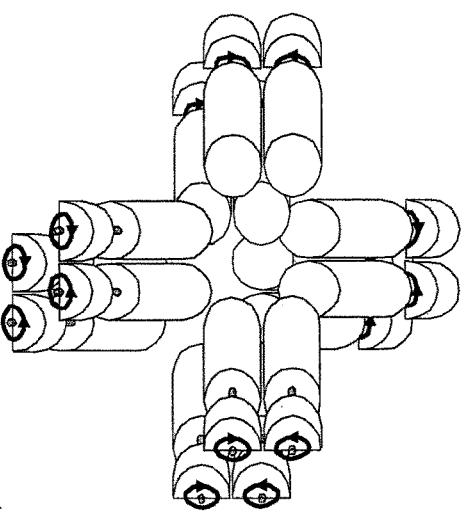
(c)
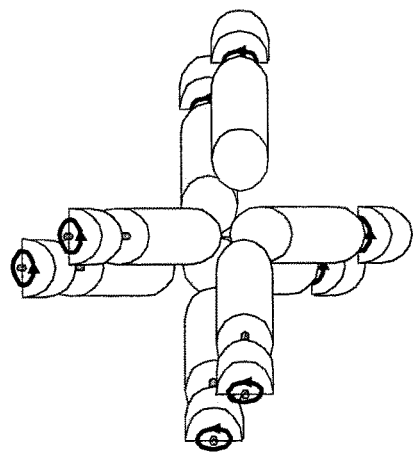
(b)
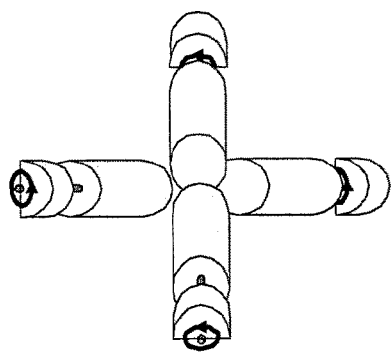
FIG. 29-2
(a)
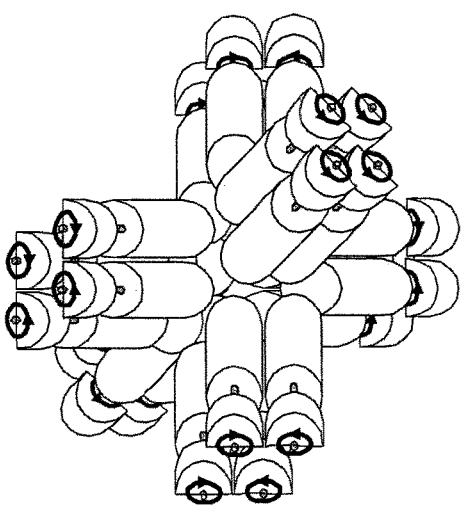
(f)
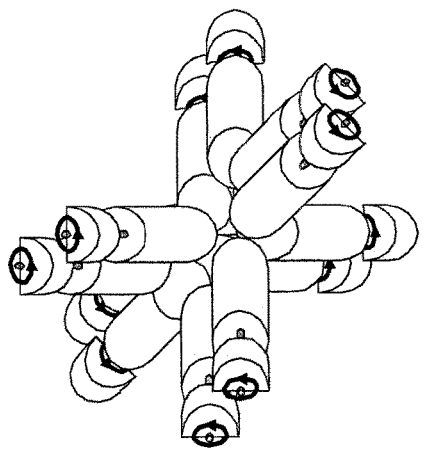
(e)
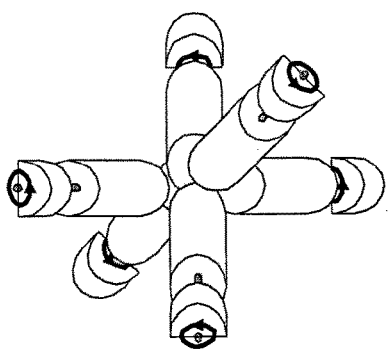
(d)

$$Dsp = \sin(\omega t + \pi) + \frac{1}{4} \times \sin(2\omega t + 3\pi/2)$$
$$d^2(Dsp)/dt^2 = -\omega^2 \times \sin(\omega t + \pi) - \omega^2 \times \sin(2\omega t + 3\pi/2)$$

3400

VIRTUAL REALITY ENVIRONMENT GENERATING APPARATUS AND CONTROLLER APPARATUS

CROSS-REFERENCE TO RELATED APPLICATIONS

This application is a national stage application of and claims the benefit of PCT Application No. PCT/JP2008/066583 filed on Sep. 12, 2008. PCT Application No. PCT/JP2008/066583 filed on Sep. 12, 2008 claims the benefit of Japanese Patent Application No. 2007-240111 filed on Sep. 14, 2007. The disclosures of the above referenced applications are considered part of (and are incorporated by reference in) the disclosure of this application.

TECHNICAL FIELD

The present invention generally relates to a virtual reality environment generating apparatus and a controller apparatus which utilize illusionary and sensory characteristics.

More specifically, the present invention relates to illusionary tactile force sense interface devices, illusionary tactile force sense information presenting methods, and a virtual reality environment generating apparatus which are configured to provide a man machine interface mounted in instruments used in the fields of VR (Virtual Reality) and games, cellular phones, PDAs (Portable Data Terminals), and the like.

BACKGROUND ART

As an example of a conventional tactile force sense interface for VR, a tactile force sense device that is in contact with a human sensory organ and a tactile force sense interface device main body are connected together via a wire or an arm in order to present a force sense of tension or reaction force (Non-Patent Document 1). Furthermore, as a non-grounding, non-base type force interface device which requires no base on a user's body, a non-base type tactile force sense interface device has been proposed which can present a torque in arbitrary direction or with arbitrary magnitude by independently controlling rotations of three flywheels arranged on a three-axis orthogonal coordinate system (Non-Patent Document 2). Furthermore, for a non-base type human machine interface configured to present a user with the presence of a virtual object or a reaction force, for example, a device and a method have been proposed which allow the user to continuously perceive tactile force senses of torque, force, and the like in the same direction, which cannot be presented only by the physical properties of a tactile force sense interface device, for example, tactile force senses of torque, force, and the like (Patent Document 1). This tactile force sense interface device utilizes the user's sensory characteristics to appropriately control a physical quantity to allow the user to feel a force that cannot exist physically.

Furthermore, a three-degree-of-freedom hybrid force sense interface device has been developed which can simultaneously present not only a sense of rotational force but also a sense of translational force by using a "twin eccentric rotor scheme" comprising two eccentric rotors instead of torque generating flywheels (Non-Patent Document 3). This force sense interface device provides the hybrid function of using one interface to enable continuous presentation of both the senses of translational and rotational forces in arbitrary direction in a plane. The force sense interface device skillfully utilizes the user's nonlinear sensor characteristics to exert an illusion effect on force senses such that Gyro-CubeSensuous held in hand feels heavier, lighter, or even lifted.

Non-Patent Document 1: Norio Nakamura, "Non-grounding force sense presenting interface giving illusionary senses of 'push, pull, and lift'", Inspection Engineering, JAPAN INDUSTRIAL PUBLISHING CO., LTD., Vol. 11, No. 2, pp. 6-11 (2006/02)

Non-Patent Document 2: Yokichi Tanaka, Masataka Sakai, Yuka Kono, Sachio Fukui, Juri Yamashita, and Norio Nakamura, "Mobile Torque Display and Haptic Characteristics of Human Palm", INTERNATIONAL CONFERENCE ON ARTIFICIAL REALITY AND TELEXISTENCE, pp. 115-120 (2001/12)

Non-Patent Document 3: Nakamura, N., Fukui, Y.: "An Innovative Non-grounding Haptic Interface 'GyroCubeSensuous' displaying illusion Sensation of Push, Pull, and Lift", Proceedings of ACM Siggraph 2005, 2005.

Patent Document 1: JP 2005-190465 A

DISCLOSURE OF THE INVENTION

Problems to be Solved by the Invention

The use of a wire or an arm causes users' movement to be restricted by the presence of the wire or arm. The use of the wire or arm also allows a force sense presenting system main body and a force sense presenting section to be used only within an effective reaching space in which the force sense presenting system main body and the force sense presenting section are connected together via the wire or arm. Thus, the use of the wire or arm limits an available spatial expanse. A method of controlling an angular momentum resultant vector generated by three gyro motors to generate torque does not involve the restriction by the wire or arm but uses a relatively simple structure and easy control. However, the method disadvantageously fails to continuously present a tactile force sense and to present force senses other than torque.

Moreover, in conventional force interface devices, interfaces disadvantageously fail to respond appropriately to users' motions and to provide sufficient interactions that allow the shape and texture of a virtual object to be expressed. Furthermore, a reduction in heat and energy consumption is a major challenge in achieving practical application and commercialization of a conventional acceleration and deceleration mechanism based on eccentric rotors that utilize motors. It is also essential to deal with users' individual differences in sensory characteristics, hand size, and preferences and to improve manipulability and ease of use.

In view of these problems, a first object of the present invention is to provide a virtual reality environment generating apparatus and a virtual reality environment generating method which are intended to allow a user to fully experience haptic touches with virtual objects and game characters via a non-base type interface; the virtual reality environment generating apparatus and method utilize a tactile force sense to control resistance based on an illusionary tactile force sense in accordance with the motion of the user's finger or hand, thus not only enabling three-dimensional videos and sound images to be provided but also allowing expression of senses of friction and roughness corresponding to the presence, shape, and texture of the virtual object.

A second object of the present invention is to provide an apparatus and a method which are intended to implement a virtual reality environment based on the visual, auditory, and tactile senses and into which a virtual space that can be utilized in everyday life and the real space are merged; the apparatus and method enable a reduction in heat and energy consumption in an acceleration and deceleration mechanism as well as easy miniaturization and mobilization so as to allow practical application and commercialization of an interface. Another object of the present invention is to provide an apparatus and a method which achieve high manipulability and responsiveness while allowing the interface to be freely designed in accordance with users' individual characteristics and applications in connection with the users' significant individual differences in hand size, preferences, and senses.

Means for Solving the Problems

To accomplish the above-described objects, a first aspect of the present invention provides a virtual reality environment generating apparatus comprising an illusionary tactile force sense interface device comprising an illusionary tactile force sense device, and an illusionary tactile force sense device driving control device configured to drivingly control the illusionary tactile force sense device.

A second aspect of the present invention provides a virtual reality environment generating apparatus comprising an illusionary tactile force sense evoking device configured to generate an illusionary tactile force sense evoking function adapted for a content using illusionary tactile force sense data, an illusionary tactile force sense interface device comprising an illusionary tactile force sense device, and an illusionary tactile force sense device driving control device configured to drivingly control the illusionary tactile force sense device.

A third aspect of the present invention provides a virtual reality environment generating apparatus comprising a content creating device configured to create a content based on information from various sensors and content data, an illusionary tactile force sense evoking device configured to generate an illusionary tactile force sense evoking function adapted for a content by using illusionary tactile force sense data, an illusionary tactile force sense interface device comprising an illusionary tactile force sense device, and an illusionary tactile force sense device driving control device configured to drivingly control the illusionary tactile force sense device.

A fourth aspect of the present invention provides a virtual reality environment generating apparatus comprising a content creating device configured to create a content based on information from various sensors and content data, an illusionary tactile force sense evoking device comprising a learner and/or a corrector and configured to generate an illusionary tactile force sense evoking function adapted for a content using illusionary tactile force sense data, an illusionary tactile force sense interface device comprising an illusionary tactile force sense device, and an illusionary tactile force sense device driving control device configured to drivingly control the illusionary tactile force sense device.

A fifth aspect of the present invention provides a virtual reality environment generating apparatus comprising a content creating device configured to create a content based on information from various sensors and content data, an illusionary tactile force sense evoking device comprising a learner and/or a corrector and configured to generate an illusionary tactile force sense evoking function adapted for a content using illusionary tactile force sense data, an illusionary tactile force sense interface device comprising an illusionary tactile force sense device, and an illusionary tactile force sense device driving control device configured to drivingly control the illusionary tactile force sense device, wherein after a learning instruction, the illusionary tactile force sense evoking device generates a learning illusionary tactile force sense evoking function, senses a user's reaction and action to illusionary tactile force sense information presented in accordance with the function, estimates the user's illusionary tactile force sense sensory characteristics as a illusionary tactile force sense sensory quantity, and calculates an illusionary tactile force sense evoking function and individual-difference correction data for control.

A sixth aspect of the present invention provides a virtual reality environment generating apparatus comprising a content creating device configured to create a content based on information from various sensors and content data, an illusionary tactile force sense evoking device comprising a learner and/or a corrector and configured to generate an illusionary tactile force sense evoking function adapted for a content using illusionary tactile force sense data, an illusionary tactile force sense interface device comprising an illusionary tactile force sense device, and an illusionary tactile force sense device driving control device configured to drivingly control the illusionary tactile force sense device, wherein the illusionary tactile force sense evoking device senses a user's reaction and action to illusionary tactile force sense information in each content, estimates the user's illusionary tactile force sense sensory characteristics for a feature quantity in the content, and calculates and utilizes an illusionary tactile force sense evoking function and individual-difference correction data for control.

According to a seventh aspect of the present invention, the illusionary tactile force sense device comprises an acceleration and deceleration mechanism.

According to an eighth aspect of the present invention, the illusionary tactile force sense device driving control device controls a velocity of the acceleration and deceleration mechanism via an oscillation circuit.

According to a ninth aspect of the present invention, the illusionary tactile force sense device driving control device controls a phase, direction, or rotating velocity of a motor provided in the illusionary tactile force sense device or a phase, direction, or velocity of an actuator provided in the illusionary tactile force sense device, in accordance with the illusionary tactile force sense evoking function generated by the illusionary tactile force sense evoking device.

According to a tenth aspect of the present invention, the virtual reality environment generating apparatus comprises a sensor, and the sensor is at least one of a position sensor configured to sense and measure the motion of a site on which the illusionary tactile force sense interface device is installed, a shape sensor configured to measure a shape and a surface shape of a real object, a pressure sensor configured to sense and measure a contact force and a grip force exerted between the real object and the user, a biosignal sensor, and an acceleration sensor.

According to an eleventh aspect of the present invention, the illusionary tactile force sense interface device comprises an installation section, and a member having a nonlinear stress characteristics and located between the illusionary tactile force sense device and the installation section.

A twelfth aspect of the present invention corresponds to the virtual reality environment generating apparatus wherein the illusionary tactile force sense interface device comprises an antiseismic member between the illusionary tactile force sense device and the acceleration sensor.

According to a thirteenth aspect of the present invention, the illusionary tactile force sense interface device comprises an acceleration sensor, and a finger installation section between the illusionary tactile force sense device and the acceleration sensor.

According to a fourteenth aspect of the present invention, the illusionary tactile force sense interface device comprises at least one of a CPU, a memory, and a communication device.

According to a fifteenth aspect of the present invention, the content creating device executes a physical simulation calculation, generates and updates a virtual reality space, creates and displays a computer graphic, and processes illusionary tactile force sense information, based on information from the sensor.

According to a sixteenth aspect of the present invention, the illusionary tactile force sense interface device comprises two or plural sets of illusionary tactile force sense devices driven at different frequencies and/or different accelerations and decelerations.

According to a seventeenth aspect of the present invention, the illusionary tactile force sense interface device comprises an installation section configured to be installed on finger(s) or a body.

An eighteenth aspect of the present invention provides a controller apparatus comprising a base section comprising transformable means and illusionary tactile force sense interface device(s) comprising illusionary tactile force sense device(s).

A nineteenth aspect of the present invention provides a virtual controller apparatus comprising an illusionary tactile force sense interface device configured to create virtual motion(s) to provide virtual presence(s), virtual tactile sense, and virtual sense of button manipulation, and audiovisual display(s) configured to present a virtual object.

EFFECTS OF THE INVENTION

The following special effects can be exerted by implementing the virtual reality environment generating apparatus and method according to the present invention.

(1) The conventional non-base type tactile force sense interface allows only a sense of vibration to be perceived by periodically repeated motion such as vibration. The conventional non-base type tactile force sense interface thus fails to provide sufficient interactions based on force feedback which allows the shape and texture of a virtual object to be perceived. In contrast, the present invention utilizes an illusionary tactile force sense to allow forces and motion components which do not exist physically to be perceived. The present invention thus allows a user to psychophysically perceive a sense of a force that acts continuously in a fixed direction. Moreover, although this non-base type interface is gripped in the air without a force base that acts to support the interface, the illusion serves to actually bring about a physical phenomenon in which the arm holding the interface is raised against gravity.

(2) The resistance evoked by the illusionary tactile force sense is controlled, in accordance with the motion of the finger and body on which the illusionary tactile force sense interface device is installed. This enables senses of friction and roughness corresponding to the presence, shape, and texture of the virtual object to be expressed. In particular, presenting negative resistance (acceleration) to the motion results in such a sense of smoothness as felt during sliding on the ice. Furthermore, the illusionary tactile force sense is controlled with a grip pressure exerted on the real object monitored. Then, the feel of the real object can be edited and substituted with the feel of the virtual object.

(3) The illusionary tactile force sense interface device is transformed in synchronism with the illusionary tactile force sense. Consequently, the force sense evoked by the illusionary tactile force sense is emphasized, thus improving reality.

(4) The sensory characteristics for the illusionary tactile force sense varie among individual users, and the intensity and texture perceived by the users involve great individual differences. The provision of the learner and the corrector allows the illusionary tactile force sense interface device to be handled similarly to the conventional tactile force sense interface device. Furthermore, measuring myoelectric reaction allows a possible individual difference to be corrected in real time. Hence, learning of the illusionary tactile force sense can be improved, and the control can be optimized for each user.

(5) Heat and energy consumption have been major challenges for the conventional acceleration and deceleration mechanism based on eccentric rotors that utilize motors. In contrast, according to the present invention, the oscillation circuit is used to control the velocity of the acceleration and deceleration mechanism. Alternatively, a plurality of sets of illusionary tactile force sense devices driven at different frequencies are used to provide an illusionary tactile force sense similar to that obtained using the acceleration and deceleration mechanism, in spite of constant-velocity rotation. This reduces generated heat and energy consumption, facilitating size reduction and mobilization.

(6) Conventional arm-type tactile force sense interface devices measure the user's position and posture based on the angle of an arm attached to the user's finger.
The conventional arm-type tactile force sense interface device then repeats determining whether or not the fingertip has touched or interfered with the virtual object in connection with small motions of the fingertip and recalculating stress to be presented. Thus, disadvantageously, responses may be delayed. In contrast, according to the present invention, the CPU and memory are not mounted in the content generating device, which is a central section, but in the illusionary tactile force sense interface device, which is a peripheral section, to perform real-time control. This improves responsiveness in depression of virtual buttons and the like, thus enhancing reality and manipulability.

(7) In conventional driving simulators, a sense of continuous acceleration can be experienced only by a method utilizing gravity. Thus, the user feels uncomfortable with a sense of acceleration in an environment in which surroundings are visible, so that leaning of the user's body is perceived. In contrast, the present invention allows the user to feel the sense of continuous acceleration even in an arcade type game machine in which the user repeats periodic motions in a narrow space on a pedestal.
The present invention further allows the user to feel a continuous force even using a non-base type interface for mobile applications, game controllers, or the like.

(8) Conventional game controllers are for "pseudo experience type" games based on the motion of the user's own body and fail to provide sufficient interactions based on vibrational force feedback. In contrast, the present invention uses the illusionary tactile force sense interface device to provide a "full experience type controller" configured to allow the user to haptically touch virtual objects and game characters.

(9) Game controllers with different shapes, sizes, and button arrangements are commercially available. However, in many cases, an easy-to-use controller that suits the user's hand size and preferences can hardly be found. Thus, the present invention uses a virtual controller technique for freely designing the shape of the controller and the button arrangement such that the shape and arrangement suit the user's hand.

This eliminates the need to purchase a dedicated controller adapted for the contents of the game and allows the controller to be freely transformed and modified in accordance with scenes and stories in the contents.

(10) The present invention provides a practical non-base type technique to enable the virtual object to be touched, instead of conventional virtual reality based solely on the visual and auditory senses. The present invention thus provides a virtual reality environment based on the visual, auditory, and tactile senses and into which a virtual space that can be utilized in everyday life and the real space are merged.

BRIEF DESCRIPTION OF THE DRAWINGS

FIG. 8-1 is a diagram illustrating an example of method for controlling a device configured to evoke an illusionary tactile force sense.

FIG. 8-2 is a diagram showing the shape of an eccentric weight.

FIG. 13-1 is a diagram illustrating an embodiment of an illusionary tactile force sense interface device.

FIG. 13-2 is a diagram illustrating an embodiment of the illusionary tactile force sense interface device.

FIG. 29-1 is a diagram illustrating examples of the arrangement and application of the illusionary tactile force sense device.

FIG. 29-2 is a diagram illustrating examples of the arrangement and application of the illusionary tactile force sense device.

FIG. 29-3 is a diagram illustrating examples of the arrangement and application of the illusionary tactile force sense device.

FIG. 32-1 is a diagram illustrating an illusionary tactile force sense device that uses one set of units and a method for controlling the illusionary tactile force sense device.

FIG. 32-2 is a diagram illustrating the illusionary tactile force sense device that uses the one set of units and the method for controlling the illusionary tactile force sense device.

FIG. 32-3 is a diagram illustrating the illusionary tactile force sense device that uses the one set of units and the method for controlling the illusionary tactile force sense device.

FIG. 32-4 is a diagram illustrating an illusionary tactile force sense device that uses a plurality of sets of units and a method for controlling the illusionary tactile force sense device.

FIG. 32-5 is a diagram illustrating the illusionary tactile force sense device that uses the plurality of sets of units and the method for controlling the illusionary tactile force sense device.

FIG. 32-6 is a diagram illustrating the illusionary tactile force sense device that uses the plurality of sets of units and the method for controlling the illusionary tactile force sense device.

FIG. 32-7 is a diagram illustrating the illusionary tactile force sense device that uses the plurality of sets of units and the method for controlling the illusionary tactile force sense device.

FIG. 32-8 is a diagram illustrating the illusionary tactile force sense device that uses the plurality of sets of units and the method for controlling the illusionary tactile force sense device.

DESCRIPTION OF SYMBOLS

Figure 1:
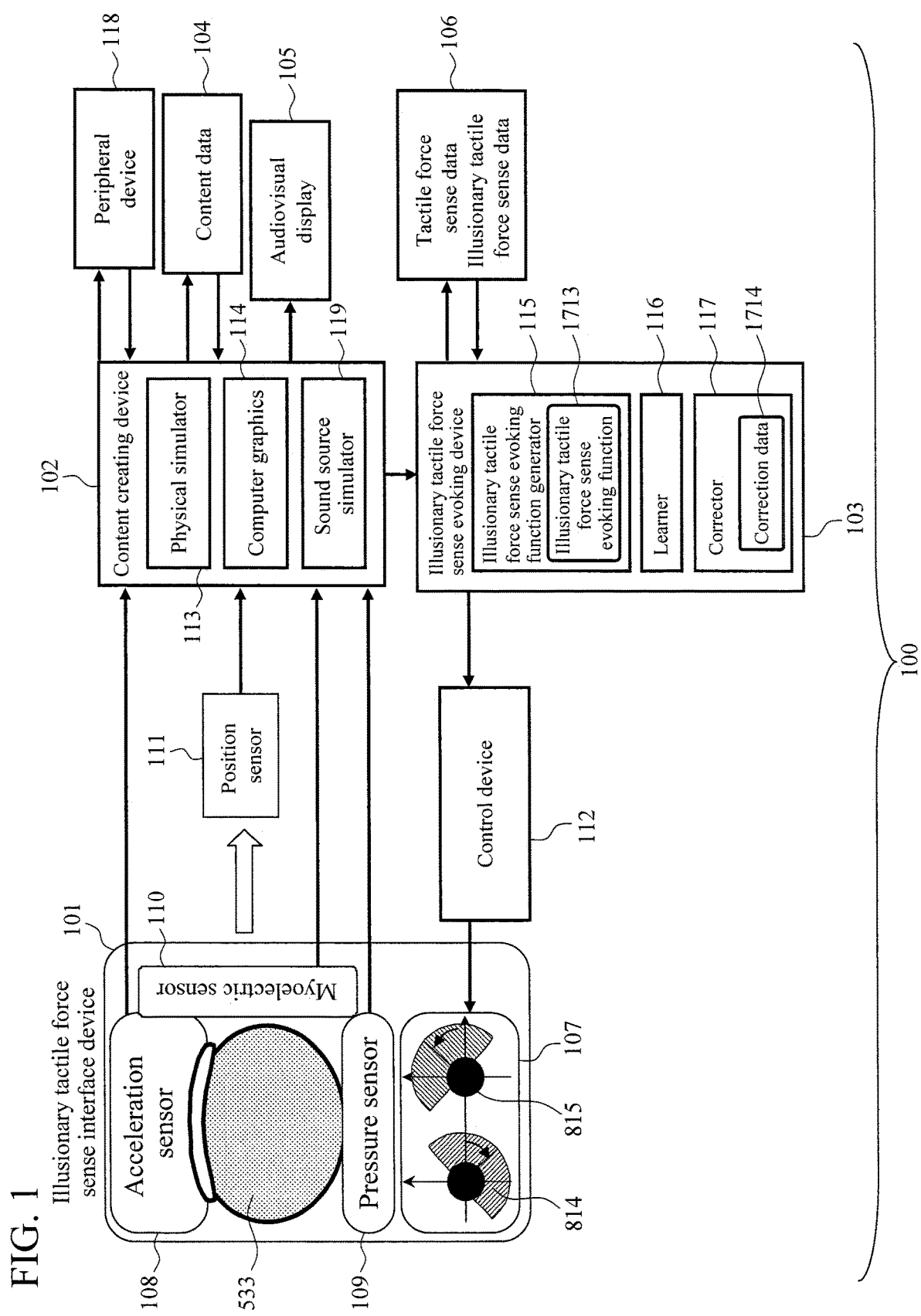
FIG. 1 is a diagram showing base units of a virtual reality environment generating apparatus.

101 Illusionary tactile force sense interface device
102 Content creating device
103 Illusionary tactile force sense evoking device
104 Content data
105 Audiovisual display
106 Tactile force sense data and illusionary tactile force sense data
107 Illusionary tactile force sense device
107a Illusionary tactile force sense device
107b Illusionary tactile force sense device
108 Acceleration sensor
109 Pressure sensor
110 Myoelectric sensor
111 Position sensor
112 Control device
113 Physical simulator
114 Computer graphics
115 Illusionary tactile force sense evoking function generator
116 Learner
117 Corrector
118 Peripheral device
119 Sound source simulator
205 Communicator
520 Virtual object (physical model)
528 Spring and damper physical model
531 Virtual object
533 Finger
535 Stress exerted by virtual object
814 Eccentric weight
815 Eccentric motor
901 Physical phenomenon
902 Nonlinear sensory characteristics
903 Psychological phenomenon
904 Lateral vibration
905 Illusionary tactile force sense
908 Integral quantity of force sense during duration Ta of operation point A
909 Integral quantity of force sense during duration Tb of operation point B
1002a High rotation number ω1
1002b Low rotation number ω2
1100 Virtual plate
1101 Motion of virtual object
1102 Resistance against movement
1103 Resistance from virtual plate
1104 Frictional force
1105 Viscous resistance
1106 Resistance that acts to push back virtual plate into surface
1107 Thickness error of virtual plate
1108 Senses of resistance and viscosity
1109 Sense of friction
1110 Sense of smoothness and acceleration
1111 Sense of roughness
1112 Vibrational resistance
1113 Acceleration force (negative resistance)
1201 Initial phase θi
1202 Sense of lifting based on illusionary tactile force sense
1203 Sense of lifting based on illusionary tactile force sense
1204 Sense of gravity based on illusionary tactile force sense
1301 Adhesion tape
1302 Housing
1303 Finger insertion section
1403 Shape transformable material
1404 Viscoelastic material
1405 Antiseismic material
1406 Display
1702 Corrector
1703 Motor controller
1704 Motor
1705 Encoder
1706 Viscoelastic characteristics controller
1707 Viscoelastic material
1713 Illusionary tactile force sense evoking function
1714 Correction data
1725 Physical strength 15 dB
1901 Motor FB characteristics controller
1902 Control signal generator
2206 Threshold
2302 Weight
2303 Stretchable material
2400 Constant-velocity rotation
2403 Viscoelastic material A
2404 Viscoelastic material B
2601 Hysteresis material A
2602 Hysteresis material B
3001 Shape of illusionary tactile force sense interface device
3002 Shape transforming motor
3003 Flexible transformable material
3101 Virtual controller
3102 Virtual button
3202 Displacement of center of gravity (phase difference 0°)
3203 Displacement of center of gravity (phase difference 180°)

BEST MODE FOR CARRYING OUT THE INVENTION

Embodiments of the present invention will be described below with reference to the drawings.

FIG. 1 is a hardware block diagram of an illusionary tactile force sense interface device 100 used in a virtual reality environment generating apparatus (VR environment generating apparatus) 100. In the description, by way of example, the illusionary tactile force sense interface device 101 is installed on a fingertip 533. However, the location at which the illusionary tactile force sense interface device 101 is installed is not limited to the fingertip. Furthermore, FIG. 1 shows, by way of example, that an acceleration sensor 108, a pressure sensor 109, and a myoelectric sensor 110 all integrated with an illusionary tactile force sense device 107 are arranged in the illusionary tactile force sense interface device 101 installed on the fingertip 533. However, these sensors may be installed at a body position different from that where the illusionary tactile force sense device 107 is installed. In the specification, even if the illusionary tactile force sense device 107 and the group of sensors are separately installed at different body positions, the device 107 and the sensors are collectively called the illusionary tactile force sense interface device 101.

Contents are created based on information from the sensors and content data 104. An illusionary tactile force sense evoking function 1713 corresponding to the content is then generated by an illusionary tactile force sense evoking function generator 115 using illusionary tactile force sense data 106. An illusionary tactile force sense device driving control device 112 controls the illusionary tactile force sense device 107.

The phase, direction, and rotating velocity of eccentric motors 815 of the illusionary tactile force sense device 107 are controlled in accordance with the illusionary tactile force sense evoking function generated by the illusionary tactile force sense evoking device 115. An illusion for a tactile force sense (illusionary tactile force sense) is evoked by a change (acceleration and deceleration pattern) in momentum generated by rotation of eccentric weights 814 caused by the eccentric motors in the illusionary tactile force sense device 107. The use of the illusionary tactile force sense evoking function enables a sense different from a presented force (physical information) generated by a change in momentum to be perceived utilizing the illusion, which is nonlinear sensory characteristics. That is, a force and a motion component which do not exist physically can be perceived. For example, periodically repeated vibration physically has no force information on only a fixed direction owing to a periodic variation in the direction of the force. However, by controlling the acceleration and deceleration pattern of the momentum in accordance with the illusionary tactile force sense evoking function, a continuous force in only one direction can be psychophysically perceived based on an illusionary tactile force sense. The illusionary tactile force sense evoking device 103 includes a learner 116 and a corrector 117 to enable optimization in accordance with users' individual characteristics.

The motion of the fingertip 533 at which the illusionary tactile force sense interface is installed is sensed by a position sensor 111 and an acceleration sensor 108. Position, velocity, and acceleration information obtained by the position and acceleration sensors is used to determine whether or not the fingertip 533 has touched a virtual object generated by a physical simulator 113 in a content creating device 102 and to calculate a force that acts on the virtual object. Furthermore, a contact and a grip force exerted between a real object and a user are sensed by the pressure sensor 109 and the myoelectric sensor 110. The content is formed into videos and sound images by a computer graphics 114 and a sound source simulator 119. The videos and sound images are displayed on an audiovisual display 105. Thus, in connection with virtual reality, conventionally based only on the visual and auditory senses, a practical non-base type illusionary tactile force sense interface is provided. As a result, a virtual reality environment is provided which is based on the visual, auditory, and tactile senses and which can be utilized in everyday life.

Instead of the content creating device, simulation data from a physical simulator in another device (for example, a conventional game machine) may be used.

Alternatively, the user may manually set physical parameters so as to controllably utilize the illusionary tactile force sense evoking device 115.

Furthermore, control is generally performed via the content generating device, which is a central section. However, when CPUs and memories mounted in the illusionary tactile force sense interface device, which is a peripheral section, is used to perform real-time control without using the content generating device and the illusionary tactile force sense evoking device 115, responsiveness in depression of the virtual button and the like, reality, and manipulability are improved. The illusionary tactile force sense interface device can be connected to and utilized with conventional devices.

The use of the illusionary tactile force sense interface device 101 allows conventional information on the tactile force sense to be presented.

The transmission of information and/or the connection between instruments such as devices, peripheral devices, databases, and sensors may be wired or wireless.

FIG. 2(a) shows a process flowchart for the VR environment generating apparatus. The VR environment generating apparatus 100 performs calibration, and generates contents for a VR environment by modeling for forming a virtual space and virtual objects, based on sensing information from the sensors and a peripheral device 118 connected to the apparatus. The VR environment generating apparatus 100 further generates and updates contents based on content information and sensed motions of the user as well as information from the peripheral device 118, and presents information based on the contents. The user perceives and recognizes the presented information, and the result from the user's reaction and action are monitored by sensing.

The calibration is performed by the illusionary tactile force sense interface device and the illusionary tactile force sense evoking device. The sensing is performed by the illusionary tactile force sense interface device (acceleration sensor, pressure sensor, and myoelectric sensor) and the position sensor. The content generation is performed by the content generating device. The presentation is performed by the illusionary tactile force sense interface device and the illusionary tactile force sense evoking device.

Information is exchanged with the real space through the peripheral device 118. Thus, a virtual reality environment is generated and controlled which a combination of the virtual space and the real space are handled.

FIG. 2(b) shows that the VR environment generating apparatus 100 includes a communicator and that a plurality of VR environment generating apparatuses 100 possessed by the respective users or located in respective remote spaces communicate to generate one larger VR environment. The communication allows contents and sensing information to be shared. Hence, a plurality of users at respective remote locations coexist and share information in the same VR environment, thus sharing the manipulation and feels of the same virtual objects. Furthermore, a plurality of illusionary tactile force sense interface devices 101 installed on the same user cooperate with one another to form a wearable VR environment.

Figure 3:
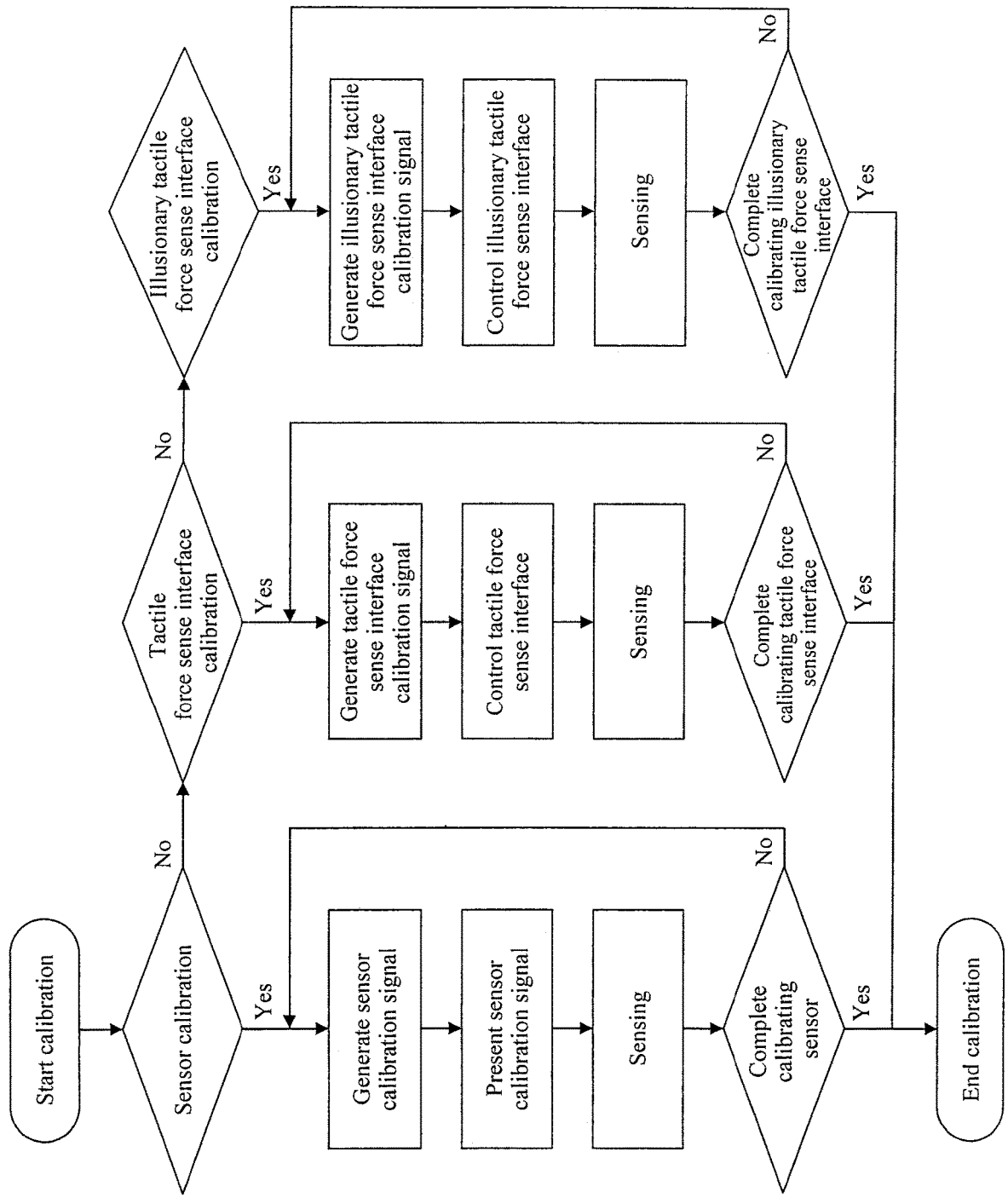
FIG. 3 is a diagram illustrating a calibration process flowchart.

FIG. 3 shows a flowchart of a calibration process for the sensors, the tactile force sense interface device, and the illusionary tactile force sense interface device 101.

In each calibration flow, calibration is performed as follows. A calibration signal is generated. In accordance with the calibration signal, the sensors, the tactile force sense interface, and the illusionary tactile force sense interface device 101 are controlled, with the results of the control sensed.

Figure 4:
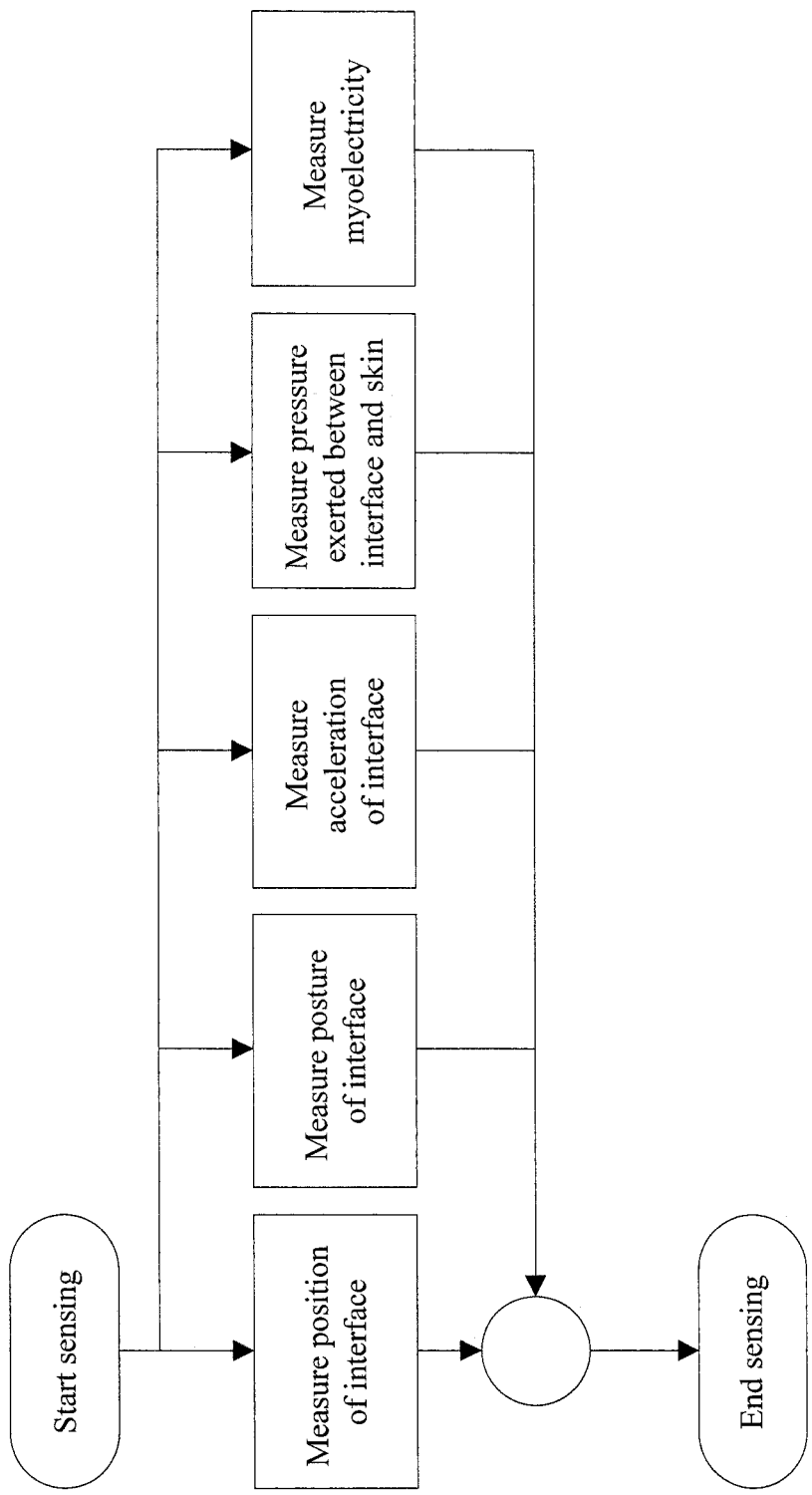
FIG. 4 is a diagram illustrating a sensing process flowchart.

FIG. 4 shows a flowchart of a sensing process. The sensing involves measuring the position, posture, and acceleration of the illusionary tactile force sense interface device 101, as well as the pressure and myoelectricity between the interface and the skin. These pieces of information are utilized for calibration, learning, content generation, and presentation. Instead of this myoelectric sensor, a biosignal sensor may be utilized which measures biosignals for brain wave, heart rate, breathing, blood pressure, blood flow, blood gas, and skin resistance. The control and biofeedback control of the illusionary tactile force sense interface device 101 promote calibration, learning, and effective illusion evocation. The biosignal sensor and the biofeedback control may be implemented utilizing an existing measurement sensor and an existing control method both used for medical care. The biosignal sensor may be installed on the user's body at a position distant from the illusionary tactile force sense device. For example, the following form is possible. A brain wave sensor serving as a biosignal sensor forming a part of the illusionary tactile force sense interface device is installed on the head. At the same time, and the illusionary tactile force sense device, forming a part of the illusionary tactile force sense interface device, is installed on the fingertip.

FIG. 5(a) is a process flowchart of content generation. In the content generation, based on the read content data 104 and sensing information, a VR space is generated and updated based on calculations for physical simulation and other model calculations. Then, a CG is created and displayed, and illusionary tactile force sense information and tactile force sense information are processed.

FIG. 5(b) shows a physical simulation 520 in which a freely transformable hollow sphere is modeled using a spring and damper physical model 528.

When a grid point p1 is coupled to adjacent grid points p2 to p4, a force vector f12 from the grid point p2 to which grid point p1 is subjected is expressed by:

$$f12 = -k \times (\|p2-p1\| - L_0) \times (p2-p1)/\|p2-p1\mu - c \times (v2-v1)\tag{1}$$

where
pi: position vector of a grid point pi,
vi: velocity vector of a grid point pi,
k: Elastic modulus of a spring,
c: Viscosity coefficient of a damper, and
$L_0$: Length of the spring in a balanced state.

When the resultant force of the forces exerted on the grid point p1 with a mass m1 by the surrounding grip points p2 to p4 is defined as f1, an equation of motion for the grid point p1 is expressed by:

$$m1 \times d^2 p1/dt^2 = f1 = f12 + f13 + f14 \tag{2}$$

If the fingertip 533 at which the illusionary tactile force sense interface device 101 is installed touches the grip point p1 in this virtual object physical model 520, the grip point p1 changes to the position p'1 of the fingertip. The reaction force (−f) which acts on the fingertip is expressed by:

$$-f = (f12 + f13 + f14) - m1 \times d^2 p'1/dt^2 \tag{3}$$

The motion of the fingertip 533, based on which whether or not the fingertip 533 has touched a virtual object is determined, is sensed by the position sensor 111 and the acceleration sensor 108.

In the actual numerical simulation, the position p'1, velocity v'1, and force f'1 of the grid point p1 at a point in time t' are determined from variables p1, v1, and f1 at the preceding point in time t.

That is, the following hold true.

$$\text{Velocity vector:} v'1 = v1 + (f1/m1) \times \Delta t \tag{4}$$

$$\text{Position vector:} p'1 = p1 + v1 \times \Delta t \tag{5}$$

Similarly, the position and velocity of p2 with a mass m2 are calculated.

$$\text{Velocity vector:} v'2 = v2 + (f2/m2) \times \Delta t \tag{6}$$

$$\text{Position vector:} p'2 = p2 + v2 \times \Delta t \tag{7}$$

Finally, the force vector acting between the grip points p1 and p2 is calculated by:

$$f12 = -k \times (\|p'2-p'1\| - L_0) \times (p'2-p'1)/\|p'2-p'1\| - c \times (v'2-v'1) \tag{8}$$

In every calculation, the position, velocity, and force of each grid point are calculated and saved to the memory. The saved values are used to calculate the position, velocity, and force at the succeeding point in time. As a result, the reaction force exerted on the fingertip 533 is presented. This allows the virtual object expressed as a three-dimensional sound image and a three-dimensional video on the audiovisual display to be touched.

In the VR environment, as in the case of the above-described physical simulation for the virtual object 531, based on information on the motion of the real object in the real space sensed by the peripheral device and the user's motion sensed by the position sensor 111 and the acceleration sensor 108, the real object and the user are modeled in the same VR environment. A contact force and a grip force exerted between the content and the user are then calculated. Thus, a VR space is generated into which the virtual space and the real space are merged.

FIG. 5(c) shows how the virtual object 531 is transformed when the illusionary tactile force sense interface device 101 installed on the fingertip 533 is moved. The motion of the illusionary tactile force sense interface device 101 is monitored by the sensor to detect a touch with the virtual object 531. A touch with the object 531 is detected. Physical simulation of the virtual-object physical model 520 allows calculation of the transformation of the model, the force of the transformation, and the resultant reaction force transmitted to the fingertip. The feel of the touch is presented through the illusionary tactile force sense interface device 101. Based on the results of calculations by the physical simulator 113, the illusionary tactile force sense transmitted from the virtual object 531, transformed in response to the motion of the finger 533, to the fingertip 533 is controlled. Hence, the user can transform and move the virtual object 531 while feeling, for example, such a sense of elasticity as felt when rubber is transformed or such a sense of viscosity as felt when slime is stretched; the senses of elasticity and viscosity indicate the material of the virtual object 531.

FIGS. 6(a) and 6(b) show a flowchart of a presentation process.

The content data 104 on the illusionary tactile force sense and tactile force sense in the VR space created by the content creating device 102 is loaded. An illusionary tactile force sense function and a tactile force sense function are generated and corrected by the corrector 117 in accordance with the information obtained by sensing and the user's characteristics. In accordance with the functions, the illusionary tactile force sense device 107 is feedback-controlled.

The illusionary tactile force sense interface device utilizes illusions. Thus, the sensitivity for the illusionary tactile force sense and improvement of the sensitivity through learning vary greatly among individual users. Hence, even when the same stimulus is presented, the intensity of feeling varies depending on the user. Consequently, in order to allow the user to perceive the stimulus with the same intensity without depending on the user, the stimulus needs to be learned and corrected.

FIGS. 7(a) and 7(b) show flowcharts for the learner 116. The learner 116 involves active learning and unconscious learning. In the active learning method, after a learning instruction, a learning illusionary tactile force sense evoking function as shown below is generated. The user's reaction and action to illusionary tactile force sense information presented in accordance with the function are sensed to allow determination of the intensity of the illusionary tactile force sense, which indicates the user's illusionary tactile force sense characteristics. Based on data on the illusionary tactile force sense sensory characteristics obtained by pre-measuring a large number of subjects, an illusionary tactile force sense evoking function is created. The illusionary tactile force sense evoking function is compared with the user's illusionary tactile force sense sensory characteristics. Correction data 1714 indicative of individual differences is calculated and saved to the memory or a user characteristics database.

Specifically, in the active learning, after the illusionary tactile force sense interface device 101 is installed, a given force based on the illusionary tactile force sense is sequentially presented in the directions of 0°, 180°, 90°, and 270° according to the instructions. Unlike in the case of the tactile force sense, presenting the illusionary tactile force sense with the presentation direction discreetly varied allows the user to get familiar with and learn the illusionary tactile force sense. As the presentation time elapses, a threshold decreases and sense sensitivity increases, thus making the direction of the force clearer. After one minute of learning, the intensity of the illusionary tactile force sense is gradually reduced. The intensity at which perception has failed is estimated to be a sense threshold for the illusionary tactile force sense. The sense threshold varies depending on the presentation direction and the user and is saved to the memory or the database as correction data required to correct individual static characteristics. As the learning progresses, the threshold converges to a given value corresponding to the illusionary tactile force sense sensory characteristics. The level of learning is determined from a convergence time constant corresponding to the rate of the convergence. Then, an equal-sensory-level contour is determined by a psychophysical paired comparison method.

Similarly, in the unconscious learning method, the user's reaction and action to the illusionary tactile force sense information in each content is sensed to measure the user's illusionary tactile force sense sensory characteristics for a feature quantity (illusionary tactile force sensory intensity and time pattern) relating to the illusionary tactile force sense information in the content. The response characteristics of each user are saved to the memory or the database as individual-difference correcting data.

As described above, the illusionary tactile force sense is a characteristic which varies greatly among individuals individual differences. However, learning and correction allow the illusionary tactile force sense interface device to be used to present the same stimulus intensity as that presented by the conventional tactile force sense interface device.

The characteristics of the illusionary tactile force sense will be described below.

The conventional tactile force sense interface device presents the fingertip or the hand with a force or motion physically representing a physical phenomenon relating to the tactile force sense so that the force or motion can be perceived. However, the present invention relates to a phenomenon in which a force or motion that is different from a physically applied force or motion or does not exist is perceived and recognized. For example, the interface feels lifted through the interface does not actually (physically) be lifted.

The conventional tactile force sense interface device allows the user to feel an external force. Thus, a base which supports a reaction force exerted when a force is presented to the fingertip or the like is essential for the conventional tactile force sense interface device. In contrast, a tactile force sense interface device that utilizes a non-base type vibration motor without a base vibrates around the center of gravity, corresponding to a vibration balance point. The tactile force sense interface device with the non-base type vibration motor fails to allow the user to feel externally pushed. In contrast, the illusionary tactile force sense interface device 101 is of the non-base type but enables the user to feel externally pushed; the illusionary tactile force sense interface device 101 utilizes illusions to present the tactile force sense (Non-Patent Document 3).

The illusionary tactile force sense not only allows illusionary senses to be perceived but also brings about a physical phenomenon in which the arm holding the interface is actually raised. This is because a phantom sensation resulting from an illusion causes the user to unconsciously move the hand or to move the arm muscle as result of reflex. In this regard, the illusionary tactile force sense interface device according to the present invention is greatly different from the conventional tactile force sense interface invented and developed so as to reproduce a physical force that acts between an object and the user's body. The present invention relates to a device configured to evoke tactile force sensory illusions, and to a device configured to effectively evoke an illusionary tactile force sense.

Furthermore, the illusionary tactile force sense interface device 101 according to the present invention also provides the functions and effects of the conventional tactile force sense interface device and thus enables the synergetic effect of both presentation senses to be produced.

Figures 1, 8:
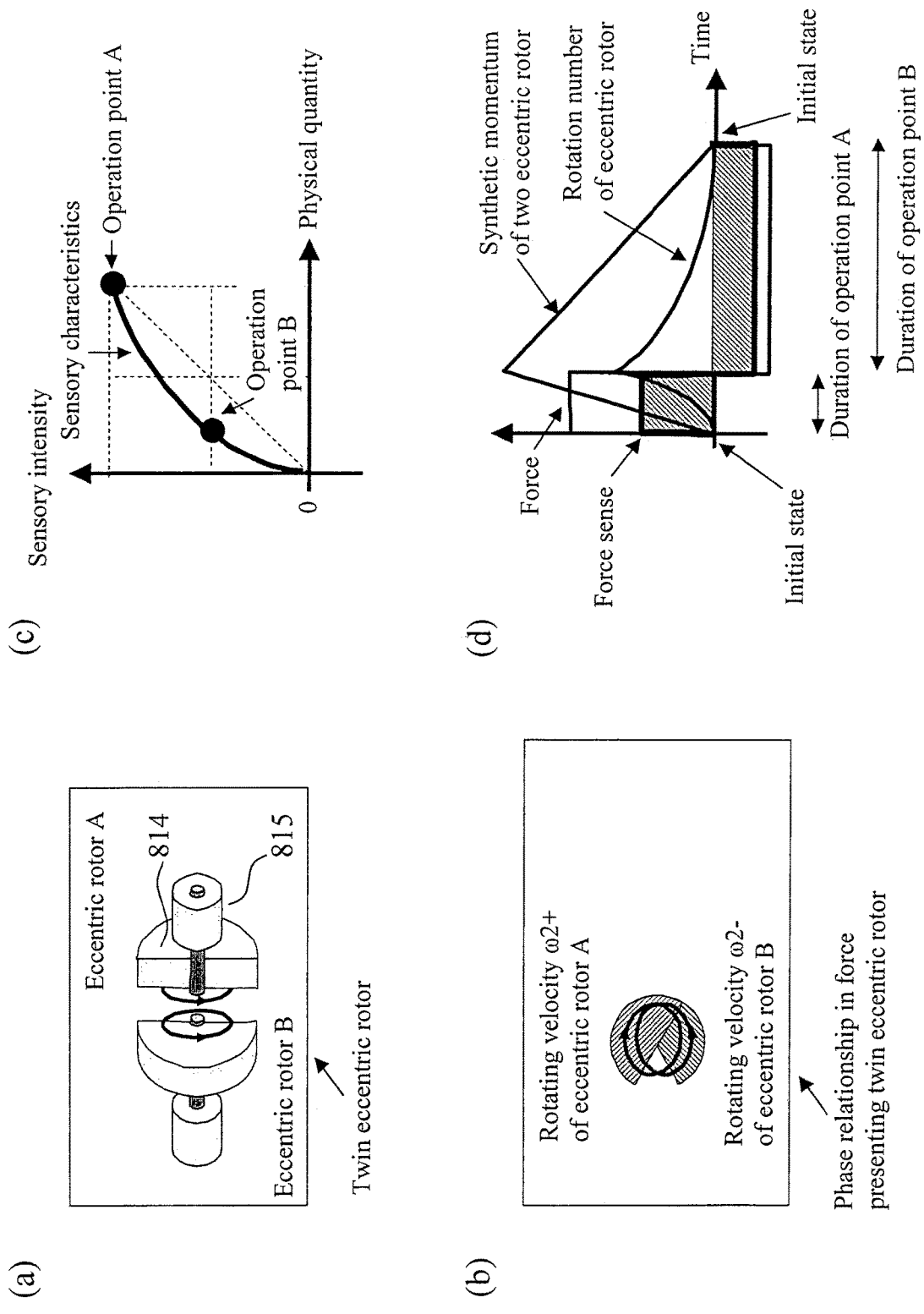

FIGS. 8-1(*a*) to 8-1(*d*) show an example of a method for controlling a device configured to evoke an illusionary tactile force sense.

FIG. 8-1(*a*) shows an acceleration and deceleration mechanism comprising two eccentric rotors A and B. FIG. 8-1(*b*) schematically shows that the two eccentric rotors are rotated in the respective opposite directions in synchronism. As a result of the synchronous rotations in the opposite directions, a force can be synthesized which causes linear acceleration and deceleration in a plane in any direction. FIG. 8-1(*c*) schematically shows that sensory characteristics such as vibration, force, or torque is logarithmically functional. It is assumed that on the sensory characteristics, a positive force is generated at an operation point A, whereas a negative force that acts in the opposite direction is generated at an operation point B. Then, the force sense is expressed as shown in FIG. 8-1(*d*). The magnitude of synthetic momentum of the two eccentric rotors corresponds to the synthesis of the angular momenta of the eccentric rotors A and B. The force is proportional to the time differentiation of the magnitude of the synthetic momenta of the two eccentric rotors.

Figure 2:
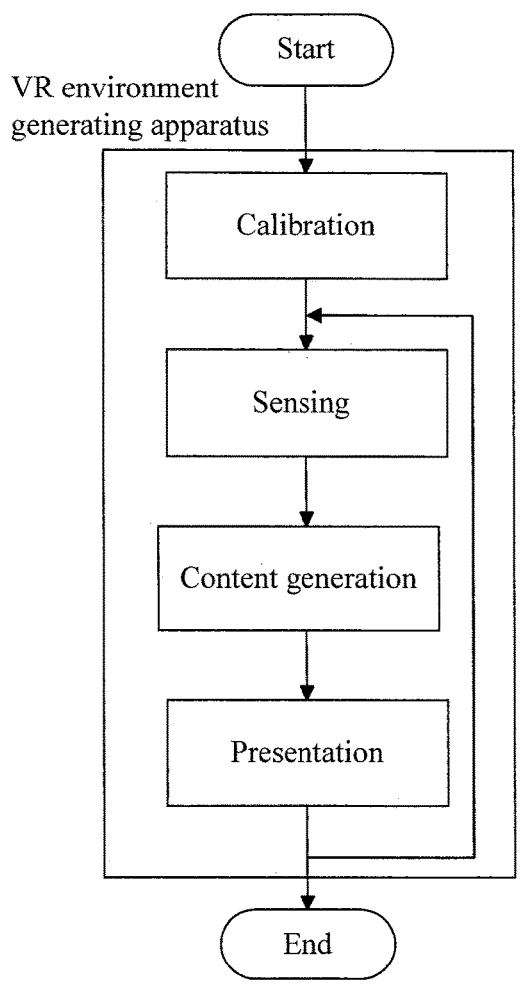
FIG. 2 is a diagram illustrating a process flowchart for the virtual reality environment generating apparatus.
Figure 2:
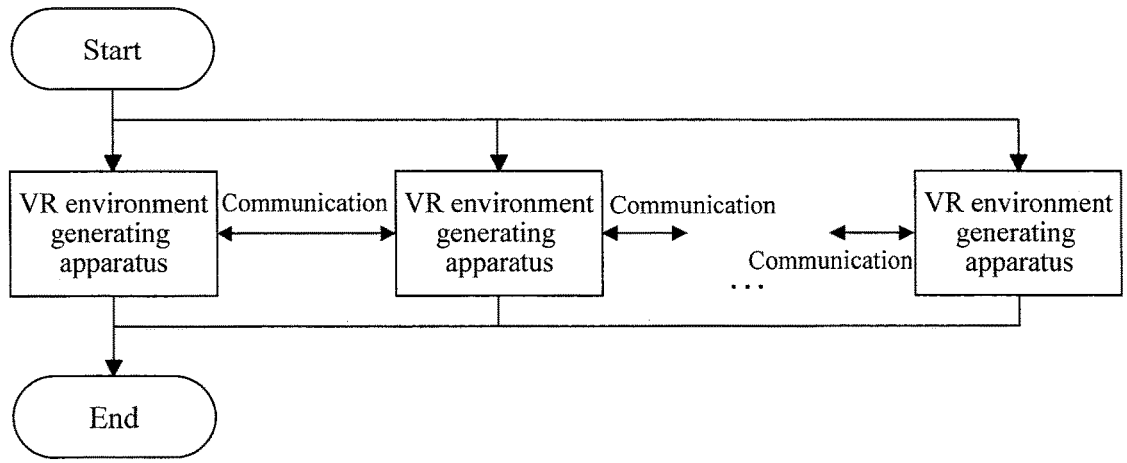

FIGS. 8-2(*a*) to 8-2(*c*) show the shapes of the eccentric weight. The eccentric weight may be streamlined as shown in FIG. 8-2(*b*), or materials with different relative are unevenly arranged as shown in FIG. 8-(*c*) to enable a reduction in rotational resistance, thus offering high rotation acceleration and deceleration.

Figure 9:
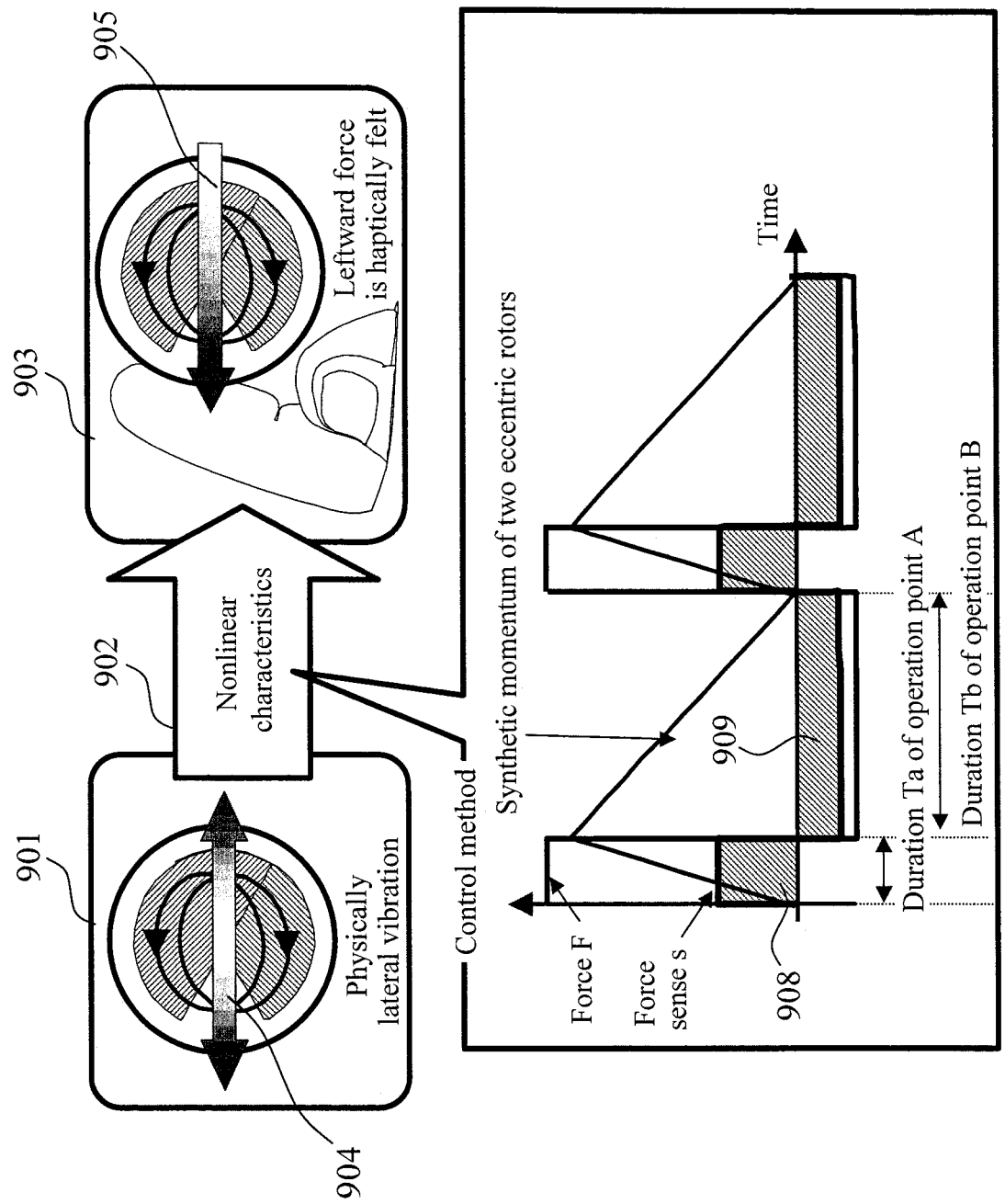
FIG. 9 is a diagram schematically illustrating the phenomenon shown in FIG. 8 and the effects of the phenomenon.

FIG. 9 schematically shows the phenomenon shown in FIG. 8 and the effects of the phenomenon. With sensory characteristics for the illusionary tactile force sense, the rotation pattern of the eccentric motor 815 is controlled to temporally vary the synthetic momentum of the two eccentric rotors. This causes vibration 904 that is periodically accelerated and decelerated around the balance point, thus evoking an illusion 905 allowing the user to perceive a force that acts continuously in a fixed direction. That is, no component such as a force that acts in a fixed direction is present, but the illusion is evoked which allows the user to perceive a force that acts in a fixed direction.

Alternate acceleration and deceleration at the operation points A and B for every 180° of phase shift allow the user to continuously perceive the force sense 905 in a fixed direction. The force physically returns, in one cycle, to the initial condition in which the momentum and the integral value of the force are zero. That is, the force remains around the balance point, thus preventing the acceleration and deceleration mechanism from moving leftward. However, the sensory integral value of the force sense, which is a sensory quantity, is inhibited from being zero. At this time, the perception of the integral 908 of the force in the positive direction lowers, with only the integral 909 of the force in the negative direction perceived.

Here, the time differentiation of the angular momentum corresponds to a torque, and the time differentiation of the momentum corresponds to a force. To allow a torque and a force to be continuously generated in a fixed direction, the rotating velocity of a motor needs to be continuously increased or a linear motor needs to be continuously accelerated. Thus, a method of periodically rotating a rotor or the like is unsuitable for continuously presenting the force sense in a fixed direction. In particular, it is physically impossible for non-base type interfaces utilized in mobile applications or the like to present a force in a fixed direction.

However, since the users have nonlinear sensory characteristics, the technique according to the present invention allows a force and a force pattern inconsistent with physical properties to be illusionarily perceived by utilizing the perception sensitivity for the illusionary tactile force sense characteristics and controlling the acceleration and deceleration pattern of the momentum. For example, the sensitivity is the ratio of the magnitude of a felt stimulus to the intensity of an applied stimulus. In the user's sensory characteristics, the sensitivity varies depending on the intensity of an applied stimulus. The users are sensitive to weak stimuli and insensitive to strong stimuli. Thus, by controlling the phase of acceleration and deceleration of the motor rotation to periodically repeat acceleration and deceleration, the present invention has succeeded in presenting a continuous force sense in a direction in which a weak stimulus is presented. Furthermore, selecting the appropriate operation points A and B with the sensory characteristics also allows a continuous force sensor to be presented in a direction in which a strong stimulus is presented.

An example of a similar device is a driving simulator. However, the driving simulator presents the sense of acceleration of a car by applying an intended force (sense of acceleration) and then slowly returning the simulator to the original position at an unnoticeable, low acceleration. Thus, the force is intermittently presented. Such an eccentric acceleration scheme fails to allow a force sense or a sense of acceleration in a fixed direction to be continuously presented. This also applies to the conventional tactile force sense interface device. However, in spite of the driving method 904 of continuously repeating acceleration and deceleration in the forward and backward direction above the sensory threshold at a short period of, for example, 50 Hz, the present invention utilizes illusions to present a sense of translational force 905 in a fixed direction. In particular, the illusionary tactile force sense interface device 101 that uses illusions is characterized in that a continuous force is perceived in the direction opposite to that of the intermittent force presented by the driving simulator according to the physical technique.

Figure 20:
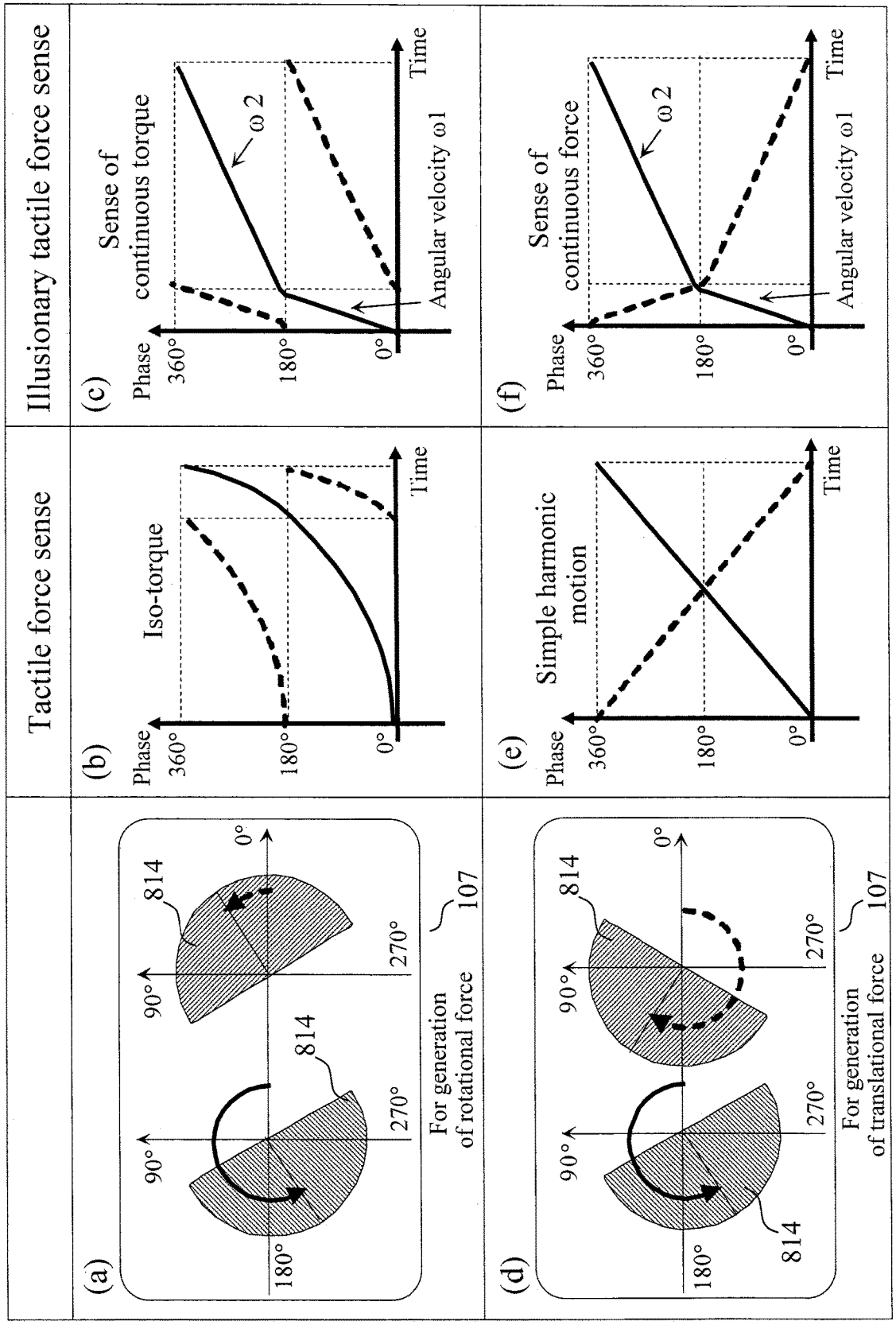
FIG. 20 is a diagram illustrating the effects of an illusionary tactile force sense interface device.

That is, by utilizing the user's nonlinear sensor characteristics that the sensitivity varies depending on the intensity, the present invention prevents the integral of a force generated by periodic acceleration and deceleration or vibration from being haptically offset though the integral is physically zero bit also prevents a force in the positive direction 908 from being perceived. Hence, the force sense for a translation force 905 or a sense of torque can be continuously presented in an intended, negative direction 909 (see FIG. 20(*c*) for a method for generating a continuous sense of torque). In these phenomena, even if the sensory quantity of sensory characteristics 831 is not logarithmic with respect to a physical quantity 832 corresponding to a stimulus, the same effects can be exerted provided that the sensory characteristics 831 is nonlinear. The present effects are exerted not only on the non-base type but also on a base type.

In FIG. 9, making the rotation duration Ta of the operation point A closer to zero increases the synthetic momentum and the force during the interval of the duration Ta because the momentum during the interval of the rotation duration Ta is equal to that during the interval of a rotation duration Tb. However, in this case, the force sense varies logarithmically to reduce the sensitivity. This makes the integral of the sense value closer to zero during the interval of the rotation duration Ta.

Thus, the force sense during the interval of the rotation duration Tb relatively increases, improving the continuity of the force sense 905 in one direction. As a result, the force sense can be freely continuously presented in any direction by appropriately selecting the operation points A and B, appropriately setting the operation point A duration and the operation point B duration, and adjusting the synchronous phases of the two eccentric rotors A and B.

Figure 10:
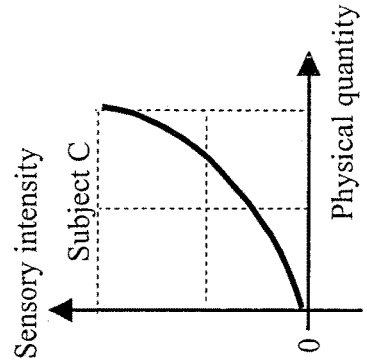
FIG. 10 is a diagram illustrating individual differences in illusionary tactile force sense.
Figure 10:
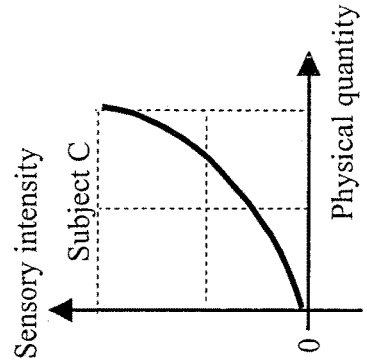
Figure 10:
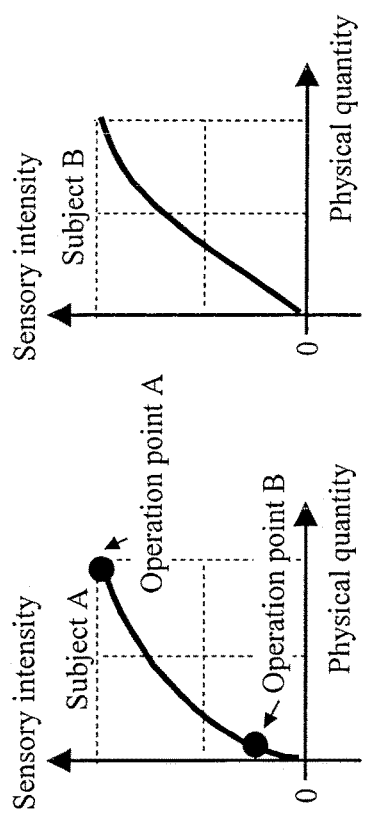
Figure 10:
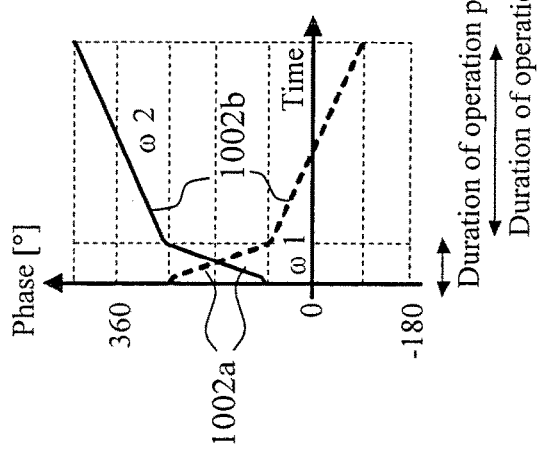
Figure 10:
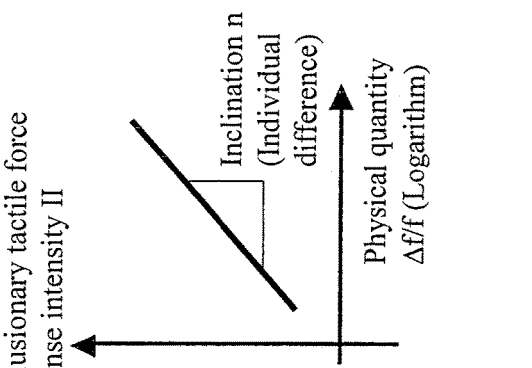
Figure 10:
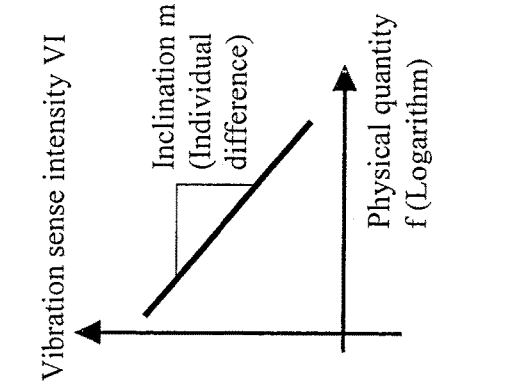

The sensory characteristics vary depending with the user as shown in FIGS. 10(*a*) to 10(*c*). Thus, some users clearly perceive the illusionary tactile force sense, others have difficulty perceiving the illusionary tactile force sense. Some users have their perceptions improved through learning. The present invention includes a device configured to correct a possible individual difference. Furthermore, if the same stimulus is sustainably presented, the user may become insensitive to the stimulus. Hence, it is effective to apply fluctuation to the intensity, period, or direction of the stimulus to prevent the user from becoming dull with the stimulus.

FIG. 10(*d*) shows an example of a technique to present a force in a fixed direction using the illusionary tactile force sense. In this method, two eccentric rotors are rotated in the opposite rotating directions to synthesize vibration components. If a high rotation number $\omega 1$ (high frequency f1) 1002*a* at the operation point A and a low rotation number $\omega 2$ (low frequency f2) 1002*b* at the operation point B are alternately presented for every 180° of phase shift, an illusionary tactile force sensory intensity (II) is proportional to the logarithm of the acceleration and deceleration ratio $\Delta f/f$ of the frequencies of the eccentric rotors, which correspond to the rotating velocities thereof (FIG. 10(*e*)). Here, (f=(f1+f2)/2, $\Delta f$=f1−f2). An inclination (n) obtained when the illusionary tactile force sensory intensity and the logarithmic value of $\Delta f/f$ are plotted indicates an individual difference.

Furthermore, a vibration sensory intensity (VI) indicates the intensity of a vibration component perceived simultaneously with the perception of an illusionary force sense in a fixed direction. The intensity of the vibration component is approximately inversely proportional to the physical quantity (logarithm).

Increasing the frequency (f) relatively reduces the vibration sensory intensity (VI) (FIG. 10(f)). When the illusionary tactile force sense is presented, the feel of the force is changed by controlling the contained intensity of the vibration component. An inclination (m) resulting from a logarithmic plot indicates an individual difference. (n) and (m) indicative of individual differences vary as learning progresses and converge to given values when the leaning is saturated.

Figure 11:
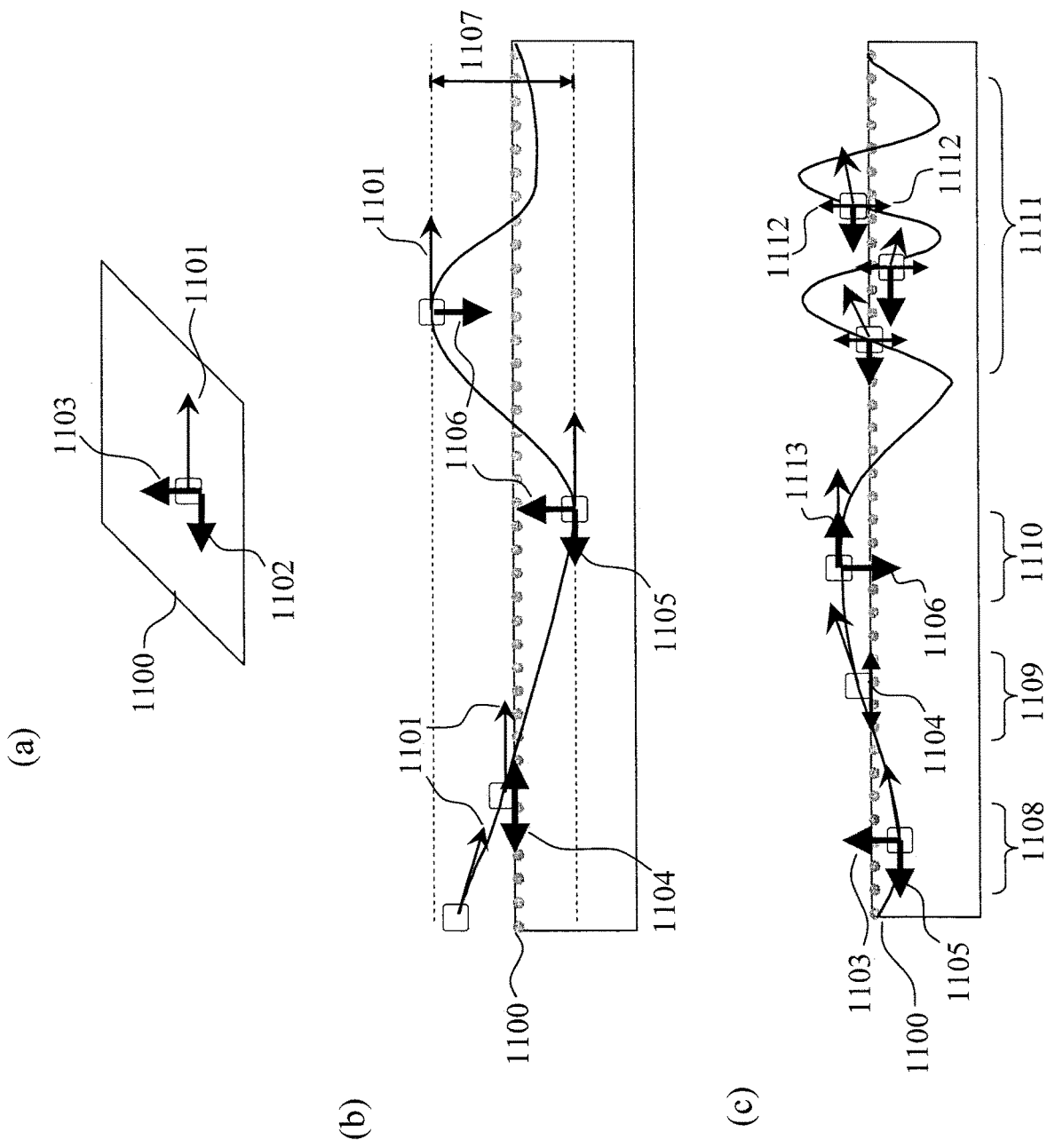
FIG. 11 is a diagram illustrating the texture expression of a virtual plate.

FIGS. 11(a) to 11(c) show a method for expressing the texture of a virtual plate 1100. The motion (positional or postural angle, velocity, and acceleration) of the illusionary tactile force sense interface device 101, monitored by sensing, indicates the motion 1101 of the virtual object. When the direction, intensity, and texture parameters (contained vibration components) of resistance 1102 based on the illusionary tactile force sense are controlled in response to the motion of the virtual object, a sense of friction 1109 and a sense of roughness 1111, which correspond to the texture of the virtual plate, and the shape of the virtual plate are controlled.

FIG. 11(a) shows resistance 1103 generated when the virtual object (illusionary tactile force sense interface device 101) is moved on the virtual plate 1100, and resistance 1102 that acts against the movement.

FIG. 11(b) shows that dynamic friction and static friction are vibrationally repeated by a frictional force 1104 that acts between the illusionary tactile force sense interface device 101 and the virtual plate 1100 when the device 101 and the plate 1100 come into contact. Furthermore, the presence and shape of the virtual plate are allowed to be perceived by feedback-controlling and presenting resistance 1106 that acts to push back the illusionary tactile force sense interface device 101 so that the device 101 remains within the thickness error 1107 of the virtual plate. The presence of a wall is allowed to be perceived by avoiding presenting the pushback reaction force when the illusionary tactile force sense interface device 101 is not present in the virtual plate 1100, and presenting the pushback resistance only when the illusionary tactile force sense interface device 101 is present in the virtual plate 1100.

FIG. 11(c) shows a method for expressing surface roughness. Resistance is presented in accordance with the moving velocity and acceleration, in the direction opposite to that 1101 in which the illusionary tactile force sense interface device 101 is moved. Thus, a sense of resistance and a sense of viscosity 1108 are allowed to be perceived. Presenting a negative reaction force in the same direction as that of the movement (acceleration force 1113) allows emphasis of such a sense of smoothness 1100 for the virtual plate as felt during sliding on the ice. The sense of acceleration and smoothness 1110 is difficult to present using a conventional non-base type tactile force sense interface device that uses a vibrator. The sense of acceleration and smoothness 1110 corresponds to the texture and effects realized by the illusionary tactile force sense interface device 101 that uses illusions. Furthermore, the resistance is vibrationally changed (vibrational resistance 1112) to allow a sense of surface roughness 1111 for the virtual plate to be perceived.

FIG. 12(a) shows the direction of the illusionary tactile force sense evoked and perceived by the initial phase ($\theta i$) of a phase pattern.

The illusionary tactile force sense device 107 can change the initial phase ($\theta i$) at the start of rotation in FIG. 12(b) to control the direction 1202 of the illusionary tactile force sense evoked by a change in the momentum synthesized by the eccentric rotors, to the direction of the initial phase ($\theta i$). For example, changing the initial phase ($\theta i$) as shown in FIG. 12(c) allows the illusionary tactile force sense to be evoked in any direction within the angular range of 360° in the plane.

In this case, if the illusionary tactile force sense interface device 101 itself is heavy, an upward force sense 1202 resulting from the illusionary tactile force and a downward force sense 1204 resulting from the gravity offset each other. In this case, an illusionary tactile force sense 1203 is evoked such that the upward direction thereof resulting from the illusionary tactile force sense is slightly misaligned with the direction opposite to that of gravity. Consequently, a sense of lifted can be inhibited from being reduced or hindered.

To be presented in the direction opposite to the direction of gravitational force, the illusionary tactile force sense may be alternately evoked in directions slightly misaligned with the vertical one and corresponding to angles of $180°+\alpha°$ and $180°-\alpha°$.

Figures 1, 13:
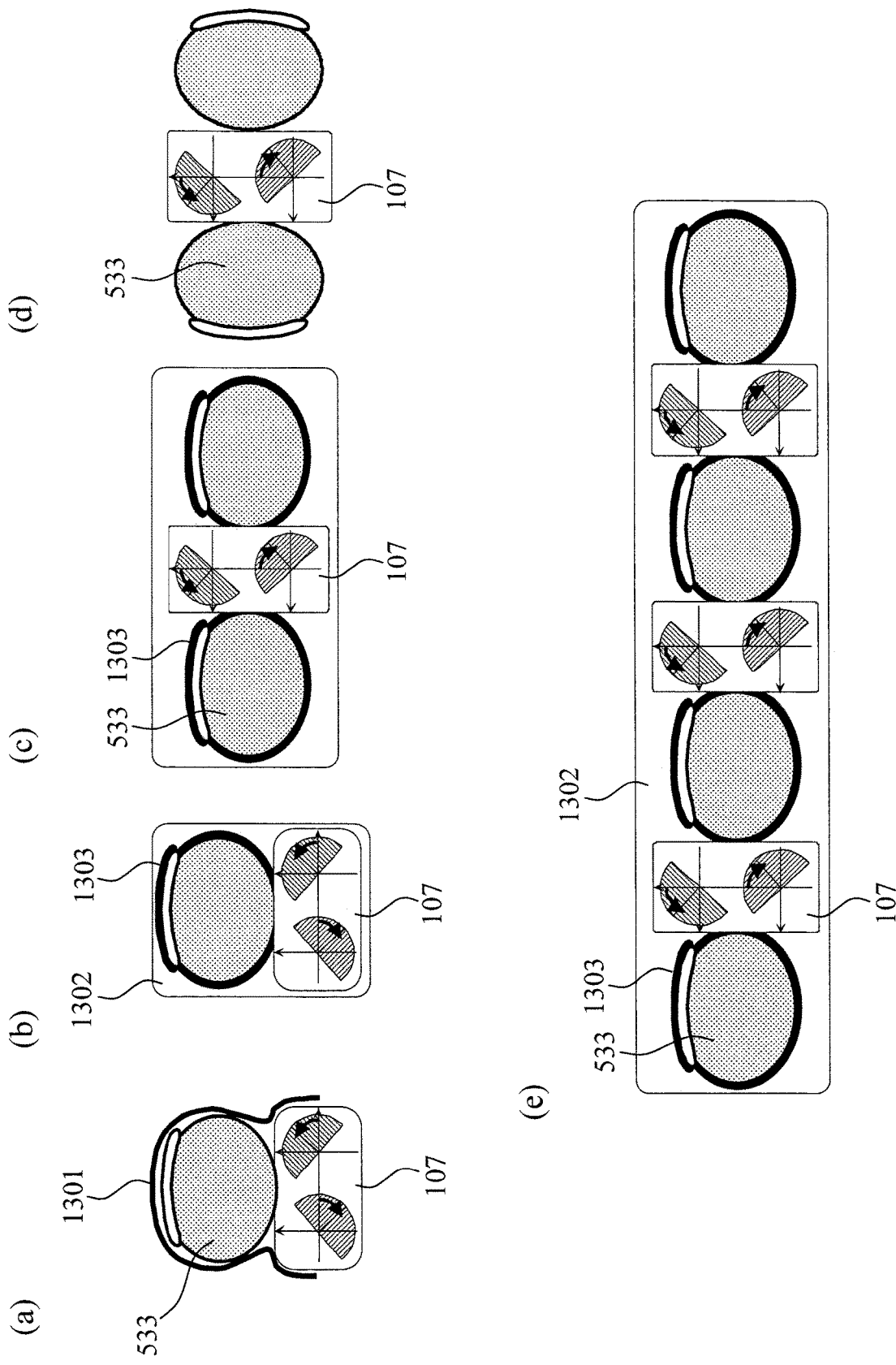
Figures 2, 13:
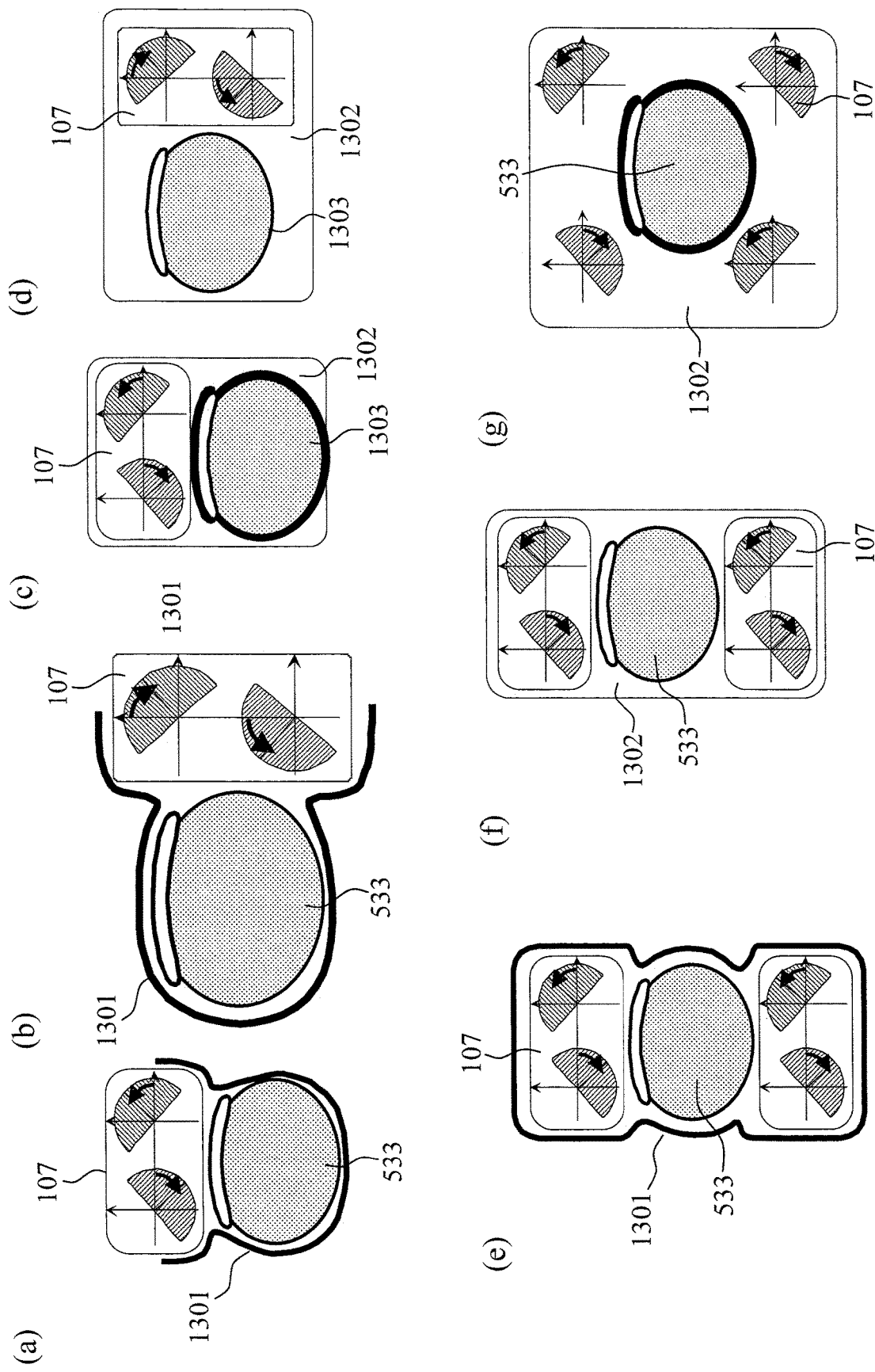

FIG. 13-1(a) to 13-2(g) show examples in which the illusionary tactile force sense interface device 101 is implemented.

As shown in FIGS. 13-1(a) and 13-1(b), the device is installed on the fingertip 533 using an adhesion tape 1301 or a finger insertion section 1303 of a housing 1302. Alternatively, the device may be installed between the fingers 533 (FIGS. 13-1(c) and 13-1(e)) or sandwiched between the fingers 533 (FIG. 13-1(d)). The housing 1302 may be formed of a hard material unlikely to be deformed, an easily deformable material, or viscoelastic slime. Possible variations of the installation method are shown in FIGS. 13-2(a) to 13-2(g). In FIGS. 13-2(e) to 13-2(g), flexible adhesion and a flexible housing are used to control the phases of two basic units of the illusionary tactile force sense device. This allows expression of lateral and vertical force senses in the lateral and vertical directions but also a sense of expansion, compression, and pressure. The adhesion tape, the housing with the finger insertion section, or the like which allows the illusionary tactile force sense interface device 101 to be installed on the user's body is called an installation section. Instead of being the adhesion tape or the housing with the finger insertion section, the installation section may have any form like a seat, a belt, or tights provided that the installation section can be installed on an object or the user's body. The illusionary tactile force sense interface device 101 may similarly be installed all over the user's body, for example, on the fingertip, the hand, the arm, and the thigh.

The terms "viscoelastic material" and "viscoelastic characteristics" refer to viscosity and/or elasticity.

Figure 14:
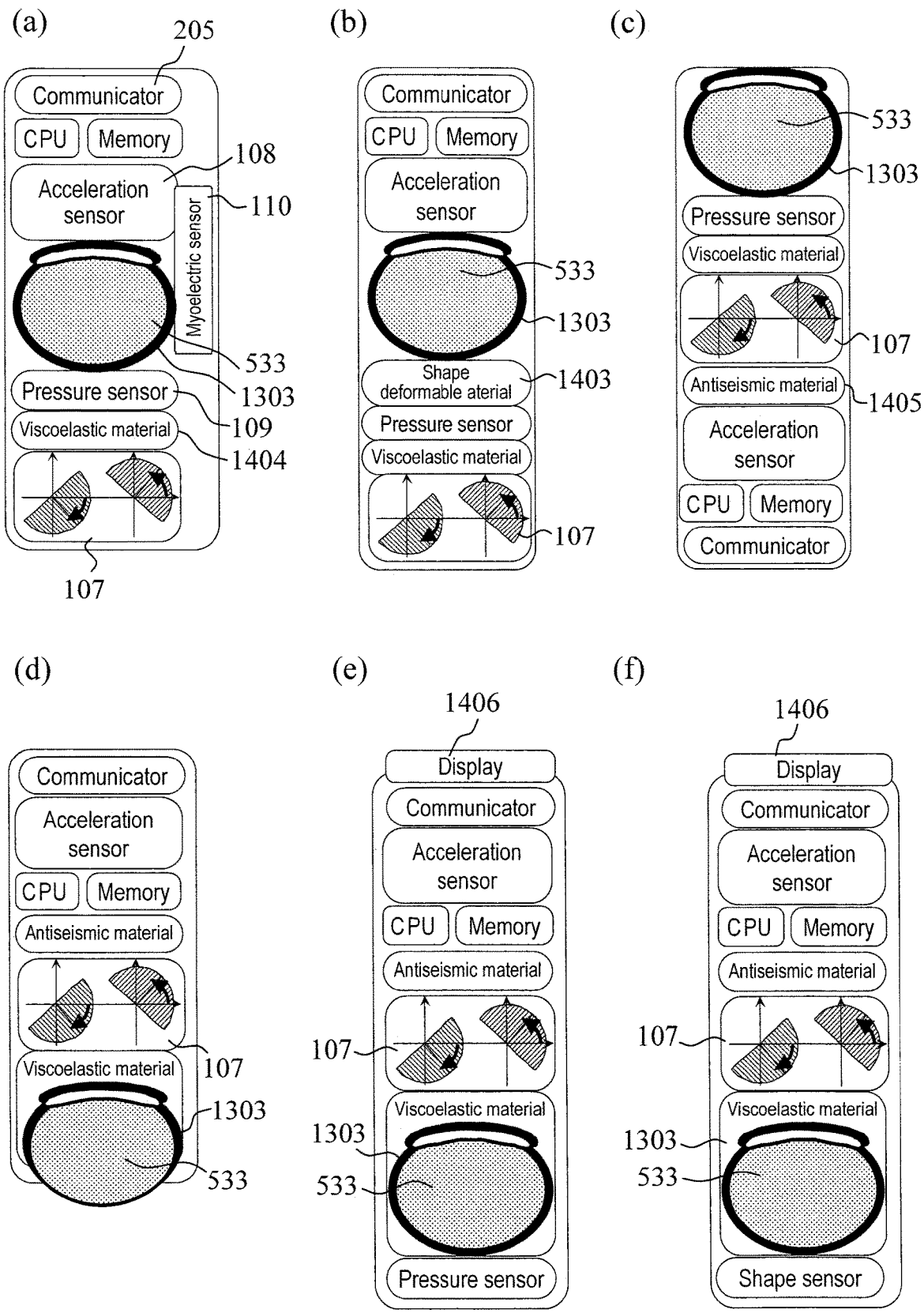
FIG. 14 is a diagram illustrating an embodiment of the illusionary tactile force sense interface device.

FIG. 14 shows another example in which the illusionary tactile force sense interface device 101 is implemented.

In FIG. 14(a), the illusionary tactile force sense device 107, which generates vibration, may be detected as noise vibration by the acceleration sensor 108. Thus, the illusionary tactile force sense device 107 is located opposite the acceleration sensor 108 across the finger 533 to reduce the adverse effect of vibration on the acceleration sensor 108. Furthermore, possible mixed noise is also reduced by canceling noise vibration detected by the acceleration sensor 108 based on a control signal from the illusionary tactile force sense device 107.

In FIGS. 14(c) to 14(e), an antiseismic material 1405 is interposed between the illusionary tactile force sense device 107 and the acceleration sensor 108 to suppress mixture of noise vibration.

FIG. 14(d) shows the illusionary tactile force sense interface device 101 configured to allow the user to perceive the illusionary tactile force sense while touching the real object. The illusionary tactile force sense interface device 101 adds the illusionary tactile force sense to a sense of touching the real object. A conventional data globe presents a force sense when in response to a presented tactile force sense, by installing a wire on the finger and then pulling the finger. When the data globe is used to present the tactile force sense while the user is touching the real object, for example, the finger may leave the real object or gripping may be hindered. This makes a combination of the feels of the real and virtual objects difficult. The illusionary tactile force sense interface device 101 prevents this and realizes a composite sense (mixed reality) including the feel of the real object firmly gripped by the user and the virtual feel simultaneously.

In FIG. 14(e), the illusionary tactile force sense is added in accordance with a contact pressure and a grip pressure exerted on the real object and measured by the pressure sensor 109. Hence, the feel of gripping of and a touch with the real object are edited or substituted into the feel of the virtual object 531. In FIG. 14(f), instead of the pressure sensor in FIG. 14(e), a shape sensor (for example, a photo sensor) configured to measure the surface shape or shape transformation is used to measure the shape or surface shape of a gripped object which are related to touch feeling and to measure a grip force, a distortion and shear force, and touch based on deformation. Thus, tactile magnifying glass is implemented which is configured to emphasize the measured stress, shear force, or surface shape. Then, a small surface shape can be visually checked on the display as in the case of a microscope and haptically checked. Furthermore, using a photo sensor as a shape sensor allows the shape to be remotely measured without touching. Consequently, the shape of an object in a remote location can be haptically felt by holding the hand over the object remotely.

Furthermore, with variable touch buttons with commands on a touch panel varying depending on usage and a context, the following may occur. In particular, for example, when the user attempts to depress any button and if the button is hidden under the finger, as in the case of a cellular phone, the variable command on the button may be hidden and may not be read. Similarly, upon attempting to depress any variable button in a virtual space for VR contents, the user may fail to check the command contents of the button since menu description and commands vary depending on the context. Thus, as shown in FIG. 14(e), the command contents of the button are shown on a display 1406 on the illusionary tactile force sense interface device 101. Consequently, the user can depress the illusionary tactile force button while checking the command contents of the button.

To allow the user to manipulate the virtual controller with information on the depression of the virtual object 531 or the virtual buttons in the virtual controller and with a depression reaction force without feeing wrongness, as in the case of the real object, the time delay between the depression and the presentation of the depression reaction force is to be solved. For example, in an arm type grounding force sense interface, the position of the gripping finger is measured based on the angle of the arm or the like, and the stress to be presented is calculated. Then, the rotation of the motor is controlled, and the motion and stress of the arm are presented. Hence, a response delay may occur. In particular, the buttons are reflexively quickly manipulated during a game, and monitoring and control on the content side may delay manipulations. Thus, the illusionary tactile force sense interface device 101 comprises the CPU and memory configured to monitor the sensors (108, 109, and 110) and to control the illusionary tactile force sense device 107 and the viscoelastic material 1404, enabling real-time control. This improves responsiveness in the depression of the virtual button and the like, thus enhancing reality and manipulability.

Furthermore, the illusionary tactile force sense interface device 101 includes a communicator 205 configured to communicate with another illusionary tactile force sense interface device 101. For example, if the illusionary tactile force sense interface device 101 is installed on each of five fingers, each of the illusionary tactile force sense interface devices is deformed in conjunction with the motion of the corresponding finger owing to the shape deformable material (1403 in FIG. 14(b)). Furthermore, the virtual controller is transformed and touched and the virtual buttons are manipulated in real time, thus enhancing the reality and manipulability.

In FIG. 14(a), to effectively utilize the hysteresis characteristics of the relevant sense and muscle, a myoelectric sensor 110 is used to measure myoelectric reactions. Thus, the illusionary tactile force sense evoking function is corrected in a feedback manner such that the time for the muscle contraction is shorten and the intensity of the contraction is increased. Factors that affect the evocation of the illusionary tactile force sense include the manner of installing the illusionary tactile force sense interface device 101 on the finger or hand (the manner of sandwiching the illusionary tactile force sense interface device 101 between the fingers and the intensity of the sandwiching) and the manner in which the user applies a force to the arm in receiving a force from the illusionary tactile force sense interface device 101. The sensitivity for the illusionary tactile force sense varies among individual users. Some users are sensitive to the illusionary tactile force sense when gently holding the device. Other users are sensitive to the illusionary tactile force sense when firmly holding the device. Likewise, the sensitivity varies depending on the manner of tightening the device at installation. To absorb possible individual differences, the pressure sensor 109 or the myoelectric sensor 110 is used to monitor the status of holding to measure the individual difference, while correcting the illusionary tactile force sense evoking function in real time. As the user gets familiar with and learns physical simulation in the content, the user's learning progresses so that the user can appropriately hold the device. The present correction is effective for promoting the learning.

In FIGS. 14(a) to 14(e), the illusionary tactile force sense interface device 101 is shown thicker in order to show the component formation. However, the components can be used for a sheet-like thin type.

Figure 15:
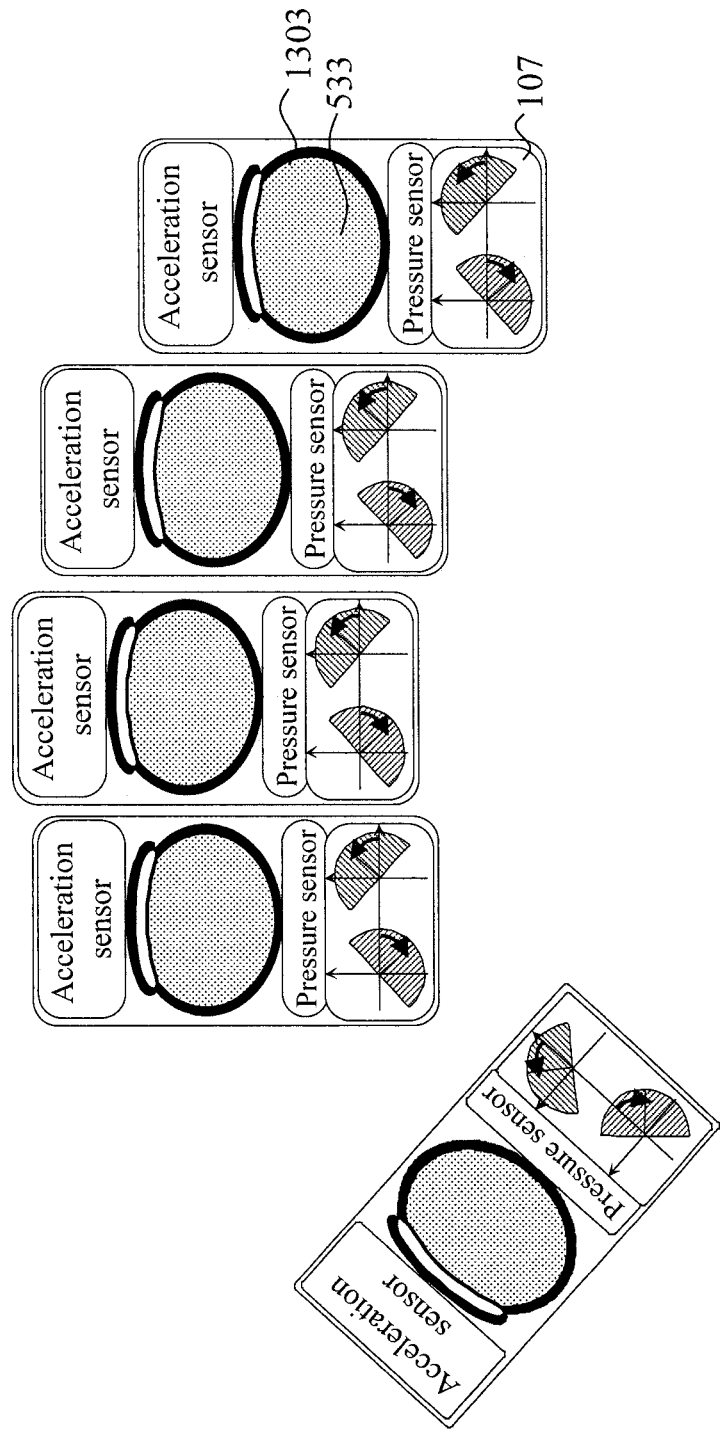
FIG. 15 is a diagram illustrating an implementation example of the illusionary tactile force sense interface device.

FIG. 15 shows an implementation example in which the illusionary tactile force sense interface device 101 is installed on the fingertip 533 of each of five fingers.

The present implementation example is characterized as follows. An illusionary tactile force sense interface device mounted in a controller for a conventional game machine simply changes the intensity or frequency of vibration. However, according to the present implementation scheme, an illusionary tactile force sense presenting technique is used to enable the user to continuously perceive a force in a fixed direction. This characteristic is used to feedback-control the direction and magnitude of the illusionary tactile force in accordance with the motion of the finger 533 and the hand by means of the method shown in FIG. 11. Thus, the presence and feel of the virtual object 531 are presented to the fingertip or into the hand. Furthermore, the acceleration sensor 108, the position sensor 111, and the like are used to detect the motion of the finger 533, allowing the illusionary tactile force sense to be feedback-controlled. Then, a sense of gravitational force, a sense of mass, and forces can be continuously presented in a fixed direction. Hence, the interface, however which is of a non-base type, can present the presence, shape, and feel of the virtual object 531.

Figure 16:
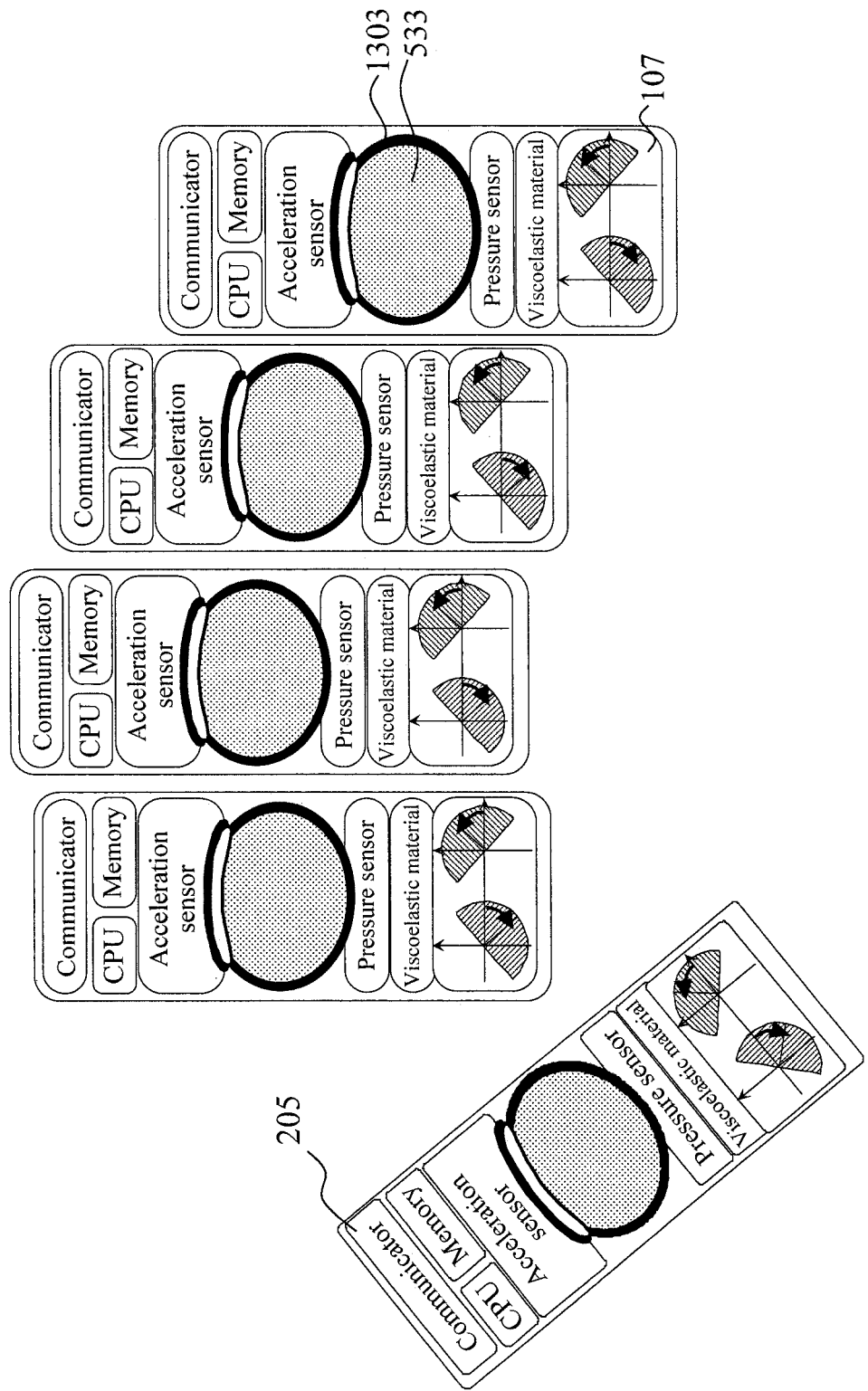
FIG. 16 is a diagram illustrating an implementation example of the illusionary tactile force sense interface device.

FIG. 16 is an implementation example different from that shown in FIG. 15. The CPU, the memory, and the communicator 205 are mounted in each illusionary tactile force sense interface device 101. The illusionary tactile force sense interface devices 101 can communicate with one another at high speed to cooperate in presenting information on the illusionary tactile force sense.

If the illusionary tactile force sense interface device 101 is used to input choices and intensions through gestures, inputting gestures interactively with the virtual object 531 enables intuitive gesture inputs and manipulations.

The illusionary tactile force sense interface device 101 can be installed not only on the finger 533 or the user's body but also on all articles such as writing utensils such as pencils and ink brushes, convenience goods such as tooth brushes, and toys such as stuffed animals. For example, the illusionary tactile force sense interface device 101 may be installed on or built into the hand of a stuffed animal so that upon holding the hand of the stuffed animal, the user can feel pulled or pushed by the stuffed animal. Furthermore, the illusionary tactile force sense interface device 101 can be used for training on the use and handling of a pencil or an ink brush.

Each illusionary tactile force sense interface device serves as a controller, and an aggregate of illusionary tactile force sense interface devices also forms a large controller. Thus, various forms of controllers can be implemented.

FIG. 17(a) shows an example of a control system for the illusionary tactile force sense interface device 101.

In accordance with the texture in the content information to be presented, an illusionary tactile force sense evoking function is generated based on the information stored in an illusionary tactile force sense database 1710. The generated function is corrected by a corrector 1702 based on the user's characteristics and the position, acceleration, and pressure information from the illusionary tactile force sense interface device 101. The function is then converted into a control signal by a motor controller 1703 that is a controller for the illusionary tactile force sense device 107. In accordance with the control signal, motors 1704 connected to the eccentric weights are driven. An encoder 1705 monitors the rotation phase, and the motor controller 1703 feedback-controls the motor so that the motor rotates appropriately. This rotation and phase pattern evokes an illusionary tactile force sense.

Furthermore, in order to improve the illusionary tactile force sense evoking effect, the following method is used instead of the illusionary tactile force sense device 107 configured to generate an acceleration and deceleration pattern. That is, viscoelastic characteristics controller 1706 convert the function into a control signal so that the properties of a viscoelastic material are controlled in accordance with the control signal. When the viscoelastic characteristics of the viscoelastic material 1407 are temporally varied, even eccentric rotors configured to rotate at a constant velocity allow the same effect as that of the above-described rotation and phase pattern to be evoked based on motional characteristics of eccentric weights obtained via the viscoelastic material 1407.

The present invention is not limited to the above-described two schemes. Any material and method may be used provided that the material and method allow the vibration and momentum to be varied in accordance with a control pattern for evoking an illusionary tactile force sense.

FIG. 17(b) shows an equal-sensory-level contour for the illusionary tactile force sense recorded in the illusionary tactile force sense database 1710. When a sense quantity for a reaction force (−f) determined as a result of the physical simulation in the content is, for example, 30 dB, an illusionary tactile force sense evoking function F is generated as follows. The equal-sensory-level contour of the illusionary tactile force sense stored in the illusionary tactile force sense database is used to calculate a physical intensity of 15 dB (1725) at which an illusionary tactile force sense level equivalent to the sense quantity of 30 dB is evoked.

The illusionary tactile force sense evoking function F 1713 generated by the illusionary tactile force sense evoking function generator is determined based on a direction vector $u(x,y,z)$ for the direction in which a force is to be presented, an illusionary tactile force sensory intensity II, the vibration sensory intensity VI, and response characteristics $R(P,I,D)$. Thus, a phase pattern $\theta(t)=F(u, II, VI, R)$ is calculated which is required to control the rotational acceleration and deceleration of the eccentric rotors. In this case, P, I, and D denote a proportional gain, an integration gain, and a differentiation gain for PID control, respectively (a specific calculation method is shown in the embodiment in FIG. 35).

Correction data 1714 is saved to a user characteristics database 1711; the correction data 1714 is obtained from the above-described equal-sensory-level contour of the illusionary tactile force sense and the equal-sensory-level contour of user's own illusionary tactile force sense. The correction data is read by the corrector 1702 and used to correct a possible individual difference. Furthermore, the sensitivity S ($S=S(CP, PG, FI)$) for the illusionary tactile force sense varies depending on the contact pressure CP between the fingertip and the illusionary tactile force sense interface device 101, the adverse effect PG of the gravitational force in connection with the posture, and an inertia force FI resulting from acceleration when the device is moved. The sensitivity S is determined through preliminary subject experiments and saved to the illusionary tactile force sense data 1710. Then, correction is performed by adding the correction data 1714 to the sensitivity S as an increase in threshold for the equal-sensory-level contour of illusionary tactile force sense. As a result, a corrected illusionary tactile force sense evoking function is determined.

Figure 18:
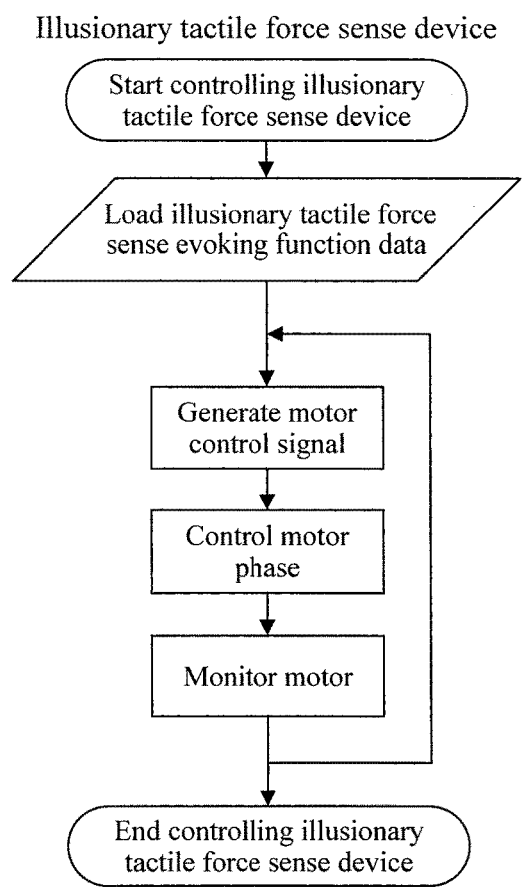
FIG. 18 is a diagram illustrating a process flowchart for an illusionary tactile force sense device.
Figure 18:
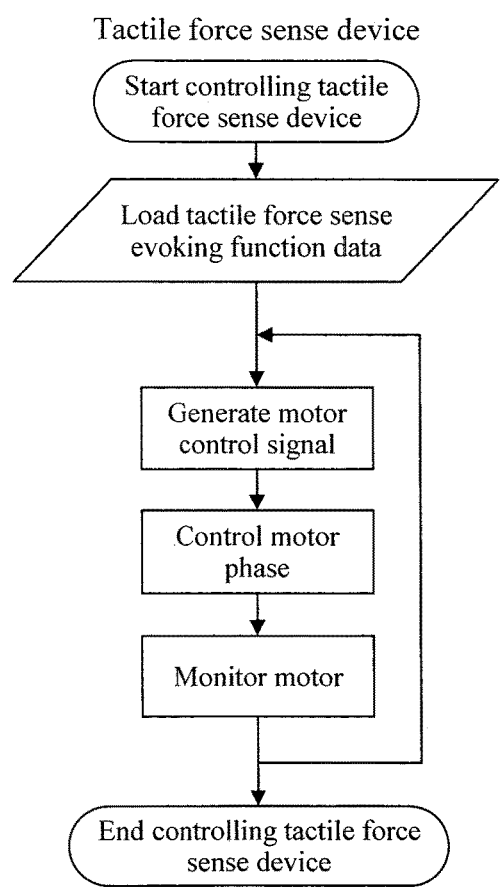

FIG. 18 shows process flowcharts for the illusionary tactile force sense device and the tactile force sense device.

In the illusionary tactile force sense device 107, based on the illusionary tactile force sense evoking function and the illusionary tactile force sense function data 1710, the motor 1704, which allows illusionary tactile force sense information to be presented, is feedback-controlled to present the desired sense.

The illusionary tactile force sense device 107 also has the function of presenting a tactile force sense (tactile force sense device). The illusionary tactile force sense and the tactile force sense are simultaneously presented to exert a synergetic effect for improving texture.

Figure 19:
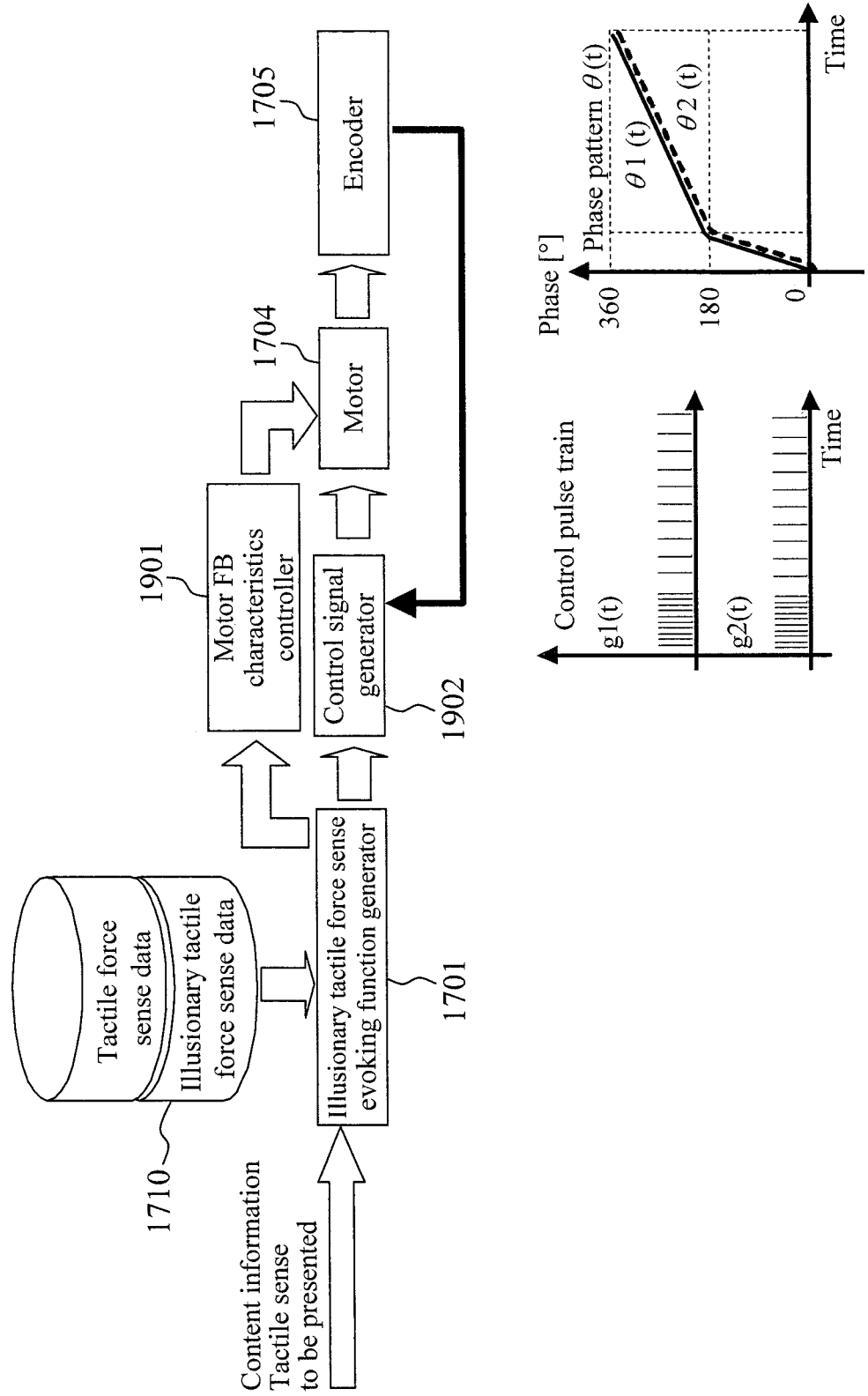
FIG. 19 is a diagram illustrating a motor control device that uses a pulse train.

FIG. 19 shows an example of control of the illusionary tactile force sense interface device 101.

In the present device, the motor 1704 is separately controlled by both a motor feedback (FB) characteristics controller configured to control the feedback characteristics of the motor 1704 and a control signal generator configured to convert an illusionary tactile force sense evoking pattern into a motor control signal. In the present invention, controlling the synchronization of the phase pattern $\theta(t)=F(u, II,$ VI, R) for the motor rotation is important. The synchronization needs to be temporally precisely controlled. Here, as an example of the corresponding technique, position control based on a control pulse train for a servo motor is shown. If a step motor is used for position control, rapid acceleration or deceleration often easily causes a loss of synchronism and makes the step motor uncontrollable. Thus, here, pulse position control based on a servo motor will be described. In the present invention, the control of the motor feedback (FB) control characteristics and the motor control based the pulse position control method are separately performed to allow a large number of illusionary tactile force sense interface devices 101 to be utilized through synchronous control. Thus, the present invention ensures scalability which allows the following to be easily dealt with: the consistency of the motor control signal for different motors used, an increase in the velocity at which an illusionary tactile force sense evoking pattern is generated, and an increase in the number of control motors to be synchronously controlled. Furthermore, a possible individual difference can be easily corrected.

The illusionary tactile force sense evoking function generator 1701 separates the illusionary tactile force sense evoking function into a control signal for the motor FB characteristics controller and a control signal for the motor control signal generator. The motor control signal generator generates a pulse signal train gi(t)=gi(f(t)) allowing the phase position of the motor to be controlled. Thus, the phase pattern θ(t) for the motor is controlled.

According to the present scheme, the rotation phase of the motor is feedback-controlled based on the number of pulses. For example, one pulse allows the motor to rotate by 1.8°. Either forward rotation or backward rotation is selected depending on a direction control signal. This pulse control technique is used to control any acceleration and deceleration pattern (rotating speed and rotation acceleration) at any phase timing with the phase relationship between at least two motors maintained.

FIGS. 20(a) to 20(f) show an example of control of the illusionary tactile force device (tactile force device) which allows a basic tactile force sense and a basic illusionary tactile force sense to be presented.

FIG. 20(a) schematically shows a method of generating a rotational force in the illusionary tactile force sense device 107. FIG. 20(d) schematically shows a method of generating a translational force in the illusionary tactile force sense device 107. The two eccentric weights 814 shown in FIG. 20(a) rotate in the same direction with a phase lag of 180° between the eccentric weights 814. In contract, in FIG. 20(d), the eccentric weights rotate in the respective opposite directions.

(1) As shown in FIG. 20(b), if the two eccentric rotors are synchronously rotated in the same direction with a phase lag of 180°, the eccentric rotors are point symmetric. Thus, for the two eccentric rotors, the center of gravity and the center of the rotating shaft are the same, allowing non-eccentric iso-torque rotation to be synthesized. As a result, a sense of rotational force can be presented. However, the time differentiation of angular momenta corresponds to a torque, and the rotation speed of the motor needs to be continuously increased in order to continuously present the torque in a fixed direction. In actuality, the continuous presentation is difficult.

(2) As shown in FIG. 20(c), synchronous control with angular velocities ω1 and ω2 allows evocation of an illusionary tactile force sense of rotational force (continuous torque sense) which is continuous in a fixed direction.

(3) As shown in FIG. 20(e), if the eccentric rotors are synchronously rotated in the respective opposite directions, a force that vibrates linearly in any direction (simple harmonic motion) can be synthesized by controlling an initial phase θi 1201.

(4) As shown in FIG. 20(f), if the eccentric rotors are synchronously rotated in the respective opposite directions at the respective angular velocities ω1 and ω2 in accordance with the sensory characteristics for the illusionary tactile force sense, an illusionary tactile force sense (continuous force sense) of translational force is evoked which is continuous in a fixed direction.

In the illusionary tactile force sense interface device 101, if the rotating speed (angular velocity) and the phase synchronization are adequately controlled in accordance with the user's sensory characteristics as shown in FIGS. 20(c) and 20(f), an illusionary tactile force sense can be evoked even by combining only two types of angular velocities (ω1 and ω2). Thus, the control circuit can be simplified.

Figure 21:
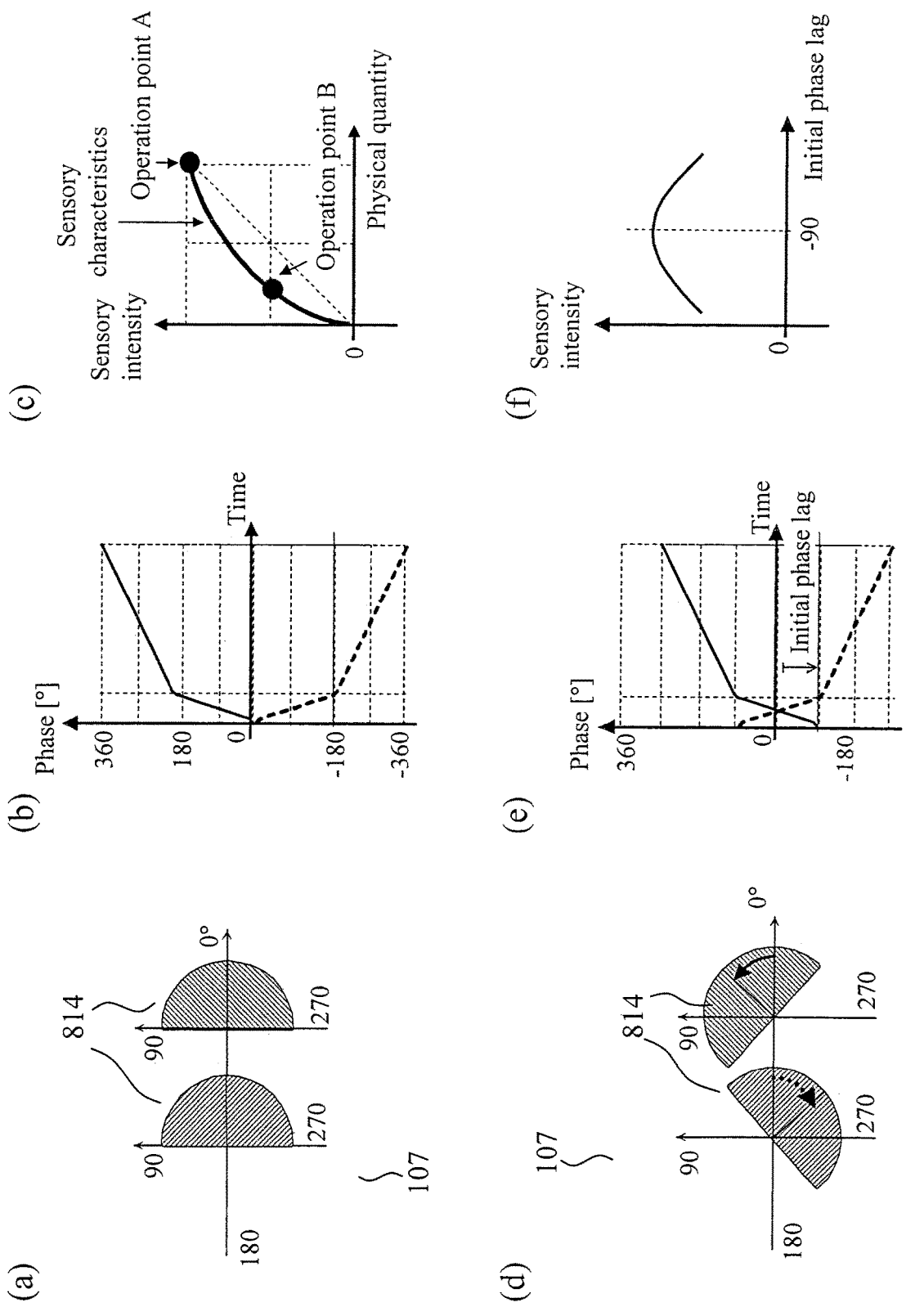
FIG. 21 is a diagram illustrating a control algorithm for initial phase lag.

FIG. 21 shows a variation in sensory intensity of the illusionary tactile force sense observed when the initial phase lag between the eccentric weights 814 in the illusionary tactile force sense device 107 is varied. FIGS. 21(a) and 21(b) show that no initial phase lag has occurred. FIGS. 21(d) and 21(e) show that an initial phase lag has occurred. FIGS. 21(a) and 21(d) schematically shows the phase relationship between the two eccentric weights 814. FIG. 21(c) shows the sensory characteristics, that is, the relationship between the amplitude of vibration generated by the illusionary tactile force device and the sensory intensity of the illusionary tactile force sense evoked by the illusionary tactile force device.

FIGS. 21(b) and 21(e) show that the initial phase lag between the eccentric rotors during acceleration and deceleration is 0° and −90°, respectively. The synthesized acceleration and deceleration pattern differs between FIGS. 21(b) and 21(e). In FIG. 21(e), the intensity of acceleration and deceleration (physical quantity (amplitude)) can be more significantly varied, thus allowing a higher illusionary tactile force sensory intensity to be presented. Controlling the initial phase lag as shown FIG. 21(f) allows the sensory intensity of the illusionary tactile force sense to be controlled.

Figure 22:
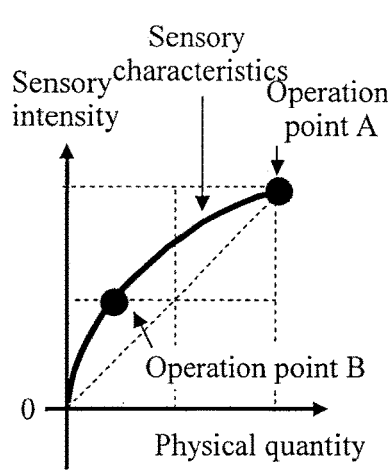
FIG. 22 is a diagram illustrating nonlinear characteristics used for the illusionary tactile force sense interface device.
Figure 22:
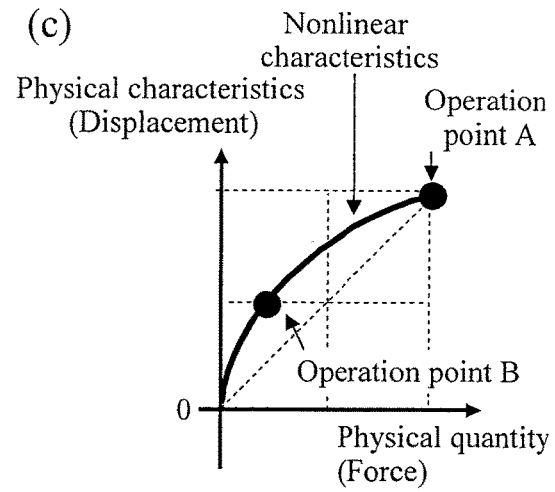
Figure 22:
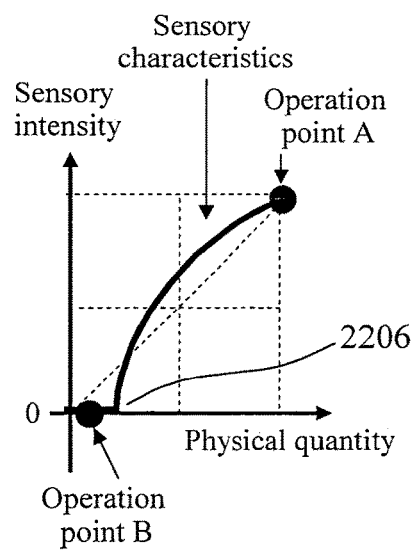
Figure 22:
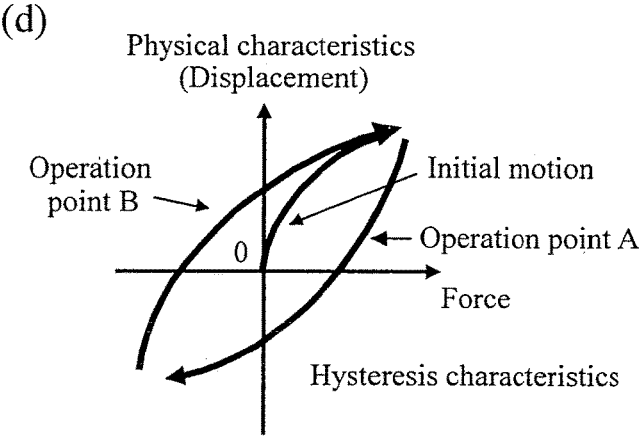

FIG. 22 shows nonlinear charactristics used for the illusionary tactile force sense interface device. Specifically, FIG. 22 shows the sensory characteristics (FIGS. 22(a) and 22(b)), the nonlinear characteristics of the viscoelastic material (FIG. 22(c)), and the hysteresis characteristics of the viscoelastic material (FIG. 22(d)).

As with FIG. 8, FIG. 22(b) is a schematic diagram showing the user's sensory characteristics with a threshold 2206 with respect to a physical quantity such as vibration or force. FIG. 22(b) shows that when the illusionary tactile force sense interface device is controlled taking the above-described characteristics into account, a sense that does not exist physically is evoked as an illusionary tactile force sense.

As shown in FIG. 22(c), a similar illusionary tactile force sense is evoked even when a material with physical properties including stress characteristics resulting from an applied force and exhibiting nonlinearity is sandwiched between the human skin or sensory organ and a device configured to generate a driving force such as vibration, torque, or force.

Furthermore, as shown in FIG. 22(d), the sensory characteristics are not isotropic but hysteretic when the quantity of displacement increases or decreases, for example, when the muscle is stretched or contracted. The pulled muscle is immediately strongly contracted. Generation of such significant hysteresis characteristics promotes similar evocation of an illusionary tactile force sense.

Figure 23:
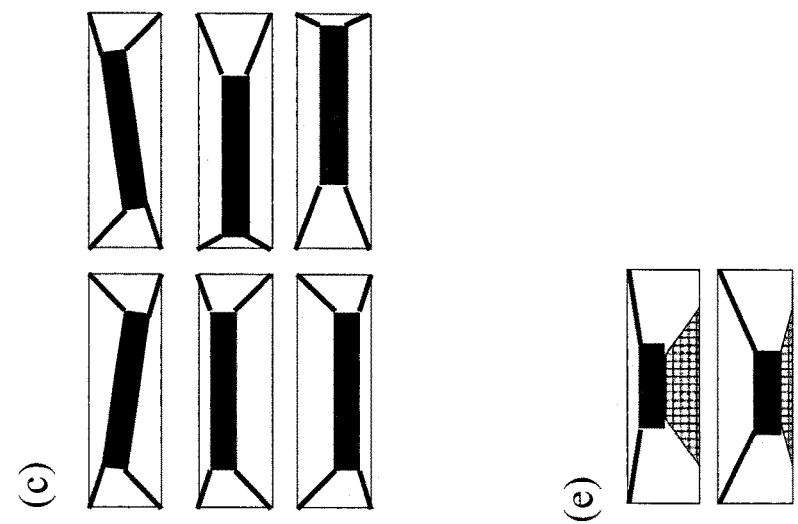
FIG. 23 is a diagram illustrating an alternative illusionary tactile force sense device.
Figure 23:
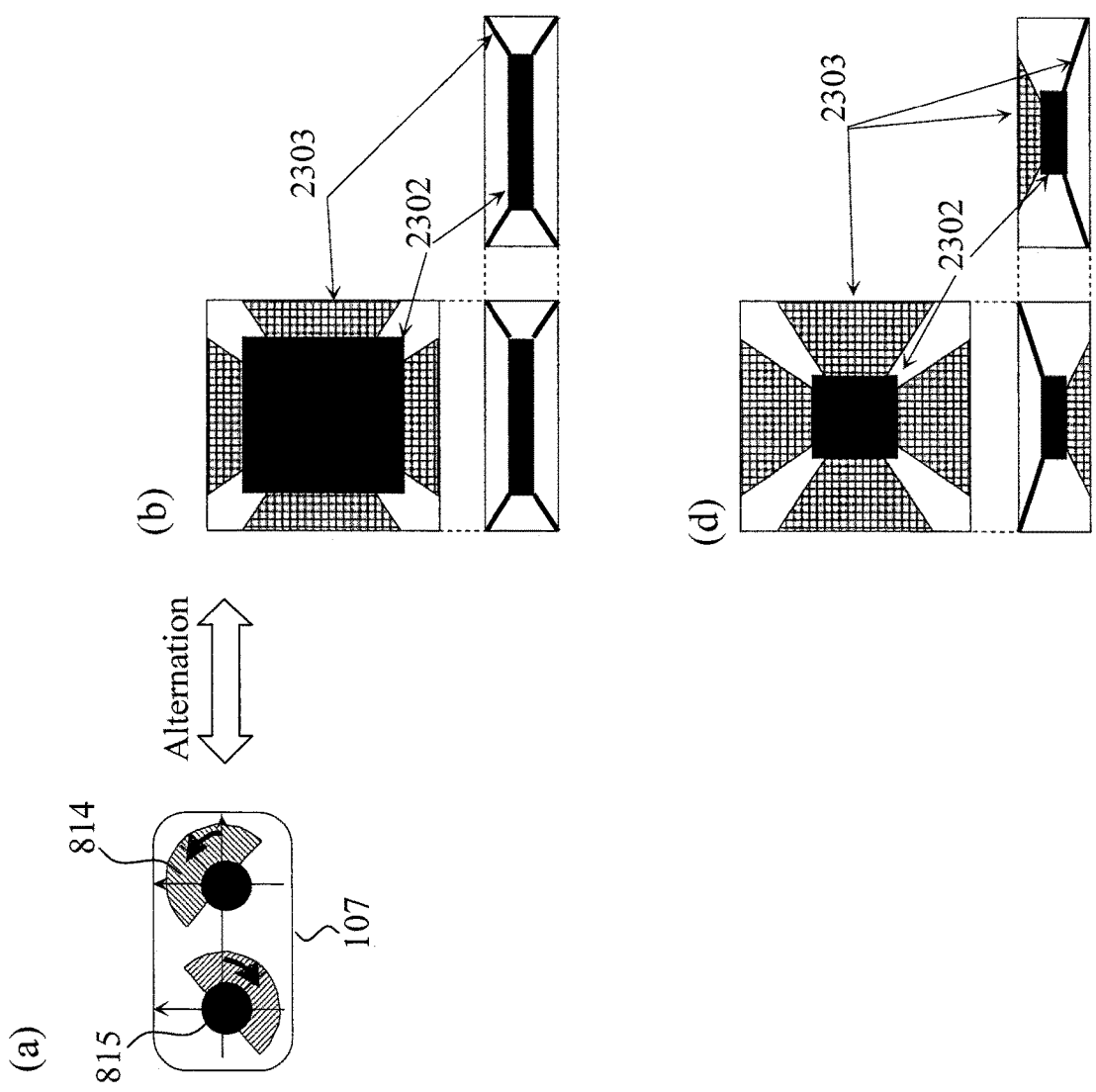

FIG. 23 shows an alternative of the illusionary tactile force sense device 107.

Instead of the eccentric weights 814 of the eccentric rotor and the eccentric motor 815 configured to drive the eccentric weights 814, the eccentric weights 814 and eccentric motor 815 all being shown in FIG. 23(a), a weight 2302 and a stretchable material 2303 are used in FIGS. 23(b) to 23(e). For example, each of FIGS. 23(b) and 23(d) shows a plan view, a front view, and a side view in which eight or four stretchable materials 2303, respectively, are used to support the weight 2302. In each of the figures, the weight can be moved in any direction by contracting and expanding the paired stretchable materials 2303. As a result, translational vibration and rotational vibration can be generated. Any structure can be used as an alternative provided that the structure includes an acceleration and deceleration mechanism configured to be able to controllably move the center of gravity translationally and to generate and control as a rotating torque.

Figure 24:
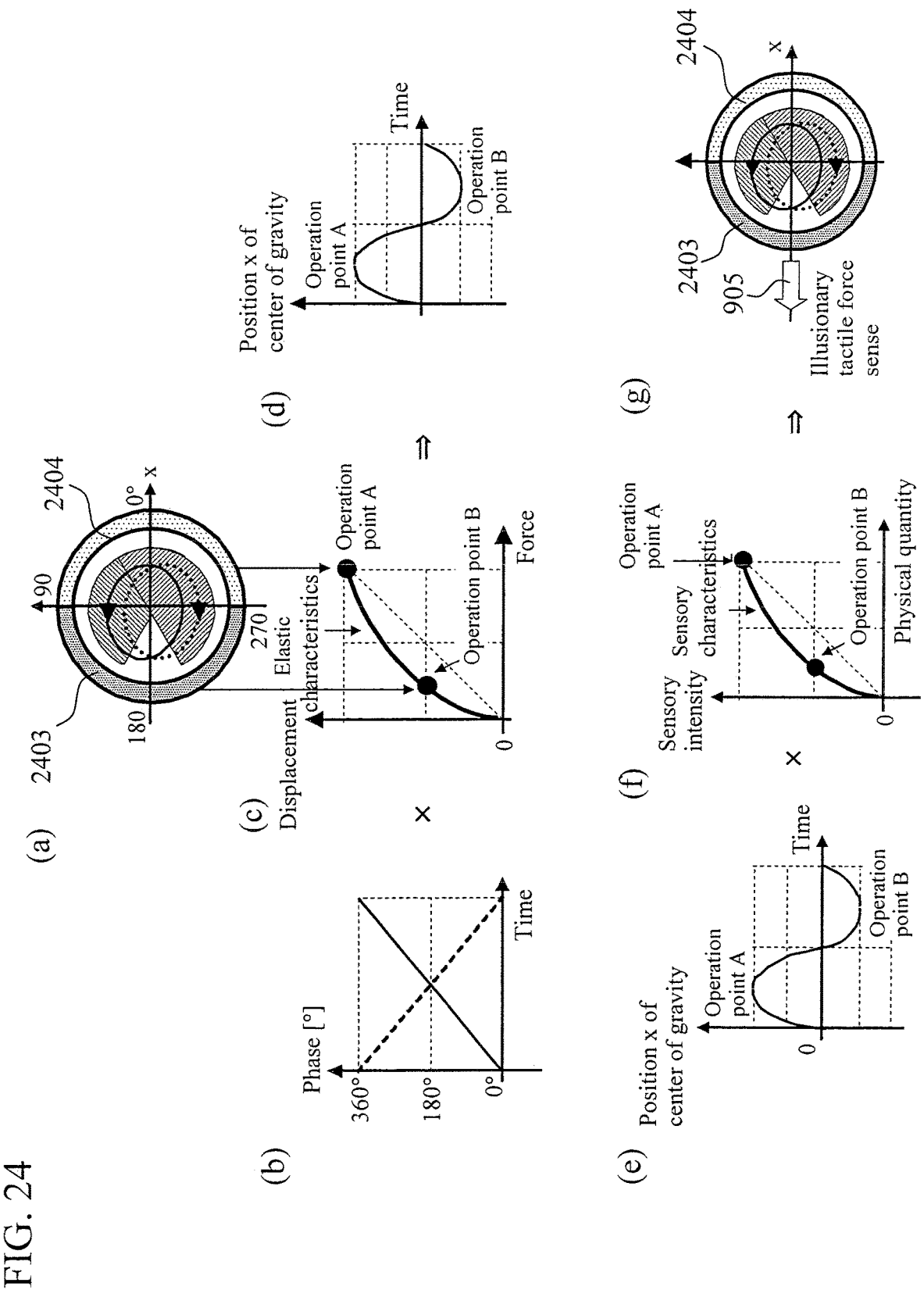
FIG. 24 is a diagram illustrating a control algorithm that uses different viscoelastic materials.

FIG. 24 shows a control algorithm that uses different viscoelastic materials.

As shown in FIG. 24(g), a similar illusionary tactile force sense 905 is evoked even when materials (2403 and 2404) with physical properties including stress characteristics resulting from an applied force and exhibiting nonlinearity (FIG. 24(c)) are sandwiched between the human skin or sensory organ and a device configured to generate a driving force such as vibration, torque, or force.

For example, as shown in FIG. 24(a), materials (2403 and 2404) with different stress-transformation characteristics are stuck to the surface of the illusionary tactile force sense device in an area corresponding to a phase of −90° to 90° and in an area corresponding to a phase of 90° to 270°, respectively. Then, even when the eccentric rotors rotate at a constant angular velocity (FIG. 24(b)), a force can be transmitted nonlinearly through the viscoelastic deformable material (FIG. 24(d)). As a result, as is the case with the acceleration and deceleration of the eccentric rotors, a presented force (physical quantity) differs between the area corresponding to the phase of −90° to 90° and the area corresponding to the phase of 90° to 270°, with a biased change occurring in the position of the center of gravity (x) (2402). This, in combination with the nonlinearity of the sensory characteristics (FIG. 24(f)), allows the user to feel the force 905 of an illusionary tactile force sense in one direction (FIG. 24g). The direction of the force of the illusionary tactile force sense depends on the positions where the different viscoelastic transformable materials are stuck. This method thus enables a reduction in energy consumption compared to the method of accelerating and decelerating the rotation speed. Furthermore, if the rotation is accelerated and decelerated with the rotation number not maintained constant, the viscoelastic materials (2403 and 2404) serve to enhance the effects of the illusionary tactile force sense. FIGS. 24(d) and 24(e) are the same.

Figure 25:
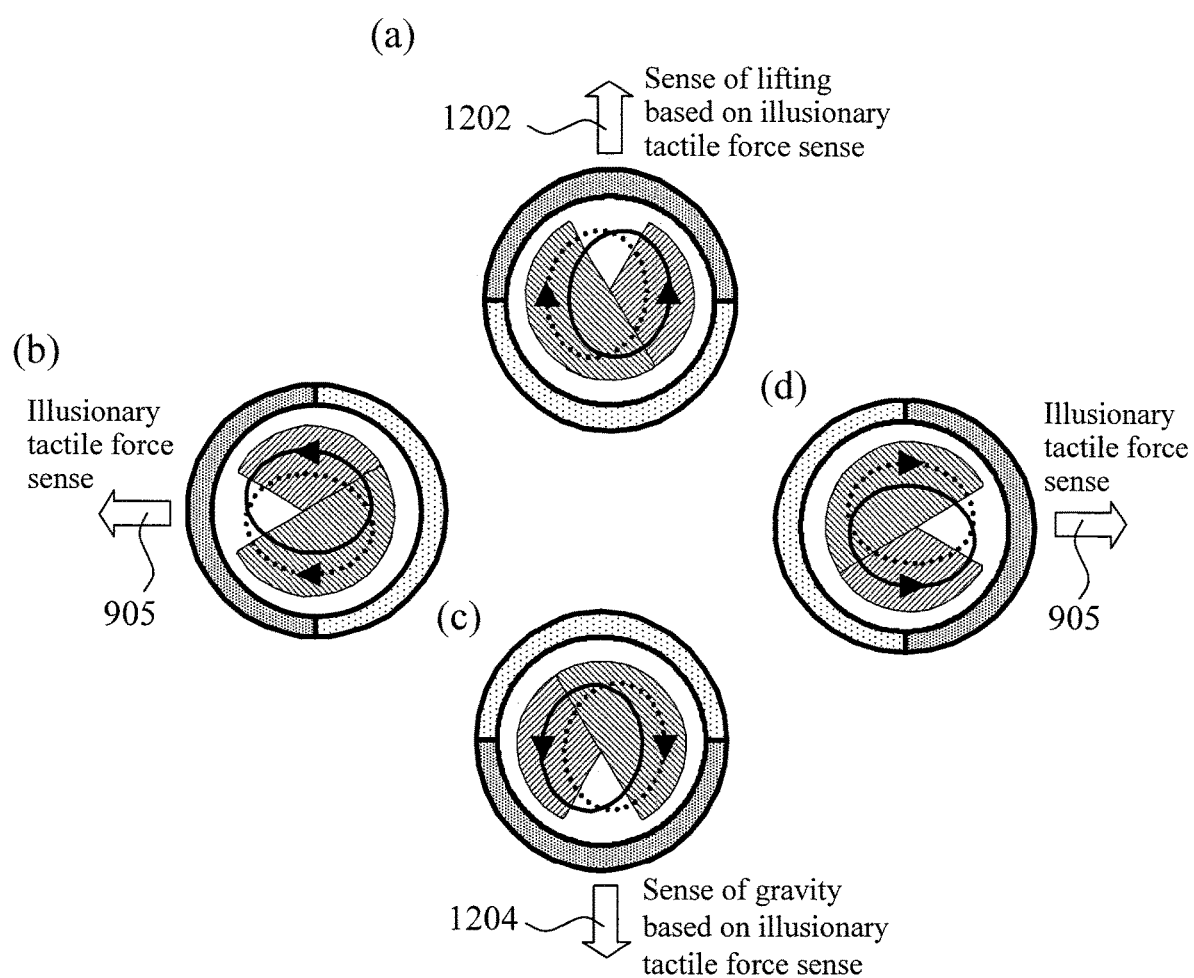
FIG. 25 is a diagram illustrating the effects of the use of the different viscoelastic materials.

FIG. 25 shows the directions of the sites where the two different viscoelastic deformable materials are stuck in FIG. 24 and the perceived directions of the illusionary tactile force sense.

(1) FIG. 25(a) corresponds to the case where materials A and B offering viscoelastic characteristics acting at operation points A and B in FIG. 24(c), respectively, are used, in FIG. 24(a), in an area corresponding to a phase of 180° to 360° and in an area corresponding to a phase of 0° to 180°, respectively. (2) FIG. 25(b) corresponds to the case where the materials A and B are used, in FIG. 24(a), in an area corresponding to a phase of 90° to 270° and in an area corresponding to a phase of −90° to 90°, respectively. (3) FIG. 25(c) corresponds to the case where the materials A and B are used, in FIG. 24(a), in the area corresponding to the phase of 0° to 180° and in the area corresponding to the phase of 180° to 360°, respectively. (4) FIG. 25(d) corresponds to the case where the materials A and B are used, in FIG. 24(a), in the area corresponding to the phase of −90° to 90° and in the area corresponding to the phase of 90° to 270°, respectively. In FIG. 25(a), an upward illusionary tactile force is exerted to allow the user to feel the interface lifted. In FIG. 25(b), a leftward illusionary tactile force is exerted to allow the user to feel the interface pulled leftward. In FIG. 25(c), a downward illusionary tactile force is exerted to allow the interface to feel heavier. In FIG. 25(d), a rightward illusionary tactile force is exerted to allow the user to feel the interface pulled rightward.

Figure 26:
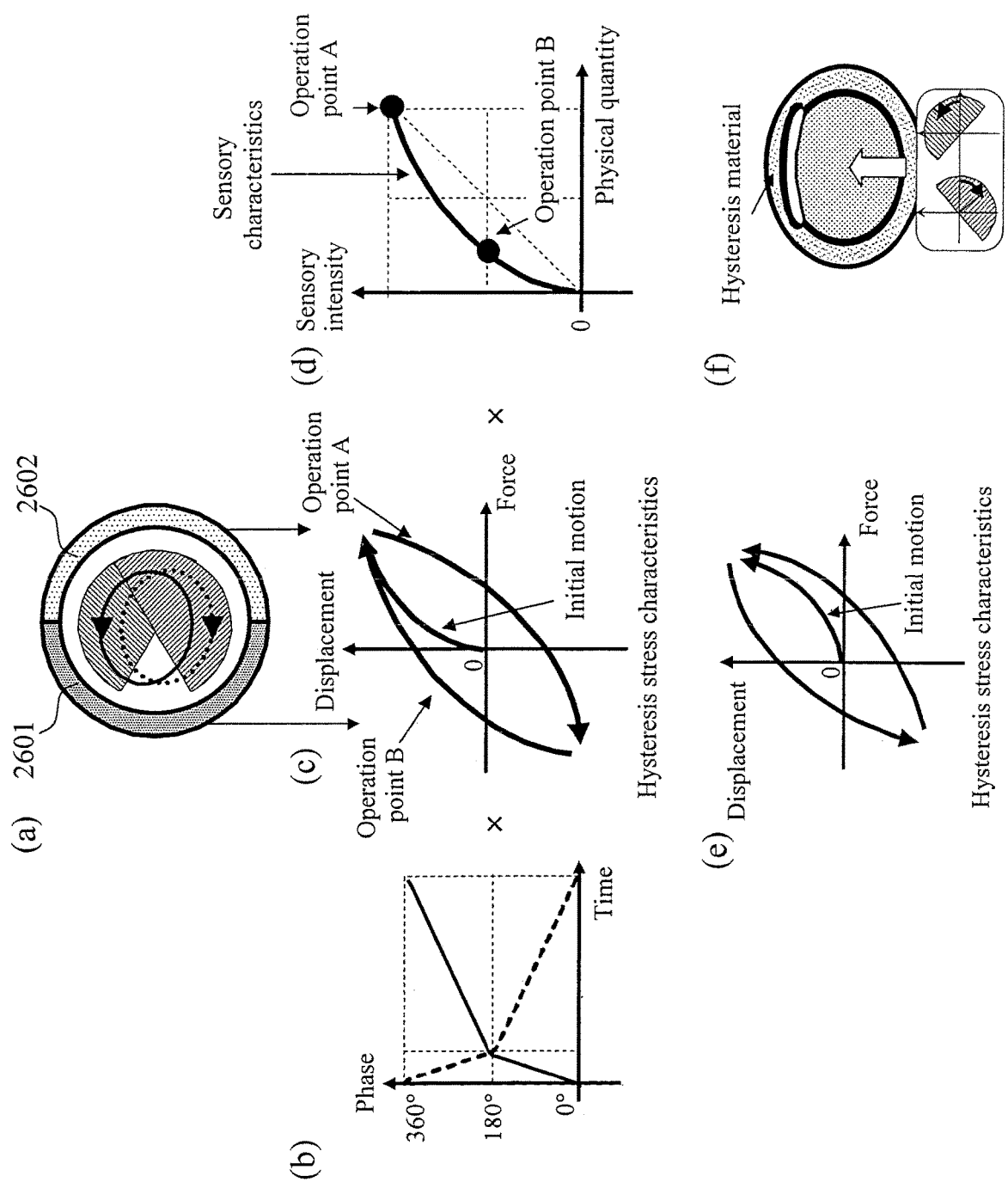
FIG. 26 is a diagram illustrating a control algorithm that uses a hysteresis material.

FIG. 26 shows a control algorithm that uses a hysteresis material.

As shown in FIG. 26(c), in the case that the hysteresis of the force-displacement characteristics differ between the operation point B with force increasing and the operation point A with force reducing, the transmission of the force through materials of hysteresis stress characteristics (2601 and 2602) varies depending on the stress characteristics. As a result, when the eccentric rotors are accelerated and decelerated as shown in FIG. 26(b), the hysteresis stress characteristics materials 2601 and 2602 in FIG. 26(a) are displaced to generate acceleration and deceleration motion in accordance with the operation points B and A in FIG. 26(c). The acceleration and deceleration motion allows the user with the sensory characteristics shown in FIG. 26(d) to perceive the illusionary tactile force sense. Thus, the each nonlinear effects serve to enhance the nonlinear effect of the system as a whole, resulting in a significant illusionary tactile force sense. As described above, when a material with hysteresis characteristics is interposed between the human skin or sensory organ and a device configured to generate a driving force such as vibration, torque, or force, the effect of the acceleration and deceleration is enhanced, thus improving the effect of evoking an illusionary tactile force sense. The effects in FIG. 26(c) also apply to such hysteresis stress characteristics as shown in FIG. 26(e). Furthermore, as in the case where the hysteresis stress characteristics material is stuck to the surface of the illusionary tactile force sense device as shown in FIG. 26(a), the hysteresis stress characteristics material may be stuck to the user's fingertip or body as shown in FIG. 26(f).

Figure 27:
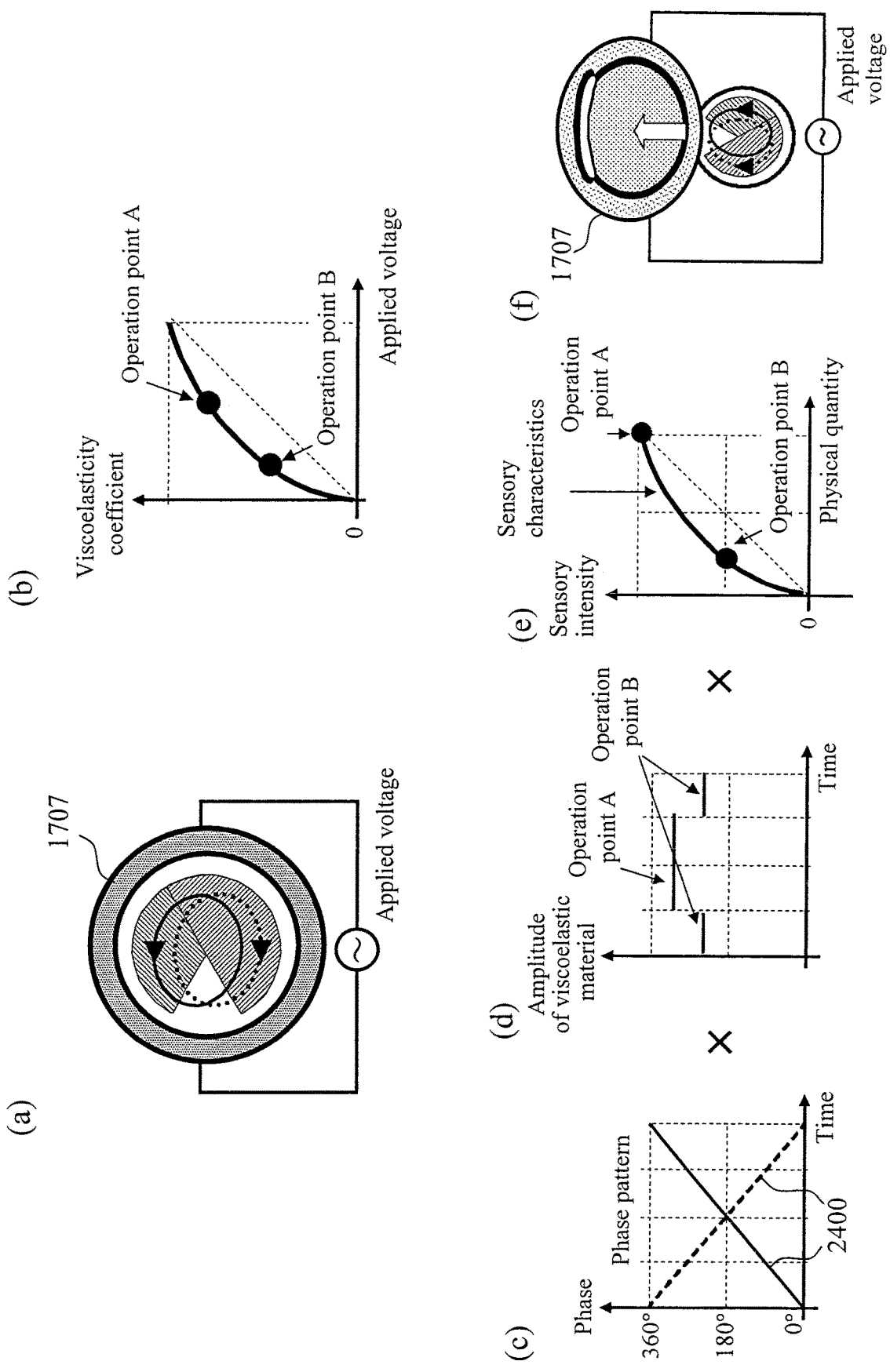
FIG. 27 is a diagram illustrating a control algorithm that uses a viscoelastic material having characteristics varied depending on an applied voltage.

FIG. 27 shows a control algorithm that uses a viscoelastic material with properties varied by an applied voltage.

In the technique that uses the viscoelastic material as shown in FIG. 24, the materials with the different stress-deformation characteristics (2403 and 2404) are stuck. However, as shown in FIG. 27(a), a material 1707 with viscoelastic characteristics varied by an applied voltage may be used. Here, the applied voltage is controlled to vary the viscoelastic coefficient (FIG. 27(b)) in synchronism with the rotation phases of the eccentric rotors, the transmissibility of periodically varying momentum generated to the hand by the eccentric rotors. Then, even though the eccentric rotors rotate at a constant rotating velocity (constant-velocity rotation) as shown in FIG. 27(c), the momentum transmitted to the hand or fingertip can be controlled by temporally varying the viscoelastic characteristics such that the appropriate characteristic values are obtained at the operation points B and A. Furthermore, the present technique has the same effect to alter the physical properties of the skin, which is equivalent to modify the sensory characteristics curve (FIG. 27(e)). Hence, the present technique can be utilized for control adapted to absorb a possible individual difference in sensory characteristics or to increase the efficiency with which an illusionary tactile force sense is evoked. Additionally, as in the case where the viscoelastic material is stuck to the surface of the illusionary tactile force sense device as shown in FIG. 27(a), the viscoelastic material may be stuck to the user's fingertip or body as shown in FIG. 27(f). Here, any viscoelastic material with any properties may be used provided that the stress-distortion characteristics of the material can be nonlinearly controlled by the applied voltage. In addition, the control method is not limited to the use of the applied voltage provided that the method enables nonlinear control.

Repeated acceleration and deceleration of rotation of the motor as shown in FIG. 26(b) may result in a loss of energy and heat generation. However, according to the present technique that the characteristics are varied by the applied voltage, the rotation velocity of the motor is constant (FIG. 27(c)) or the acceleration ratio f1/f2 is close 1. Hence, the energy consumption in the present technique is lower than that in the acceleration and deceleration of the motor.

Figure 28:
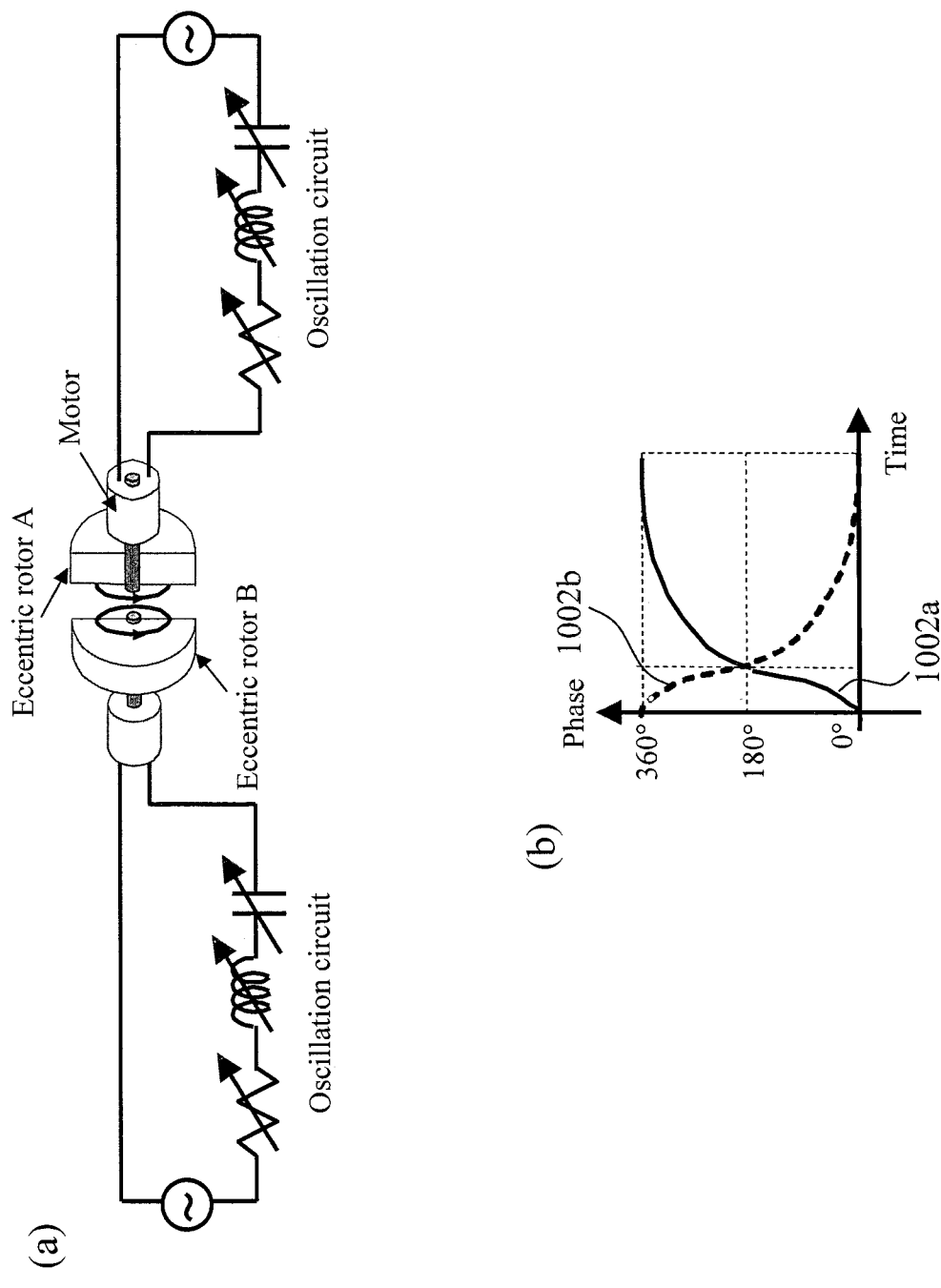
FIG. 28 is a diagram illustrating a control algorithm that uses an oscillation circuit.

FIG. 28 shows a control algorithm that uses an oscillation circuit.

FIG. 28(a) shows an example of an illusionary tactile force sense interface device that uses an oscillation circuit to achieve high energy efficiency. In general, a repetition of acceleration and deceleration of the motor such as an alternative repetition of a high-velocity rotation 1002a and a low-velocity rotation 1002b results in a great energy loss and high heat generation. The energy loss and the heat generation are major obstacles to mobile and wireless applications. Thus, the energy consumption can be reduced by controlling the rotating velocity of an eccentric rotation motor (FIG. 28(b)) via an oscillation circuit comprising a combination of a coil, a capacitor, and a resistor, so as to generate an illusionary tactile force sense. In particular, oscillation with nonlinear characteristics and hysteresis characteristics are desirable. The oscillation circuit shown in FIG. 28(a) is illustrative. The oscillation circuit may comprise a combination of parallel circuits or power controlling semiconductor elements.

Figures 1, 29:
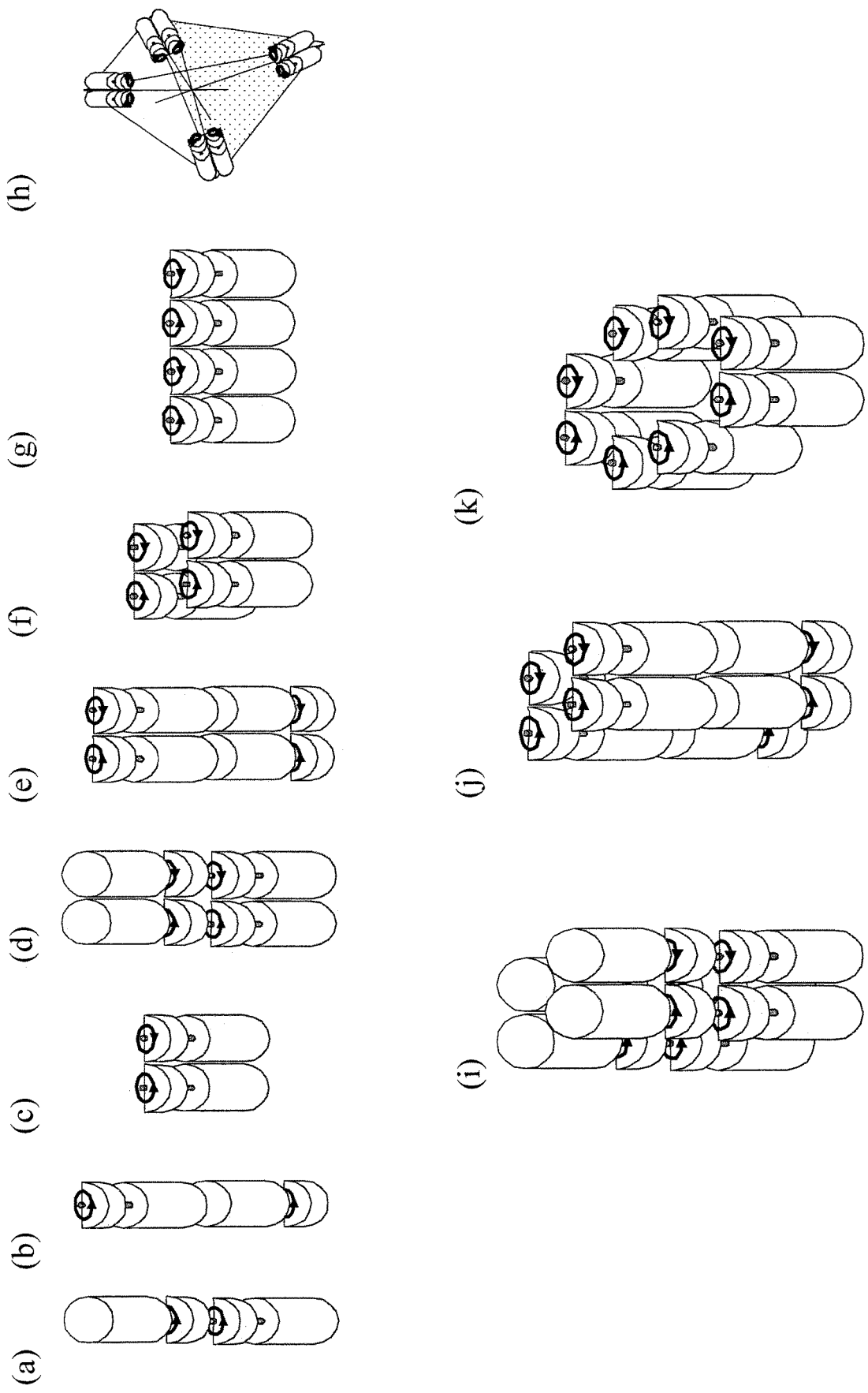
Figures 3, 29:
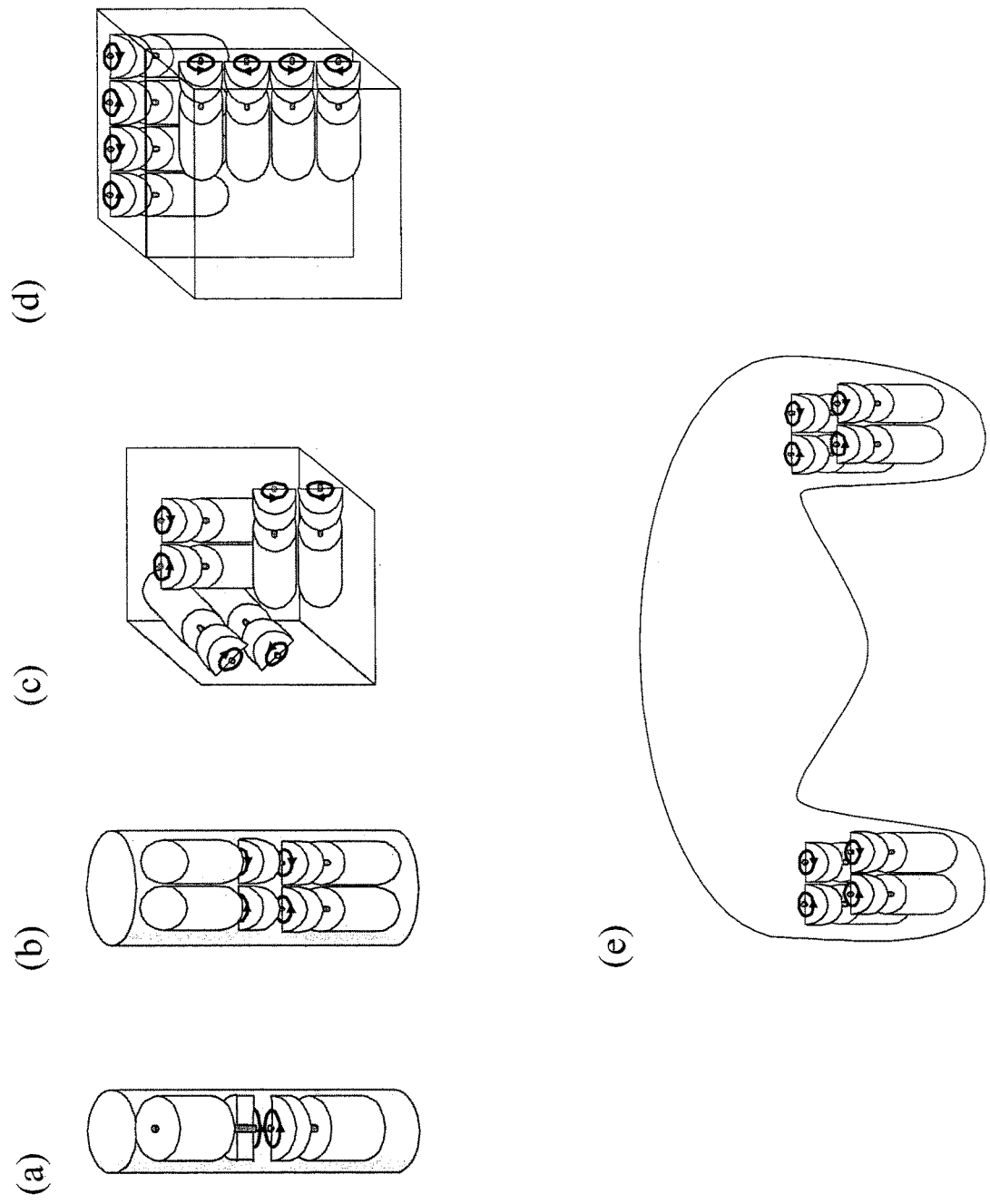

FIGS. 29-1 to 29-3 show the use of a plurality of basic units of the illusionary tactile force sense device depending on the application or the purpose of the controller.

FIG. 29-1(a) shows basic units of the illusionary tactile force sense device arranged opposite one another.

FIG. 29-1(b) shows basic units of the illusionary tactile force sense device arranged opposite one another.

FIG. 29-1(c) shows basic units of the illusionary tactile force sense device arranged in parallel.

FIG. 29-1(d) shows basic units of the illusionary tactile force sense device arranged opposite one another and in parallel.

FIG. 29-1(e) shows basic units of the illusionary tactile force sense device arranged opposite one another and in parallel.

FIG. 29-1(f) shows basic units of the illusionary tactile force sense device arranged in parallel.

FIG. 29-1(g) shows basic units of the illusionary tactile force sense device arranged in parallel.

FIG. 29(h) shows basic units of the illusionary tactile force sense device three-dimensionally arranged at the vertices of a tetrahedron.

FIG. 29-1(i) shows basic units of the illusionary tactile force sense device arranged opposite one another and in parallel.

FIG. 29-1(j) shows basic units of the illusionary tactile force sense device arranged opposite one another and in parallel.

FIG. 29-1(k) shows basic units of the illusionary tactile force sense device arranged in parallel.

FIG. 29-2(a) shows a two-dimensional arrangement of basic units of the illusionary tactile force sense device arranged opposite one another.

FIG. 29-2(b) shows a two-dimensional arrangement of basic units of the illusionary tactile force sense device arranged opposite one another and in parallel.

FIG. 29-2(c) shows a two-dimensional arrangement of basic units of the illusionary tactile force sense device arranged opposite one another and in parallel.

FIG. 29-2(d) shows a three-dimensional arrangement of basic units of the illusionary tactile force sense device arranged opposite one another.

FIG. 29-2(e) shows a three-dimensional arrangement of basic units of the illusionary tactile force sense device arranged opposite one another and in parallel.

FIG. 29-2(f) shows a three-dimensional arrangement of basic units of the illusionary tactile force sense device arranged opposite one another and in parallel.

FIGS. 29-3(a) and 29-3(b) show basic units of the illusionary tactile force sense device arranged in a cylindrical type game controller.

FIGS. 29-3(c) and 29-3(d) show basic units of the illusionary tactile force sense device three-dimensionally arranged in a torsional position.

FIG. 29-3(e) shows basic units of the illusionary tactile force sense device arranged in a game controller.

Figure 30:
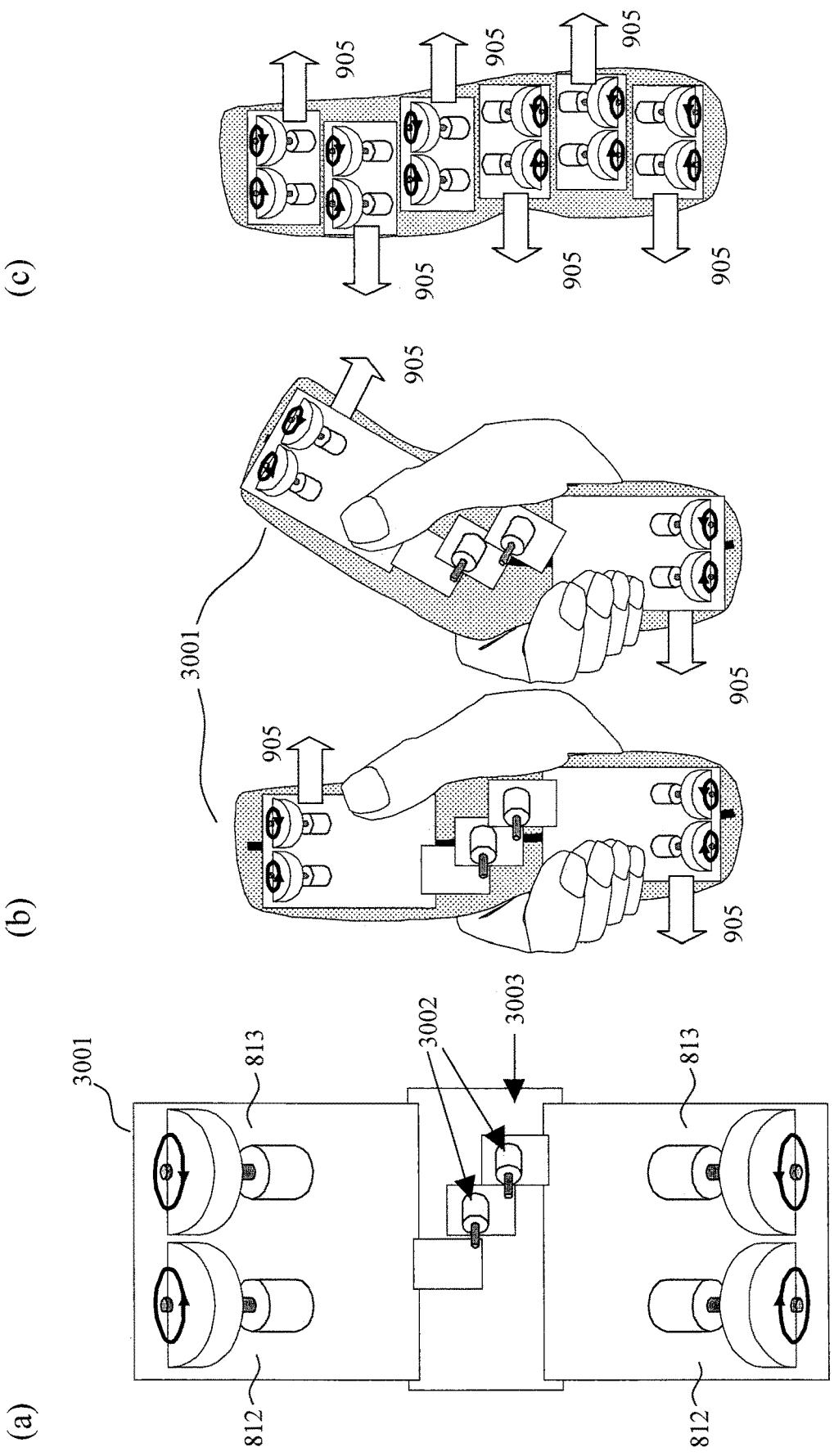
FIG. 30 is a diagram illustrating a transform-type illusionary tactile force sense interface device.

FIG. 30(a) shows an apparatus configured not only to evoke an illusionary tactile force sense by the illusionary tactile force sense device but also to emphasize an illusionary tactile force sense 905 evoked by using a shape transforming motor 3002 to transform the shape 3001 of the illusionary tactile force sense interface device in synchronism with the illusionary tactile force.

If for example, the apparatus is applied to a fishing game as shown in FIG. 30(b), the shape 3001 of the interface is bent in accordance with the pull of a fishing rod exerted by fish. Thus, a sense of the tension of a fishing line evoked by the illusionary tactile force sense 905 is further emphasized. At this time, such a real pull exerted by the fish cannot be experienced simply by transforming the interface without the illusionary tactile force sense. The combination of the illusionary tactile force sense with the transformation of the interface improves the reality. Furthermore, the transformation effect can be exerted without the shape transforming motor 3002, by spatially arranging basic units of the illusionary tactile force sense device as shown in FIG. 30(c).

The mechanism used to transform the shape is not limited to the shape transforming motor 3002. Any mechanism such as a shape memory alloy or a driving mechanism that uses piezoelectric elements may be utilized provided that the mechanism enables the shape to be changed.

Figure 31:
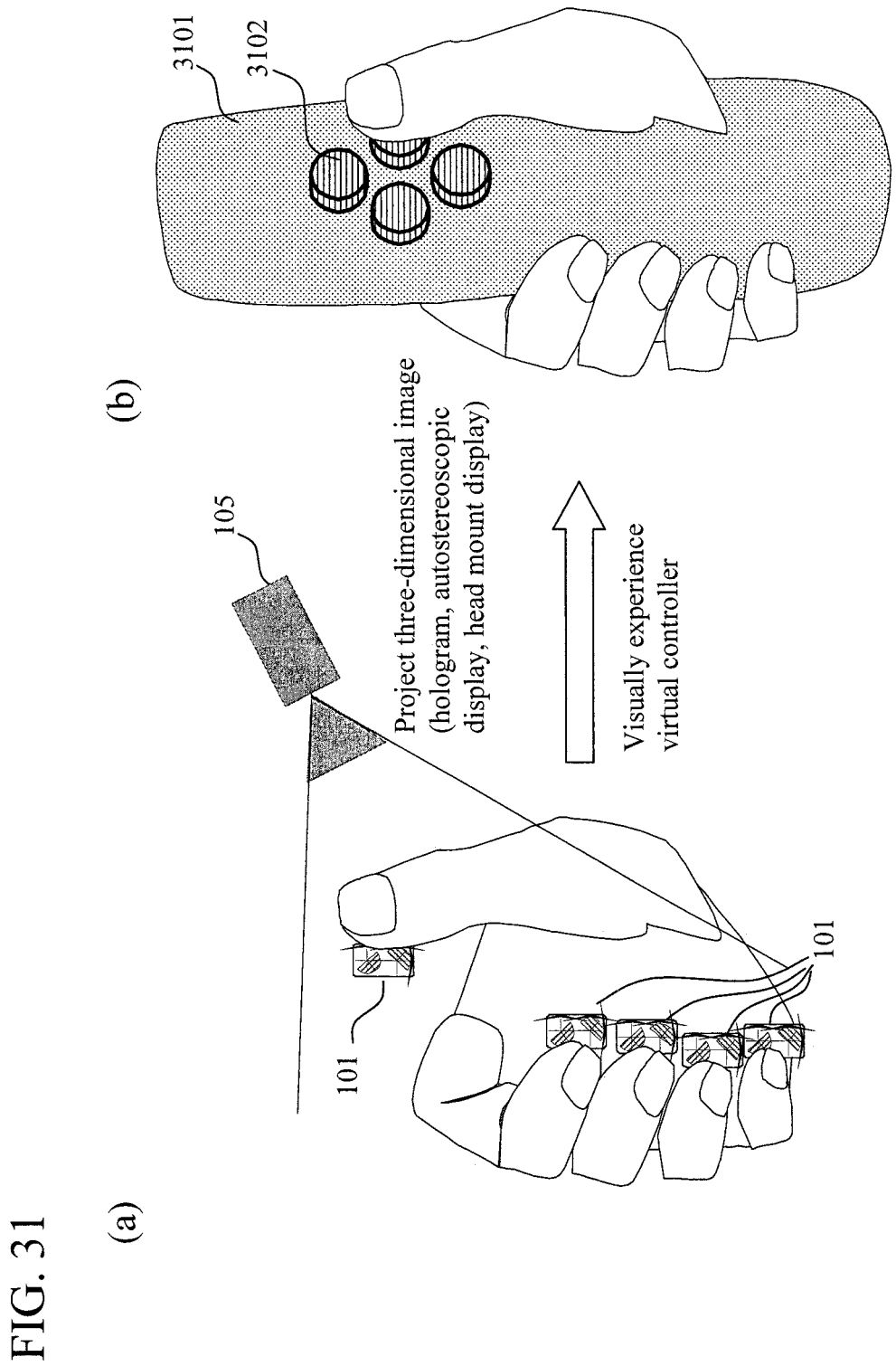
FIG. 31 is a diagram illustrating a method for implementing a virtual controller.

FIG. 31 shows a virtual controller 3101 that uses the illusionary tactile force sense interface device 101.

In terms of the visual sense, the virtual controller 3101 is generated by the content creating device 102 and formed into a video in the hand using the audiovisual display 105 such as a hologram, an autostereoscopic display, or a head mounted display. In terms of the tactile sense, the illusionary tactile force sense interface device 101 is used to create a virtual controller 3101 so as to present the presence and feel of the virtual controller and senses of button operations. The conventional method of using vibration fails to haptically express the shape of the virtual object. However, the use of the illusionary tactile force sense interface device allows expression of the presence of the virtual button 3102 and a reaction force corresponding to pushback exerted in response to the push of any button.

Conventional game controllers allow the user to enjoy experience games by moving the user's own body. The conventional game controllers are thus of a "pseudo experience type" with no force feedback more than vibration. In contrast, the use of the illusionary tactile force sense interface device 101 allows a "full experience type controller" to be implemented which allows the user to haptically touch the virtual object 531 and game characters.

The virtual controller 3101 that uses the illusionary tactile force sense interface device 101 is effective in allowing the shape of the controller and the arrangement of the buttons to be freely designed in accordance with the contents of the game. In particular, since the lengths of the hand and fingers vary depending on age and sex, the shape of the virtual controller 3101 can be designed and transformed in accordance with the user's hand. The shape of the virtual controller 3101 may be formed in accordance with the content or changed in accordance with the storyline of the content. For example, conventional available game controllers are commercially adapted for game contents. On the contrary, if a single game controller is used to manipulate various contents, since the game controller is not optimum for the contents, the following problem may occur. That is, the game controller may fail to be intuitively manipulated or the created contents may be limited in association with the game controller. In contrast, in the present implementation example, controllers adapted for contents can be virtually created. This eliminates the need to repurchase a dedicated controller and allows the controller to be freely transformed and changed in accordance with scenes in or the stories of the contents.

In particular, when new game software comes onto the market, information on the virtual controller can be contained in the software. This allows the use of a virtual controller optimized for the content of the game. The virtual controller can be distributed via a network as an item. Thus, the virtual controller can be inexpensively and readily upgraded and sold.

In actual game controllers, it is difficult to consecutively and quickly depress a plurality of buttons while gripping the housing with the ring finger and the little finger. However, the virtual controller eliminates the need to grip the housing. Furthermore, the virtual controller involves no inertia force otherwise resulting from the weight of the game controller. Thus, the controller can be quickly moved. On the contrary, the virtual controller 3101 based on the illusionary tactile force sense allows the weight of the controller and the inertia force to be generated as required.

In the conventional game controller, all inputs are performed using the buttons on the controller. Thus, to manipulate a switch or a door knob in the VR space, the buttons on the controller are used to select and manipulate the switch or the door knob. Hence, users unfamiliar with the game require a long time to learn the functions assigned to the buttons on the game controller, a method for manipulating the buttons, and a method for manipulating the buttons for the particular game. However, in the virtual controller 3101, the functions of the game controller can be arranged in the respective virtual buttons 3102 in the VR space. Consequently, the user can directly manipulate the buttons in the VR space using a manipulation manner with which the user is familiar. This eliminates the need for the learning time and enables intuitive manipulations.

Figures 1, 32:
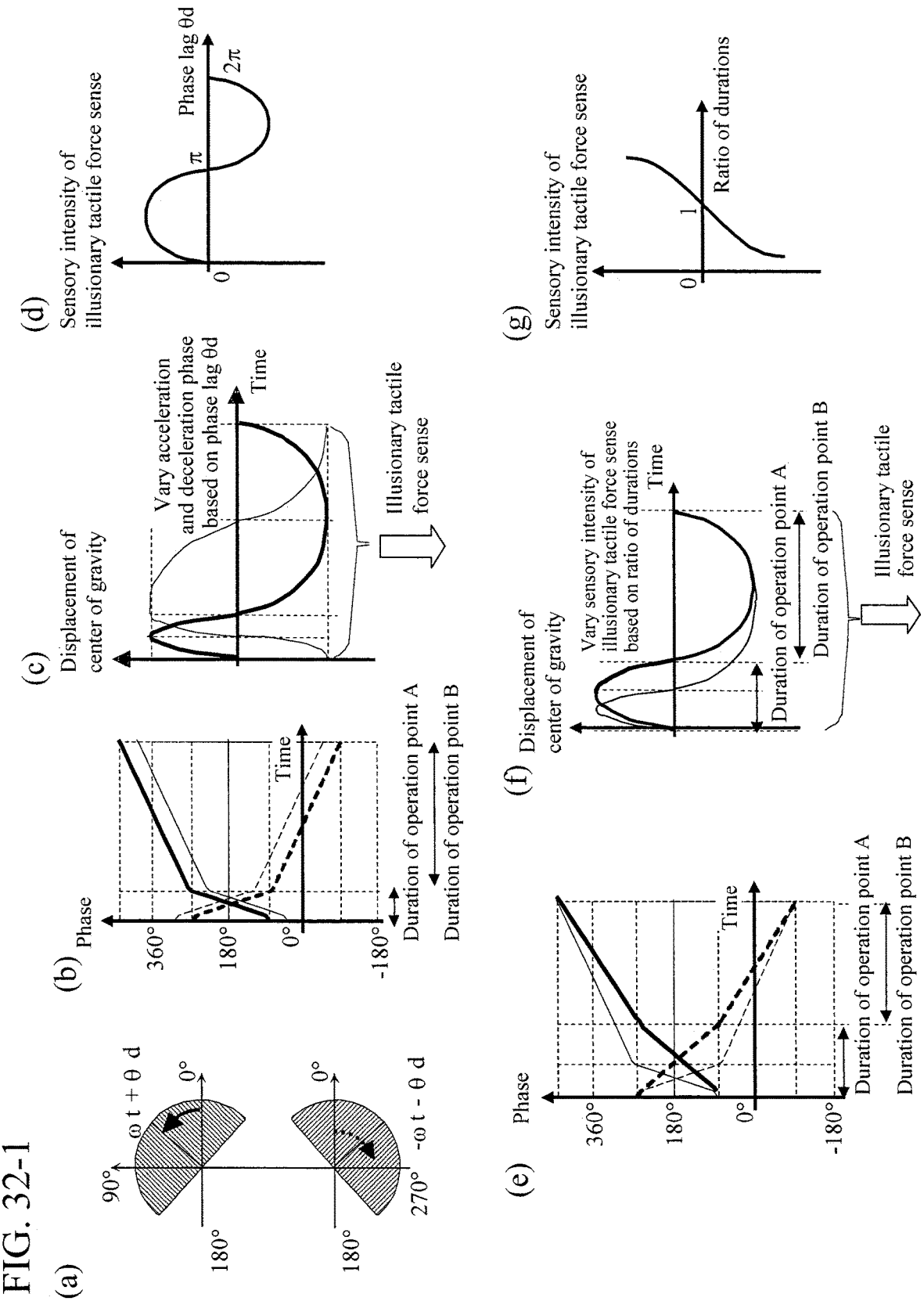
Figures 2, 32:
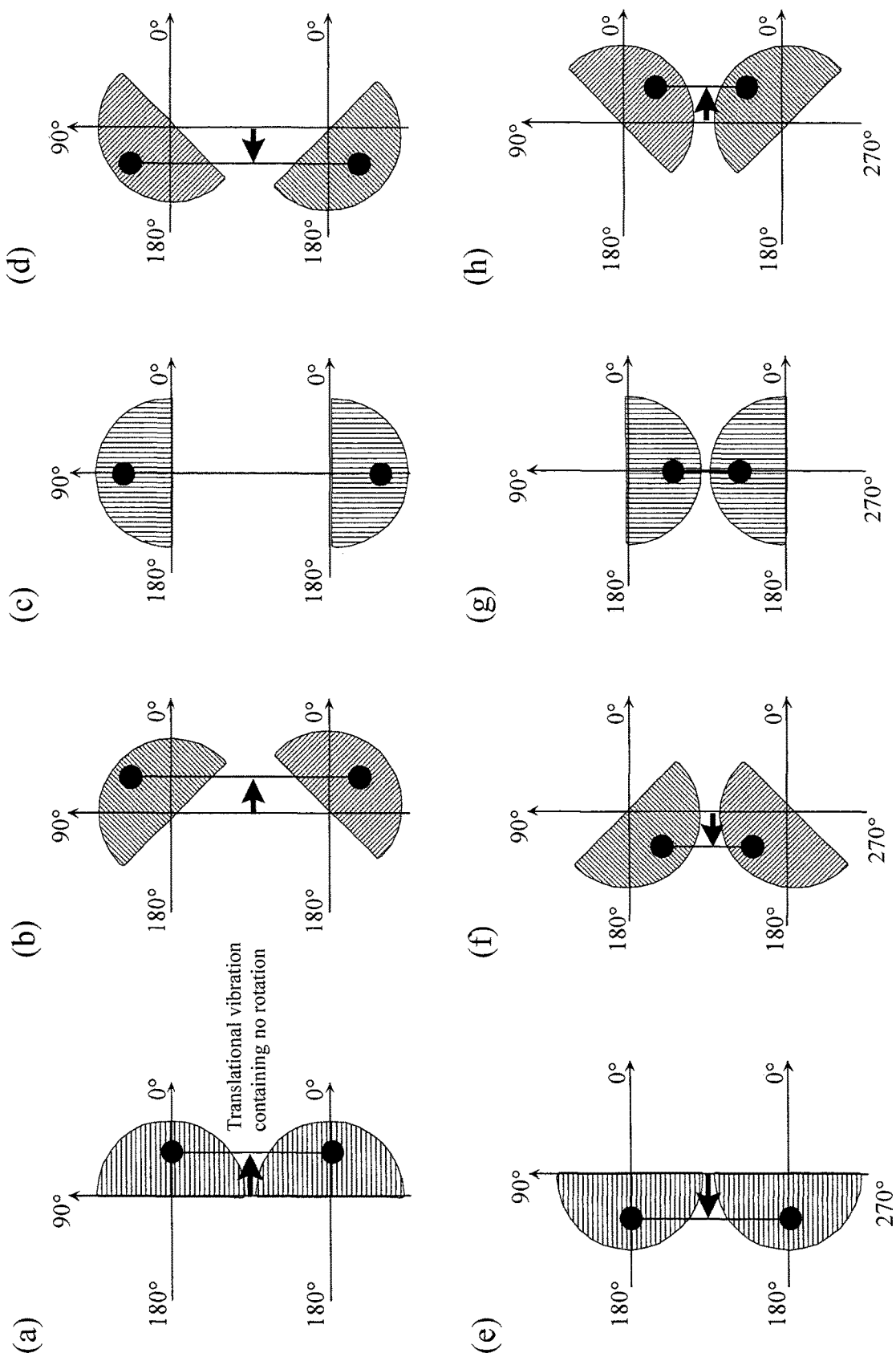
Figures 3, 32:
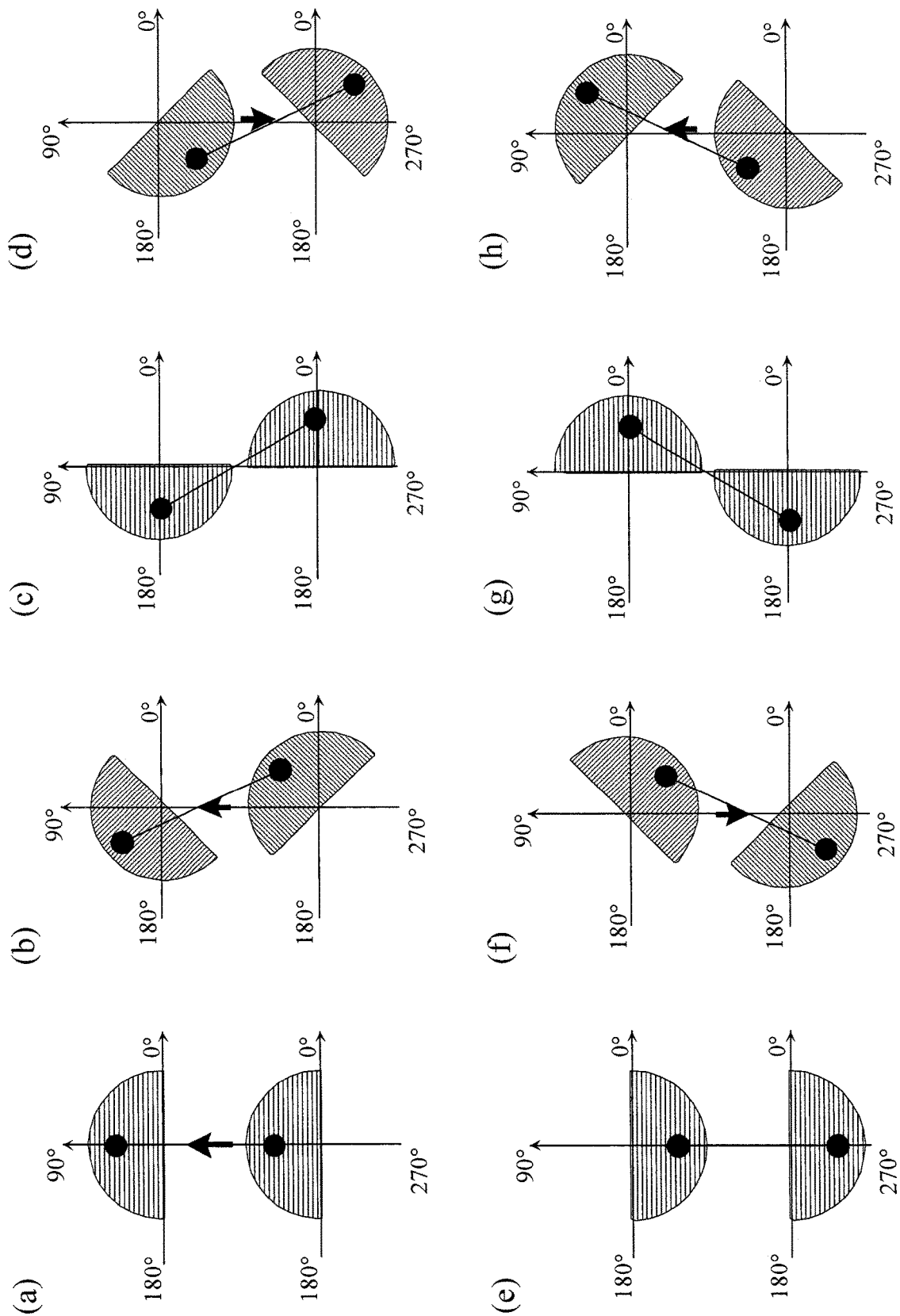
Figures 4, 32:
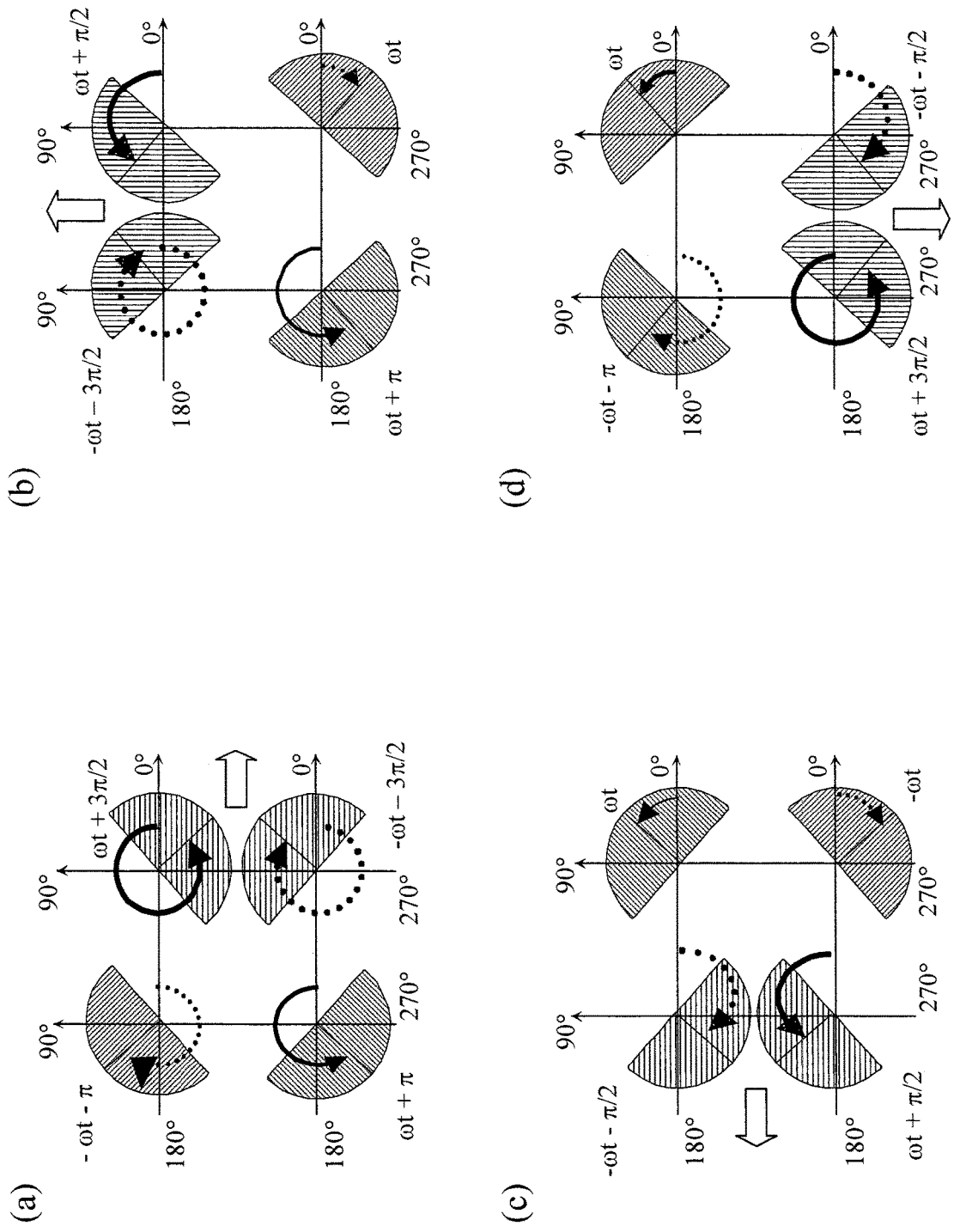
Figures 5, 32:
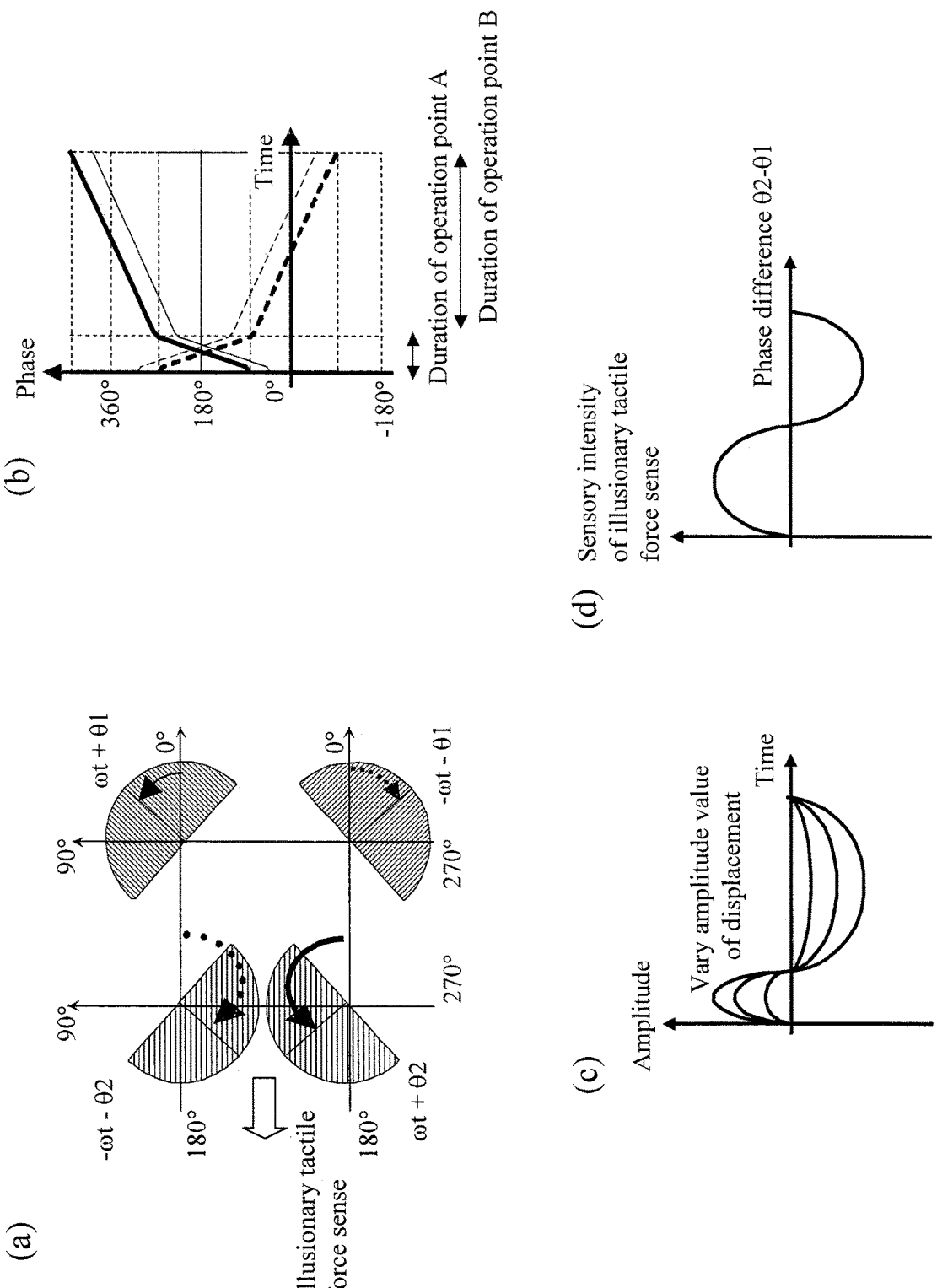
Figures 6, 32:
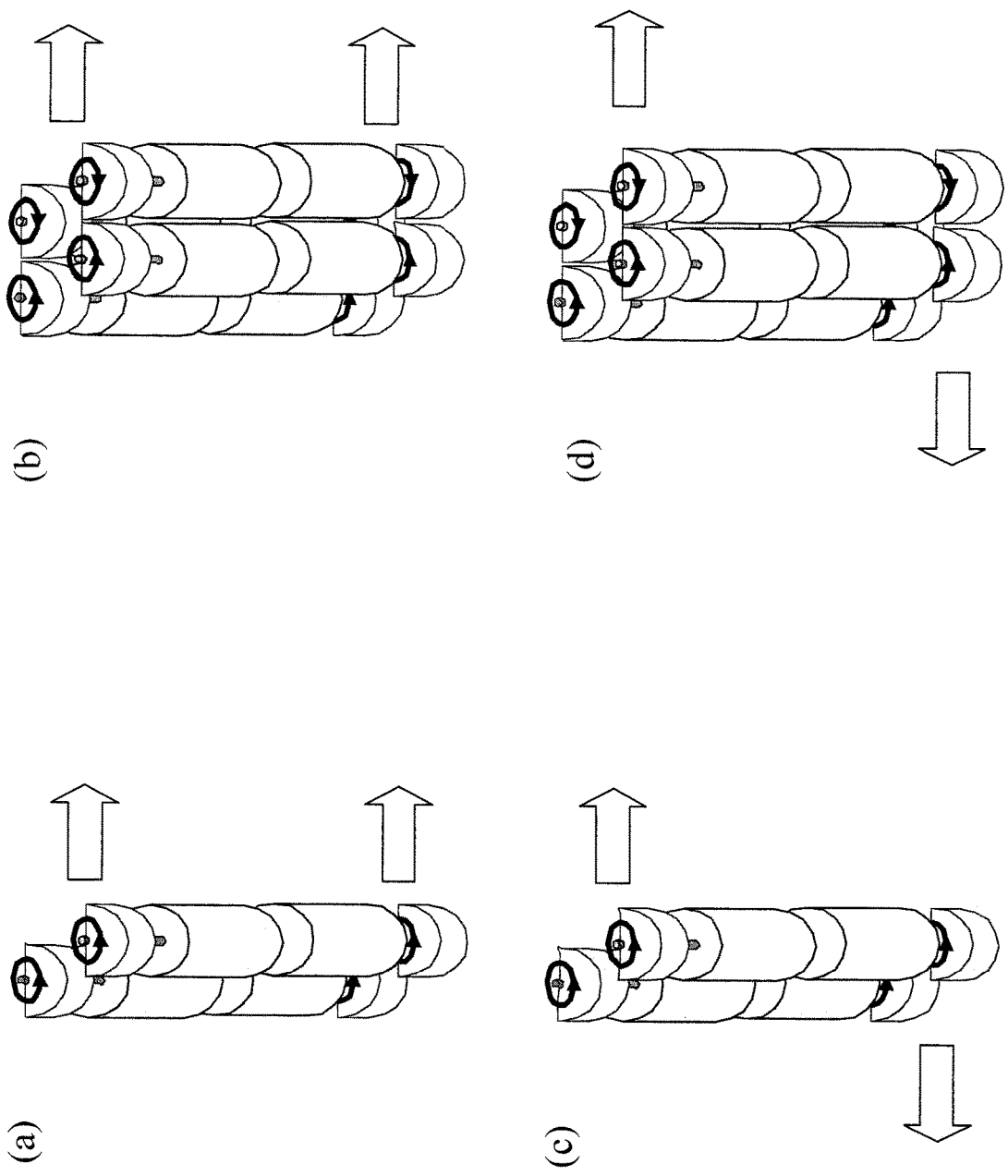
Figures 7, 32:
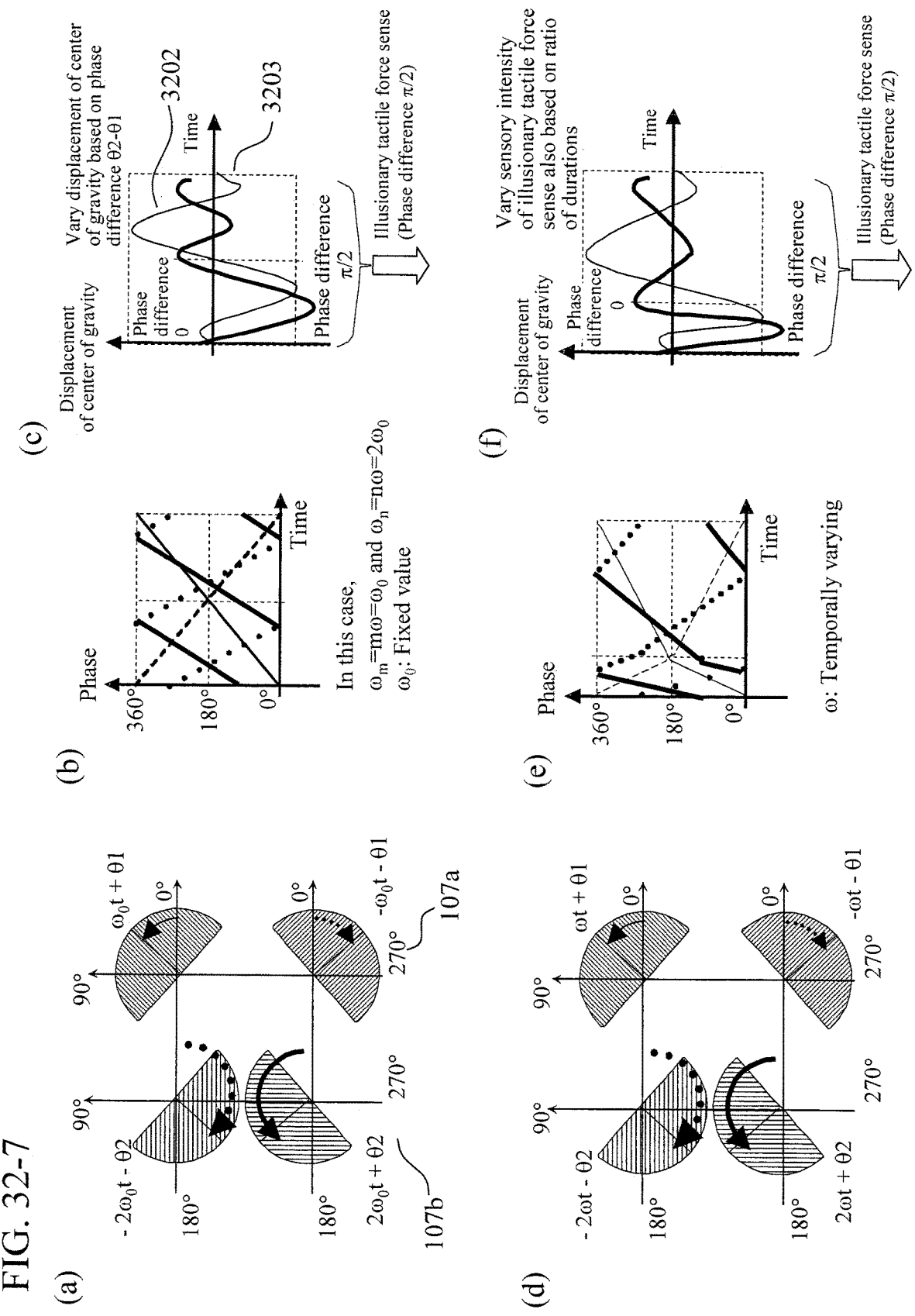
Figures 8, 32:
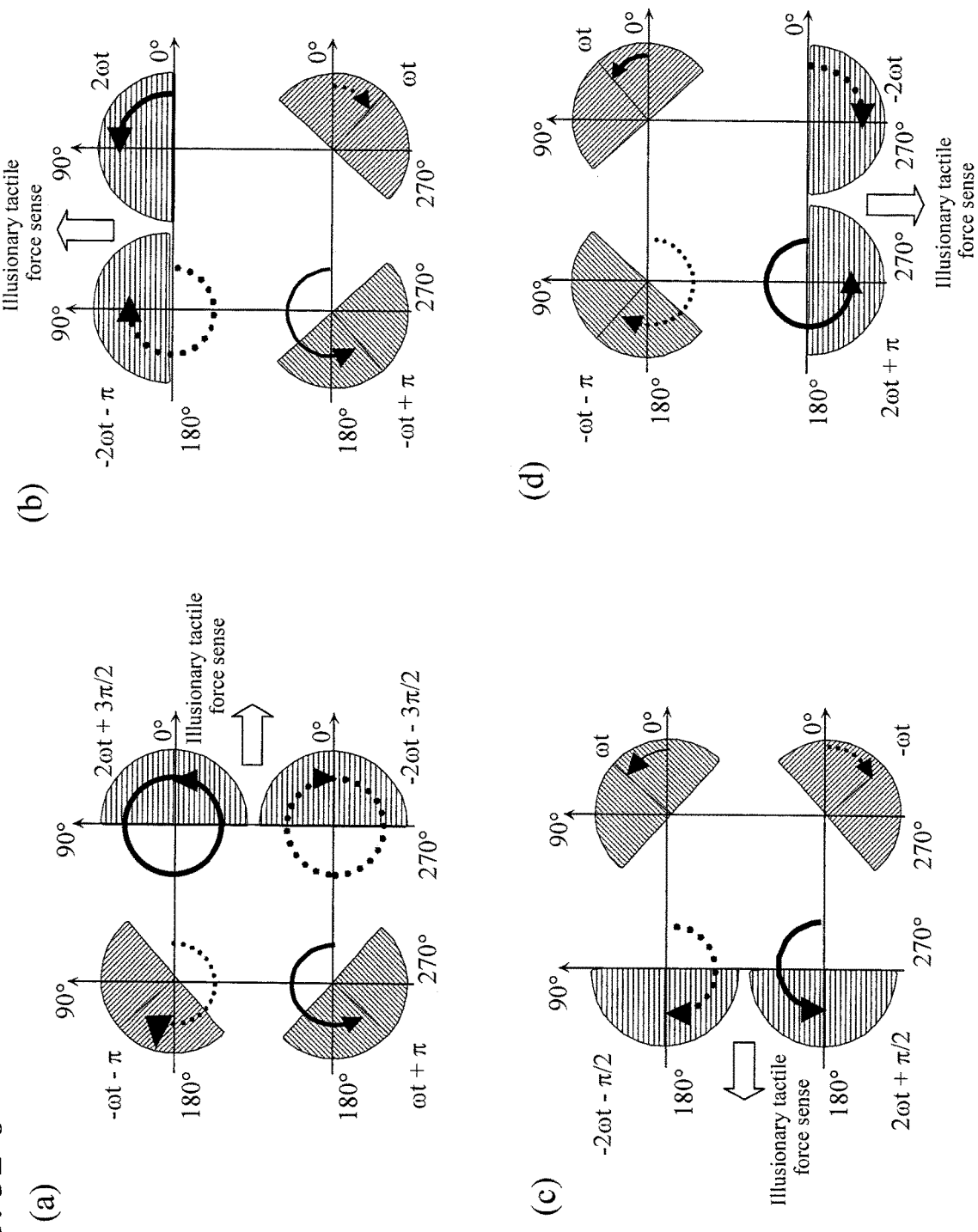

FIGS. 32-1 to 32-7 and 33 show an illusionary tactile force sense device and a control method which use one or more sets of units. FIGS. 32-1 to 32-3 show the use of one set of units. FIGS. 32-4, 32-5, 32-7, 32-8, and 33 show the use of two sets of units.

FIG. 32-1(*a*) schematically shows the phase relationship between the eccentric weights. FIG. 32-1(*b*) shows the phase pattern of rotation of the eccentric weights. FIG. 32-1(*c*) shows a temporal variation in the displacement of the center of gravity of the illusionary tactile force sense device synthesized from the phase patterns shown in FIG. 32-1(*b*). As shown in FIG. 32-1(*c*), a phase lag θd indicative of a timing when the rotating speed is increased is varied to control the ratio of the acceleration on the plus side of the displacement of the center of gravity to the deceleration on the minus side is controlled as shown in FIG. 32-1(*c*), with the fundamental period of vibration (the duration of the operation point A+duration of the operation point B) maintained constant. However, the negative value of θd means a phase lag, whereas the positive value of θd means a phase lead. As a result, as shown in FIG. 32-1(*d*), the sensory intensity and direction of the illusionary tactile force sense can be varied even with the constant vibration period. For a phase lag θd of 0 or π, the direction of the force of the illusionary tactile force sense is not felt, and the illusionary tactile force sense is perceived as simple variation.

Furthermore, as shown in FIG. 32-1(*e*), the ratio of the duration of the operation point A to the duration of the operation point B (the duration of the operation point A/the duration of the operation point B) allows a variation of the temporal displacement of the center of gravity. That is, even with the fundamental period and the maximum amplitude of the displacement of the center of gravity constant, the sensory intensity of the illusionary tactile force sense can be varied as shown in FIG. 32-1(*g*), by varying the ratio of the angular velocities (the duration of the operation point A/the duration of the operation point B). As described above, the sensory intensity and texture of the illusionary tactile force sense can be varied with the period, eccentric amplitude, and acceleration and deceleration independently controlled.

FIGS. 32-2(*a*) to 32-2(*h*) show the phase relationship (phase θ: 0 to 7π/4) between the eccentric weights observed when vibration occurs in the direction of 0° and 180°, that is, when the vibration is linear and contains no rotational vibration. In contrast, FIGS. 32-3(*a*) to 32-3(*h*) show the phase relationship (phase θ: π/2 to 9π/4) between the eccentric weights observed when vibration occurs in the direction of 90° and 270°, that is, when the vibration is linear and contains rotational vibration. The rotational vibration causes a sense of direction to be dulled when an illusionary tactile force sense is evoked.

Thus, the rotational vibration can be reduced by using two sets of units as shown in FIG. 32-4. FIG. 32-4(*a*) shows the phase relationship observed when the illusionary tactile force sense is in the direction of 0°. FIG. 32-4(*b*) shows the phase relationship observed when the illusionary tactile force sense is in the direction of 90°. FIG. 32-4(*c*) shows the phase relationship observed when the illusionary tactile force sense is in the direction of 180°. FIG. 32-4(*d*) shows the phase relationship observed when the illusionary tactile force sense is in the direction of 270°. Similarly, an increase the number of units enables a reduction in rotational vibration.

Figure 5:
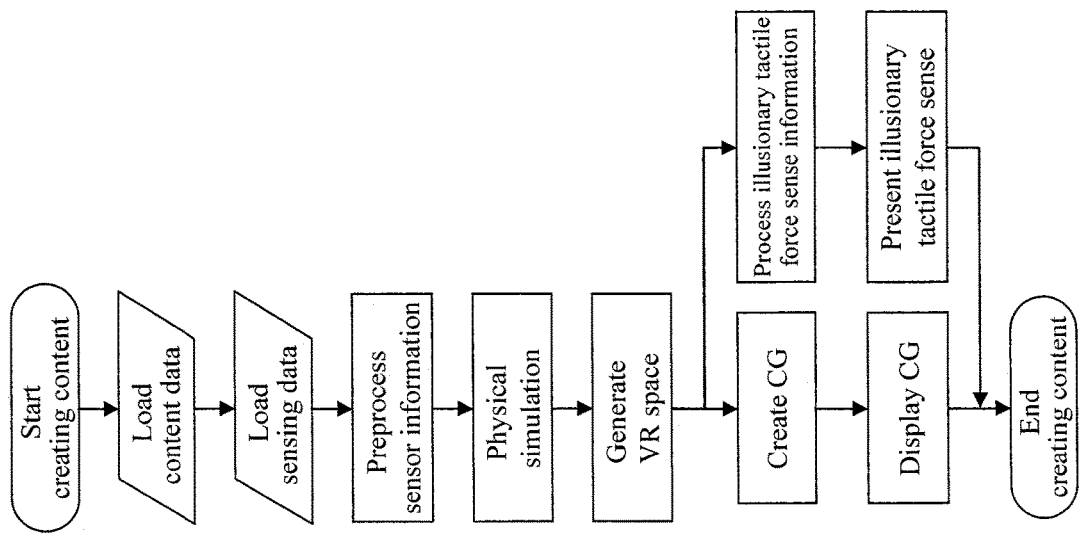
FIG. 5 is a diagram illustrating a process flowchart for a content creating device.
Figure 5:
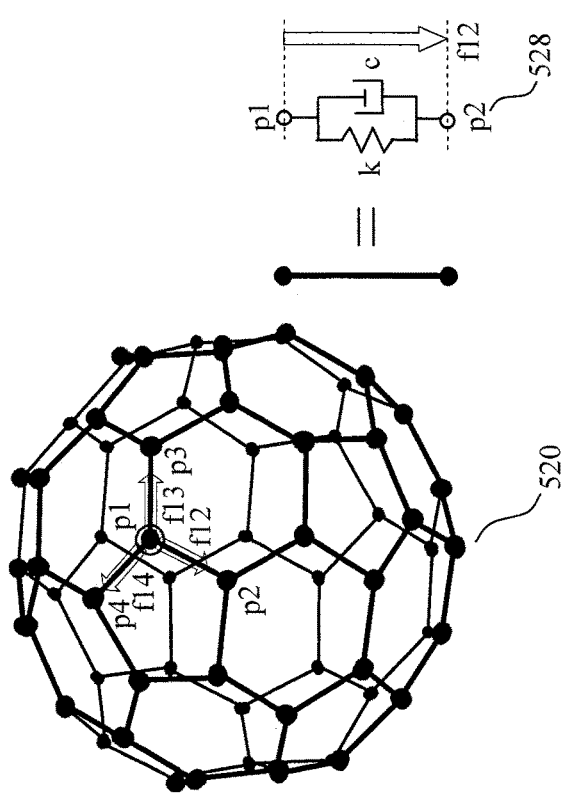
Figure 5:
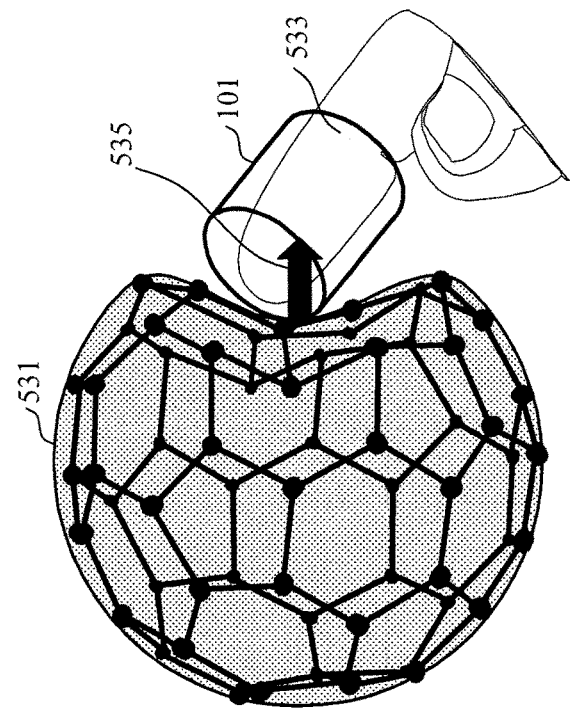

Here, if the phases θ1 and θ2 between the two sets of units are changed, the sensory intensity of the illusionary tactile force sense can be changed by adjusting the phase difference θ2-θ1 as shown in FIGS. 32-5(*c*) and 32-5(*d*).

Figure 6:
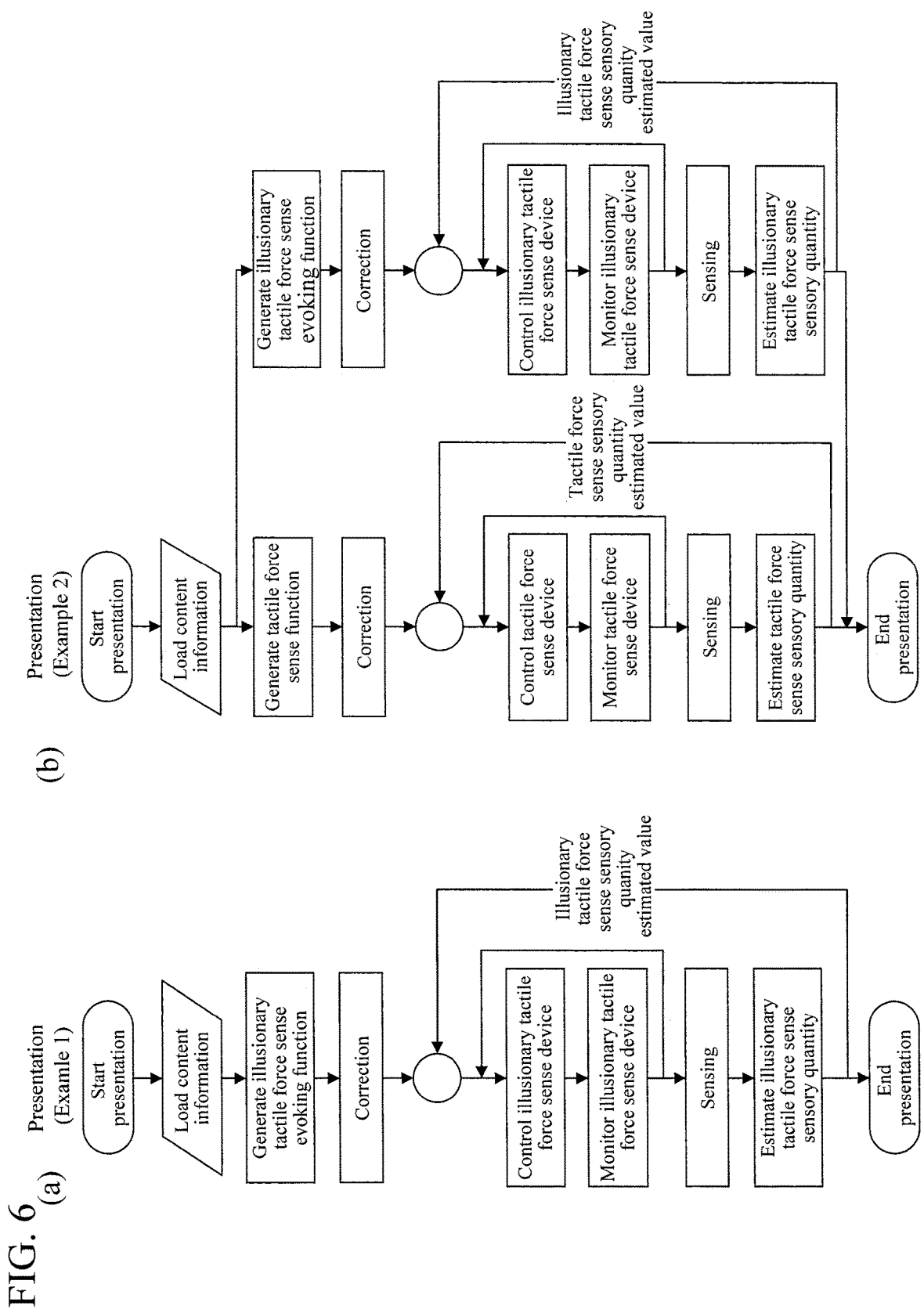
FIG. 6 is a diagram illustrating a presentation process flowchart.

As shown in FIG. 32-6, adjustment of the phase relationship between the plurality of units allows a translational illusionary tactile force sense (FIGS. 32-6(*a*) and 32-6(*b*)) and a rotational illusionary tactile force sense (FIGS. 32-6(*c*) and 32-6(*d*)) to be presented.

The use of a plurality of sets of units also enables an illusionary tactile force sense control apparatus with high energy efficiency to be provided. An example of this illusionary tactile force sense control apparatus is shown in FIGS. 32-7 to 32-8.

Figure 7:
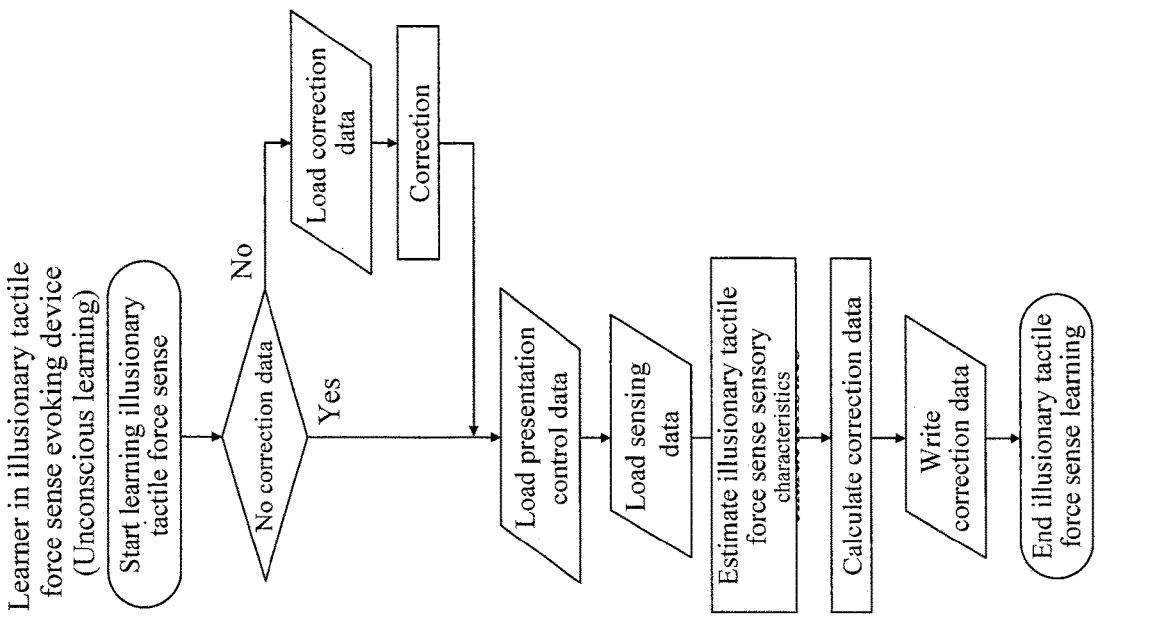
FIG. 7 is a diagram illustrating a learning process flowchart.
Figure 7:
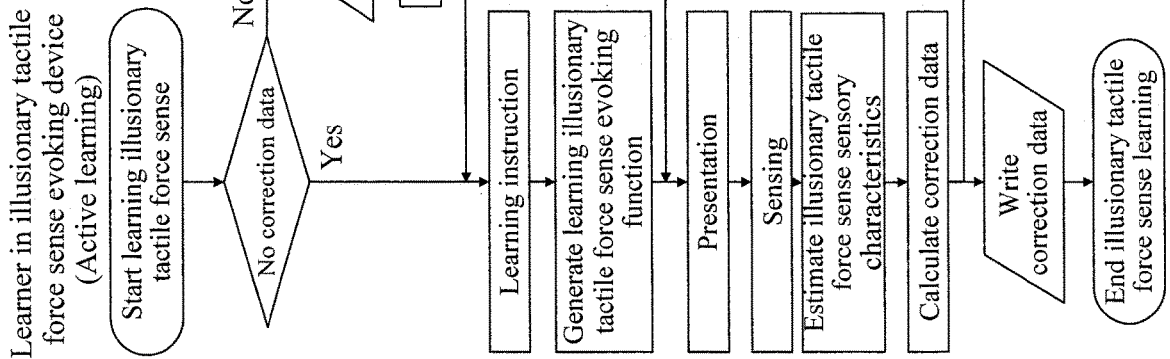

If as shown in FIG. 32-7(*a*), two illusionary tactile force sense devices 107*a* and 107*b* each comprising two eccentric rotors are arranged and rotated at rotating velocities ω0 and 2ω0, respectively, such displacement of the center of gravity as shown in FIG. 32(*c*) is synthesized. Particularly if the phases are misaligned with each other by 90° (3203), the difference between the maximum value and the minimum value is maximized. Thus, even if such an oscillation circuit as shown in FIG. 28(*a*) is not used and the motors are continuously rotated at constant velocities, such acceleration and deceleration vibration as evokes an illusionary tactile force sense can be synthesized.

Here, in such a synthesis method, the rotating velocities of the two basic units are not limited to $\omega_0$ and $2\omega_0$ but may have a natural number ratio relationship such as $m\omega_0$ and $n\omega_0$ ((m) and (n) are natural numbers).

In contrast, as shown in FIGS. 32-7(*d*) to 32-7(*f*), the same effect as that shown in FIG. 32-1 can be exerted by temporally varying the rotating velocities ω and 2ω of the motors. Furthermore, as in the case of FIG. 32-4, the direction of the illusionary tactile force sense can be selected as shown in FIG. 32-8.

Figure 33:
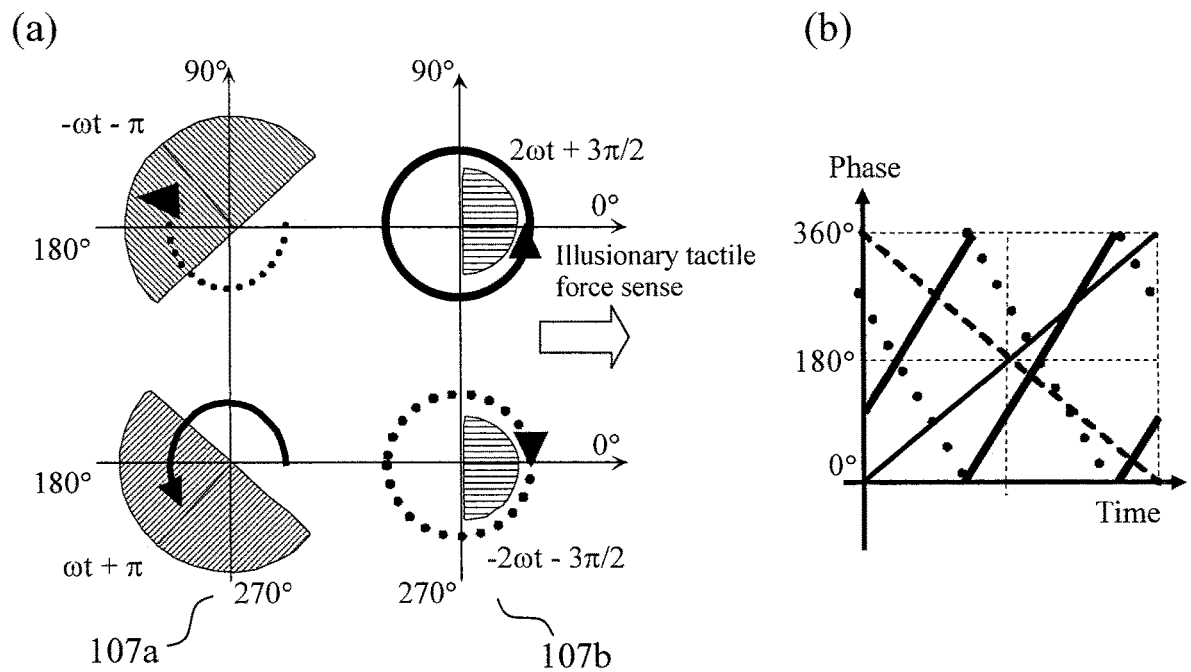
FIG. 33 is a diagram illustrating an illusionary tactile force sense device that uses a plurality of units including respective eccentric weights with different weights and a method for controlling the illusionary tactile force sense device.

FIG. 33 shows an illusionary tactile force sense device and control method which use a plurality of units each including eccentric weights with different weights. In FIG. 32(*d*), a plurality of the same eccentric weights are used. However, as shown in FIG. 33(*a*), the weight and shape of the eccentric weight may vary between the two sets. Moreover, illusionary tactile force sense control with high energy efficiency can be achieved by using the present scheme that uses two illusionary tactile force sense devices, for the above-described method.

Figure 34:
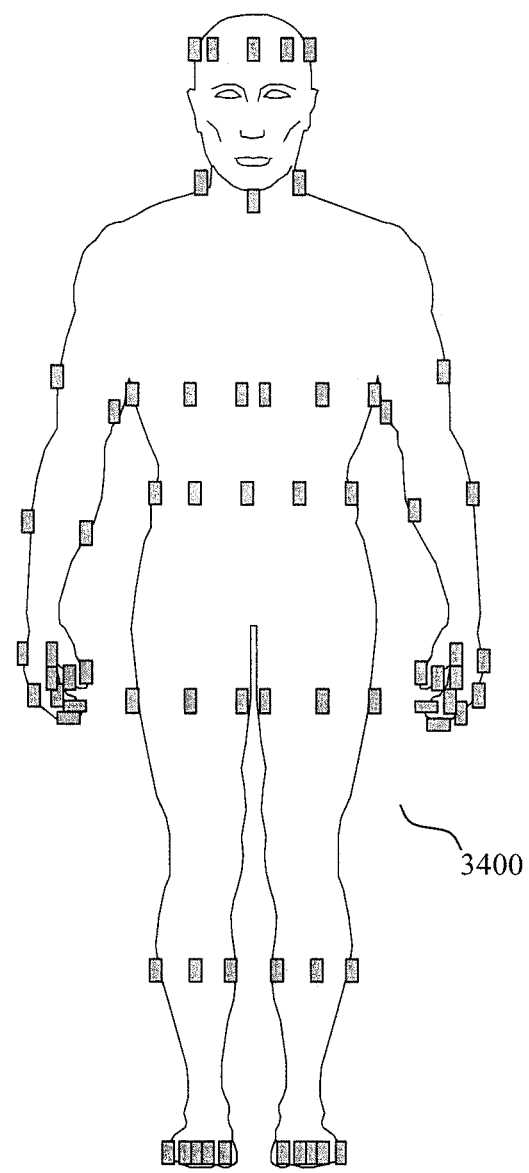
FIG. 34 is a diagram illustrating installation sites.

As shown in FIG. 34, the illusionary tactile force sense interface device 101 can be installed all over the user's body 3400 using the installation section such as the adhesion tape or the housing with the finger insertion section.

Embodiments

Figure 35:
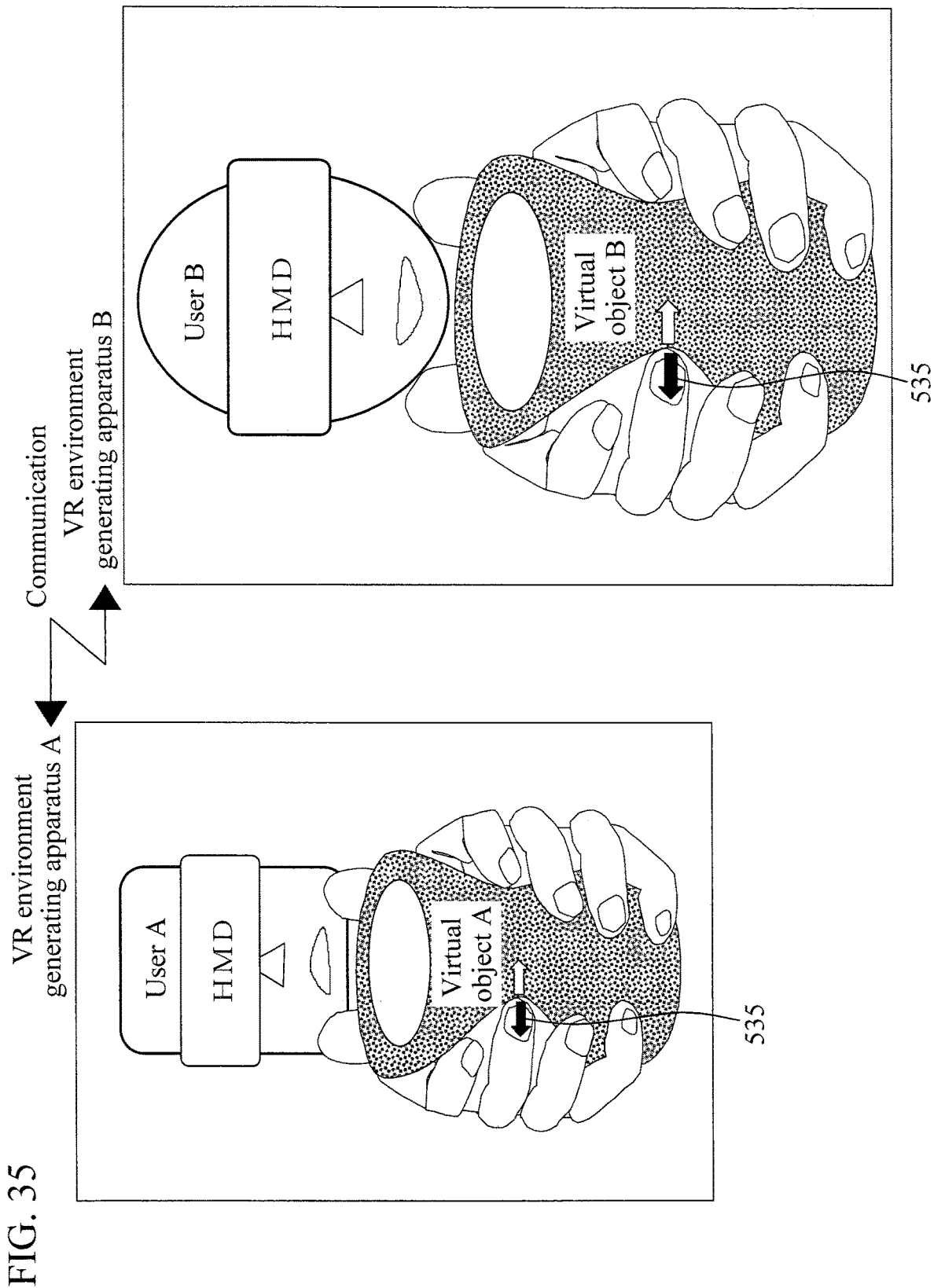
FIG. 35 is a diagram illustrating an embodiment that uses the virtual reality environment generating apparatus.

FIG. 35 shows an embodiment which uses virtual reality environment generating apparatuses and in which a plurality of users at remote locations cooperate in virtual ceramic art.

After all the devices in VR environment generating apparatuses A and B are calibrated, communication is enabled between the VR environment generating apparatuses. The users are present in different spaces corresponding to the respective VR environment generating apparatuses. Information on the two VR environments is shared by both VR environment generating apparatuses via communication devices.

Sensing by the sensors will be described below with reference to FIG. 1.

As data of content data, initial model information (the position Po of the vertex of a model) on a virtual clay mass is read from the content data 104.

Then, the plurality of position sensors 111 and acceleration sensors 108 measure an information vector group Mu' (position Xu', posture Pu', velocity Vu', angular velocity Ru', acceleration Au', and angular acceleration Tu') on each site of the user's body. Here, the position sensors used can also measure posture information. The velocity, angular velocity, acceleration, and angular acceleration are determined by the differentiation and second-order derivative of the position information. For quicker motions, information from the acceleration sensors is used. Furthermore, the physical simulator 113 provides a memory space in which the following are stored, in the content creating device 102: a group of information vectors Mo (position Xo, velocity Vo, acceleration Ao, and force Fo applied to each vertex) relating to the vertex of a physical model of virtual clay, a group of virtual force vectors Fuo applied to the vertex by the user, sound source data, a group of information vectors Mu (position Xu, posture Pu, velocity Vu, angular velocity Ru, acceleration Au, and angular acceleration Tu) relating to a user model (virtual user), and a group of virtual force vectors Fou applied to the virtual user by the vertex of the virtual clay. Based on the constantly updated information vector groups in the memory space, physical simulation of the virtual clay, which is a content, and the virtual user is repeated to allow the information in the memory space to be updated.

The physical simulation will be described below with reference to the model shown in FIG. 5.

The physical simulator expresses the virtual clay using a spring and damper model shown in FIG. 5(*b*) and calculates and updates the information vector groups Mu and Mo. Based on the posture Put of the virtual user's first measurement point p1 (for example, the fingertip) and a virtual force vector Foul applied to the finger, the direction vector of a force to be presented by the illusionary tactile force sense interface is determined by:

$$u1=Fou1/\|Fou1\|-Pu1$$

Similar calculations are carried out on the other measurement points pi.

Figure 12:
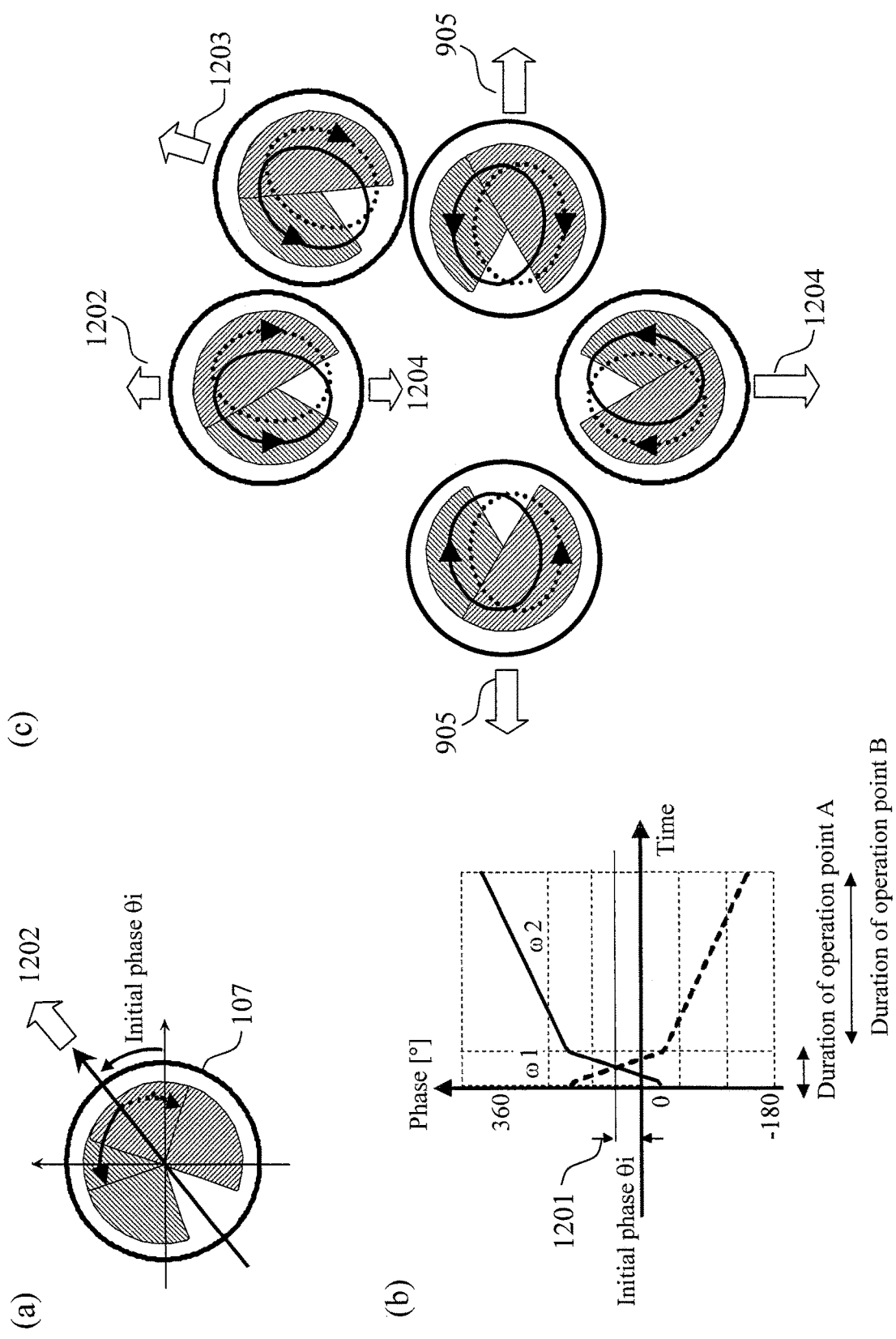
FIG. 12 is a diagram illustrating the direction of an illusionary tactile force sense based on the initial phase of a phase pattern.

As shown in FIG. 12, the initial phase θi is determined using the relationship u=(cos θi, sin θi, 0) between the initial phase θi and the direction vector (u) that presents force. The initial phase lag θd is set to −90°, at which the maximum sensory intensity is obtained. The initial phase lag θd may be adjusted in accordance with the dynamic range of the sensory intensity to be provided.

In the above description, a set of illusionary tactile force sense devices is used to preset a force in any direction in the cross section of the finger. This method may be expanded such that three sets of illusionary tactile force sense devices are used to present a force in any of all the directions.

Figure 17:
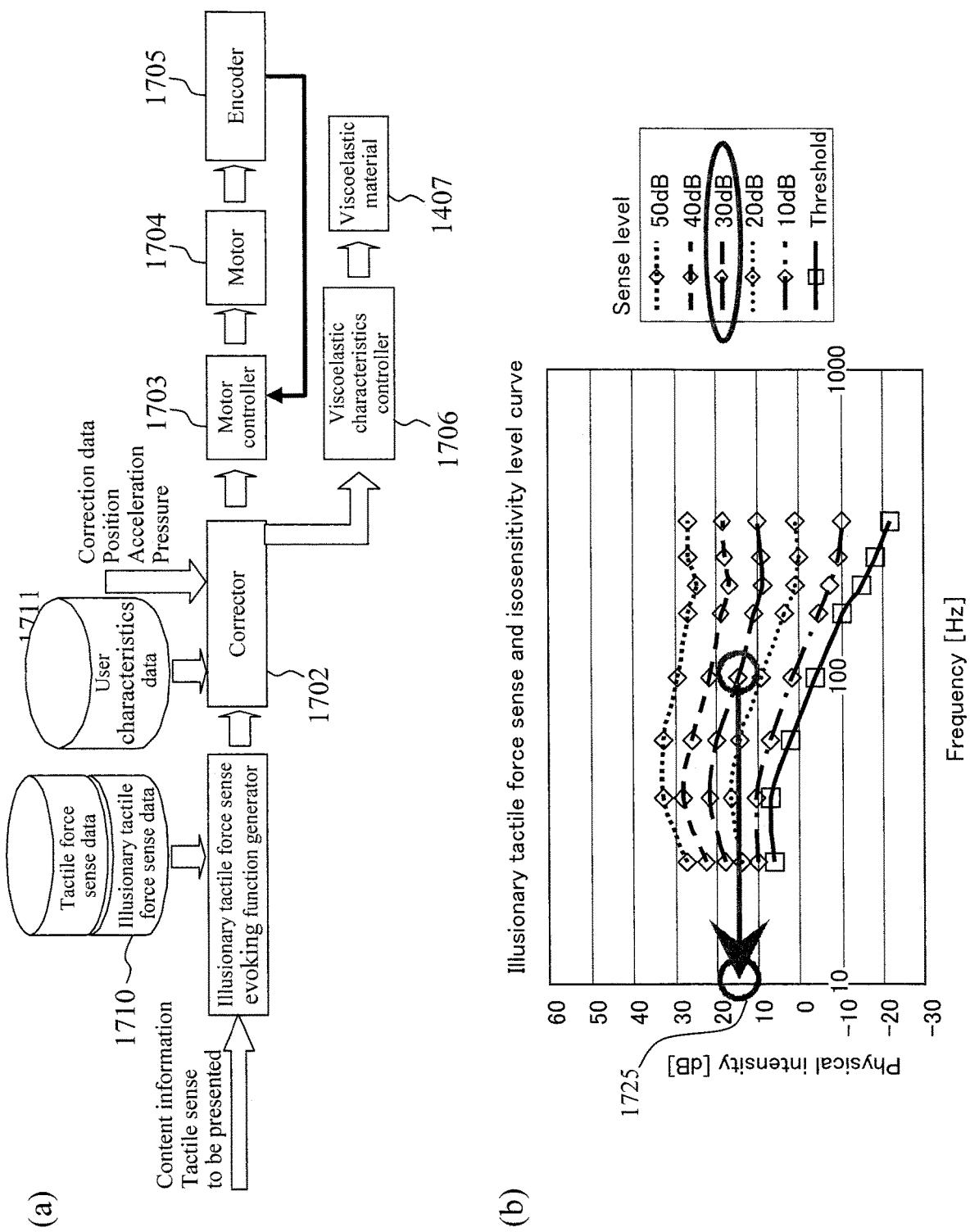
FIG. 17 is a diagram showing an example of a control system for the illusionary tactile force sense interface device 101.

As a physical intensity to be presented, the physical intensity corresponding to the illusionary tactile force sense intensity II to be presented is referenced using a table of figures indicating the equal-sensory-level contour of the illusionary tactile force sense in FIG. 17(*b*). The physical quantity Δf/f is determined based on a characteristic graph of the illusionary tactile force sense intensity in FIG. 10(*e*). In connection with the texture, as the vibration sense intensity VI, which is indicative of the sense of roughness 1111 in FIG. 11(*c*), the physical quantity f is determined based on a characteristic graph of the vibration sense intensity in FIG. 10(*f*). The angular velocities ω1 and ω2 are determined based on the physical quantities Δf/f and f. To determine values based on the above-described characteristic curves, an interpolation function such as a spline function is used. The angular velocities ω1 and ω2 are determined as follows.

$$\omega1=2\pi f1, \omega2=2\pi f2, \text{ where } f1=f+\Delta f/2 \text{ and } f2=f-\Delta f/2.$$

The phase pattern θ(t) is expressed using the initial phase θi and the angular velocities ω1 and ω2, as shown in FIG. 12(b).

For the response characteristics R of the motor, the P, I, and D parameters are selectively set so as to prevent possible vibration caused by overshooting, thus offering excellent convergence responses. The control method based on the P, I, and D parameters is a servo motor control method commonly utilized by those skilled in the art. The P, I, and D parameters are selectively set in accordance with a selection method provided by the motor maker. If the vibration sense intensity VI, which is indicative of the sense of roughness 1111, is to be emphasized, then, the motor FB characteristics controller sets the parameters in a feedback manner so as to increase the P and D parameters to cause vibration with the acceleration sensor monitoring.

As described above, the phase pattern θ(t) is determined to be f(t)=F(u, II, VI, R) using the illusionary tactile force sense evoking function F.

If the resolution of motor control is set to 1.8°, the above-described phase pattern is used to divide a phase of 360° on the axis of ordinate into 200 pieces each with a phase of 1.8°. Then, the points in time on the axis of abscissa corresponding to the 200 points are determined. The points in time correspond to timings when a control pulse train is generated. As described above, the control pulse train g(t) is determined based on the phase pattern θ(t).

A modified damper model and the spring and damper model in FIG. 5(b) differ in that the model in FIG. 5(b) is composed only of a surface and is thus hollow, whereas the modified model is a solid one corresponding to a structure spring and a shear spring.

Another difference is that the length $L_0$ of the spring in a balanced state in FIG. 5(b) does not have a fixed value and that in the physical simulation calculations, the length of the spring in the balanced state is updated every time Δt based on the corresponding distance between the grid points. However, if this process is repeated many times and the model is complicatedly folded and transformed like clay, the length of the spring increases infinitely. Thus, every time transformation occurs, the grid point division performed at the time of modeling is carried out again so as to keep the length of the spring to increase equal.

If a grid point 1 is connected to grid points 2 to 4, a force vector f12 applied to the grid point 1 from the grid point 2 is expressed by:

$$f12=-k\times(\|p2-p1\|-L12)\times(p2-p1)/\|p2-p1\|-c\times(v2-v1) \quad (9)$$

where
pi: position vector of a grid point pi,
vi: velocity vector of the grip point pi,
k: elastic coefficient of the spring,
c: viscosity coefficient of the damper, and
Lij: natural length of the spring between grid points (i) and (j).

When the resultant force of forces applied to the grid point 1 with a mass m1 by the surrounding grid points 2 to 4 is defined as f1, the equation of motion for the grid point 1 is expressed by:

$$m1\times d^2p1/dt^2=f1=f12+f13+f14 \quad (10)$$

When the fingertip with the illusionary tactile force sense interface device installed thereon touches the grid point 1 (p1) of the virtual-object physical model, the grip point 1 (p1) changes to the position 1 (p'1) of the fingertip. The reaction force (−f) applied to the fingertip is expressed by:

$$-f=(f12+f13+f14)-m1\times d^2p'1/dt^2 \quad (11).$$

The motion of the finger, based on which whether or not the finger has touched the model is determined, is sensed by the position sensor and the acceleration sensor.

In actual numerical simulation, the position p'1, velocity v'1, and force f'1 of the grid point 1 at a point in time t' is determined from variables p1, v1, and f1 at the preceding point in time t. That is, the following hold true.

$$\text{Velocity vector:} v'1=v1+(f1/m1)\Delta\times t \quad (12)$$

$$\text{Position vector:} p'1=p1+v1\times\Delta t \quad (13)$$

The position and velocity of the grid pint 2 with a mass m2 are similarly calculated.

$$\text{Velocity vector:} v'2=v2+(f2/m2)\times\Delta t \quad (14)$$

$$\text{Position vector:} p'2=p2+v2\times\Delta t \quad (15)$$

Finally, unlike in the case of FIG. 5(B), a force acting between the grid points 1 and 2 is calculated as follows.

$$f'12=0 \quad (16)$$

The above-described physical simulation allows a force applied to the virtual clay by the virtual user's fingertip to be calculated. Thus, the virtual clay is transformed. Furthermore, a force applied to the virtual user's fingertip by the virtual clay is calculated. Based on the results of calculation of the stress, in the presentation, the illusionary tactile force sense interface device is controlled by the illusionary tactile force sense evoking device and the illusionary tactile force sense device driving control device. Hence, the user (entity) experiences the feel of the virtual clay in accordance with three-dimensional videos and sound images on the audio-visual display. The user transforms the virtual clay while checking the shape of the virtual object based on the feel. The user thus completes a virtual flower base. At this time, if virtual objects A and B are identical on the VR space, the users cooperate in completing the virtual flower base.

Real objects may be used instead of the virtual objects A and B. A peripheral device takes videos of the objects and measures the shapes thereof. The videos and measurement results are shared by the VR environment generating apparatuses A and B via the communication instruments as data. If a real object is used instead of the virtual object A, the user B shares the user A's experience in ceramic art.

In every calculation, the position, velocity, and force of each grid point are calculated and saved to the memory. The saved values are used to calculate the position, velocity, and force at the succeeding point in time. The above-described operations allow the reaction force to the fingertip to be presented, enabling the haptization of the virtual object to be realized.

As in the case with the above-described physical simulation of the virtual objects, both the real object in the real space and the user are modeled in the same VR environment based on motion information on the real object sensed by the peripheral device and the motion information on the user sensed by the position sensor and the acceleration sensor. The contact and grip force exerted on the content are calculated. Thus, a VR space is created into which the virtual space and the real space are merged.

A virtual controller shown in FIG. 31 can also be implemented in the same manner as that for the virtual ceramic art.

The present apparatus is expected to be applied to various fields other than that of virtual reality.

In the information presentation and expression based on the virtual reality technique, users who are unsusceptible to motion sickness in a real vehicle may get motion sickness with the simulator. Furthermore, not a few users fail to feel a sense of three-dimensionality in stereoscopic virtual reality. Even with the same virtual reality, the feel of the reality varies among users. In addition, in connection with physical differences such as the hand size and muscle strength, differences among interfaces in weight and shape, and the level at which the user has learned how to handle the interface, the easiness with which the user has phantom sensation by the virtual reality technique, that is, the way in which the user feels, varies greatly depending on age and sex and among individual users. Hence, the effects of learning and correction vary depending on the application.

When the present apparatus is applied to an information terminal such as a cellular phone or a PDA, the amount of tactile force sense information, the easiness of understanding the information, and manipulability are improved by adapting the apparatus for individual characteristics.

For example, if the present apparatus is used instead of a manner mode vibrator, then compared to the conventional vibration with no directional information, the illusionary tactile force sense allows efficient presentation of a traveling direction for navigation and alarms that are likely to be overlooked by the user.

If the illusionary tactile force sense device and tactile force sense device are built into an information terminal, the intensity and feel of the tactile force sense vary depending on the relative relationship between both the weight and size of the terminal and both the hand size and muscle strength. Furthermore, with the non-base type, held in the hand and shaken, the same tactile force sense information presented may be felt differently owing to an inertia force resulting from a mass and inertia moment. Thus, the correction function of the present apparatus is effective for allowing the tactile force sense information to be properly presented.

When the present apparatus is utilized for a cellular phone game that uses a motion sensor, a force output against to a force input is effectively obtained. This improves interactivity and reality, thus enhancing intuitive manipulability. When the present apparatus is utilized for a touch pen (stylus) or a tablet PC, a sense of click is improved which is felt when an icon is clicked with the finger or a touch pen. Furthermore, windows overlapping in the display can be differentiated from one another by applying different frictional resistances to the respective windows. This improves usability for visually impaired users.

Additionally, when the present apparatus is applied to training apparatuses such as surgery simulators, the simulator can be adjusted in accordance with the user's individual characteristics and learning level. Moreover, information such as characteristic points to be learned and points that are likely to be overlooked can be emphatically expressed in terms of the force sense. Thus, manipulability, the easiness of understanding the information, and learning effects are improved.

Since the present invention involves emphasis based on illusions, it is necessary to emphasize and correct the information based on the user's sensory characteristics instead of simply increasing the physical quantity or contrast as in the case of the presentation of force sense information. Furthermore, in order to express the diversity of operation tools as well as different sets of tools for beginners and experts, corrections are performed in accordance with a sense of reality, which varies depending on the use frequency and learning level, as well as the easiness with which the user has phantom sensation by the virtual reality technique.

The invention claimed is:

1. An information processing method comprising:
evoking an illusionary tactile three sensation based on at least one of an acceleration pattern, a control pattern, physical quantity pattern, or a control algorithm, each of which being a change in a physical quantity generated by driving data comprising information representing the physical quantity;
wherein:
the illusionary tactile force sensation is evoked by the change of the physical quantity,
wherein sensation of forces that is different from forces generated by the changes presented is generated using illusion with a nonlinear sensory characteristic,
the sensation of forces is generated by an illusionary tactile force sense interface device including at least one actuator that temporally varies momentum of the actuator,
the driving data comprising information representing the physical quantity is obtained from the illusionary tactile force sense interface device itself, and in synchronization with a mechanism within the illusionary tactile force sense interface device changing a shape of the illusionary tactile force sense interface device,
the illusionary tactile force sense interface device presents sensation of force in a first direction that is opposite to a second direction of an intermittent force included in the evoked illusionary tactile force sensation,
the presenting the sensation of force in the first direction includes presenting a shape, a sense of friction and a sense of roughness of a virtual object, and
the sensation of force in the first direction is continuously presented at higher acceleration than acceleration of the sensation of force in the second direction.

2. The information processing method according to claim 1, wherein the evoked illusionary tactile force sensation has a nonlinear sensory characteristic in a relationship between the physical quantity and the sensory characteristic.

3. The information processing method according to claim 1, wherein the evoked sensation includes at least one of a tactile force sense, an illusionary tactile force sensation, an auditory sense, a sound image, or a video.

4. The information processing method according to claim 1, wherein the physical quantity includes at least one of an amplitude, displacement, velocity, acceleration, force, torque, momentum, stimulus, vibration, rotation, pressure, voltage, sound, sound image, video, angle, manipulation information, or an amount of change thereof.

5. The information processing method according to claim 1, wherein the evoking of the illusionary tactile force sensation is obtained based on at least one of a plurality of different operation points, a plurality of different durations, or a plurality of different frequencies on the nonlinear characteristic.

6. The information processing method according to claim 1, wherein the evoked illusionary tactile force sensation presents at least one of a sense of force, a sense of torque, an illusionary sense of force, or an illusionary sense of torque by using a nonlinear characteristic, even when an integral of physical quantities is zero.

7. The information processing method according to claim 1, wherein the evoked illusionary tactile force sensation has a non-zero sensory quantity by using a nonlinear characteristic, even when an integral of physical quantities is zero.

8. The information processing method according to claim 1, wherein the evoked illusionary tactile force sensation presents at least one of a sensation or an illusion that is different from a physically applied physical quantity, force, or motion, and that does not exist physically.

9. The information processing method according to claim 1, wherein the evoked illusionary tactile force sensation presents at least one of a sensation of force or a sensation of a motion that is different from a physically applied force or motion, and that does not exist physically.

10. The information processing method according to claim 1, wherein the evoked illusionary tactile force sensation controls at least one of resistance, friction, or a sensation based on the illusionary tactile force sensation in accordance with at least one of a motion of a finger or a body.

11. The information processing method according to claim 1, wherein the nonlinear sensory characteristic includes a plurality of different operation points including a first operation point and a second operation point.

12. The information processing method according to claim 1, wherein the evoking is generated or controlled based on an illusionary tactile force sense evoking function.

13. The information processing method according to claim 1, wherein:
the evoked illusionary tactile force sensation causes a physical reaction via an object, and
the object includes at least one of an illusionary tactile force sense device, a tactile force sense device, a real object, a display member, or a virtual object.

14. The information processing method according to claim 1, wherein the at least one of the acceleration pattern, the control pattern, the physical quantity pattern, or the control algorithm is created or controlled based on an illusionary tactile force sense evoking function that evokes an illusionary tactile force sensation.

15. The information processing method according to claim 1, wherein the at least one of the acceleration pattern, the control pattern, the physical quantity pattern, or the control algorithm changes at least one of vibration, force, voltage, electricity, sound, sound image, video, or momentum.

16. The information processing method according to claim 1, wherein the control algorithm is created or controlled based on at least one of a viscoelastic material property, a hysteresis material property, an oscillation circuit property, a stress property, or property of a material having a nonlinear shear property.

17. The information processing method according to claim 1, wherein the at least one of the acceleration pattern, the control pattern, the physical quantity pattern, or the control algorithm is stored in a memory mounted in an illusionary tactile force sense interface device, and is read from the memory by a drive of a CPU.

18. The information processing method according to claim 1,
wherein:
the data includes content data, and
an illusionary tactile force sense evoking function is created based on the content data related to an illusionary tactile force sensation or a tactile force sensation.

19. The information processing method according to claim 1, wherein the at least one of the acceleration pattern, the control pattern, or the physical quantity pattern are created or controlled based on at least one of an elastic material property, a spring property, a capacitor property, a coil property, a resistor property, a viscoelastic material property, an oscillation circuit property, a stress property, or a shear property.

20. The information processing method according to claim 1, wherein the control algorithm creates or controls the at least one of the acceleration pattern, the control pattern, or the physical quantity pattern based on at least one of an elastic material property, a spring property, a coil property, a resistor property, a capacitor property, a viscoelastic material property, an oscillation circuit, a stress property, or a shear property.

21. The information processing method according to claim 1, wherein the evoked sensation is obtained by a change of at least one of a shape, an arrangement, a position, a direction, a phase, or a place of at least one of an illusionary tactile force sense interface device, a tactile force sense interface device, an illusionary tactile force sense device, a tactile force sense device, a real object, a display member, or a virtual object.

22. The information processing method according to claim 1, wherein the data is obtained by a communication.

23. The information processing method according to claim 1, wherein a sensation of a real object is added to a sensation presented by the illusionary tactile force sensation.

24. The information processing method according to claim 1,
wherein:
the data is fed back, and
a motor, or an actuator, or a device, or an interface that presents illusionary tactile force sense information is controlled or driven based on the fed-back data.

25. The information processing method according to claim 1, wherein the sensation of forces comprises at least one of forces or components of motion that do not exist physically.

26. The information processing method according to claim 1, wherein the sensation of forces is generated without a force component that acts in a fixed direction.

27. A sense presenting method comprising:
evoking an illusionary tactile force sensation based on at least one of an acceleration pattern, a control pattern, a physical quantity pattern, or a control algorithm, each of which being a change in a physical quantity generated by driving data comprising information representing the physical quantity,
wherein:
the illusionary tactile force sensation is evoked by the physical quantity,
wherein sensation of forces that is different from forces generated by the changes presented is generated using illusion with a nonlinear sensory characteristic,
the sensation of forces is generated by an illusionary tactile force sense interface device including at least one actuator that temporally varies momentum of the actuator,
the driving data comprising information representing the physical quantity is obtained from the illusionary tactile force sense interface device itself, and in synchronization with a mechanism within the illusionary tactile force sense interface device changing a shape of the illusionary tactile force sense interface device,
the illusionary tactile force sense interface device presents sensation of force in a first direction that is opposite to a second direction of an intermittent force included in the evoked illusionary tactile force sensation, the presenting the sensation of force in the first direction includes presenting a shape, a sense of friction and a sense of roughness of a virtual object, and the sensation of force in the first direction is continuously presented at higher acceleration than acceleration of the sensation of force in the second direction.

28. The sense presenting method according to claim 27, wherein the evoked illusionary tactile force sensation has a nonlinear sensory characteristic in a relationship between the physical quantity and the sensory characteristic.

29. The sense presenting method according to claim 27, wherein the evoked sensation includes at least one of a tactile force sense, an illusionary tactile force sensation, an auditory sense, a sound image, or a video.

30. The sense presenting method according to claim 27, wherein the physical quantity includes at least one of an amplitude, displacement, velocity, acceleration, force, torque, momentum, stimulus, vibration, rotation, pressure, sound, sound image, video, voltage, angle, manipulation information, or an amount of change thereof.

31. The sense presenting method according to claim 27, wherein the evoking of the illusionary tactile force sensation is obtained based on at least one of a plurality of operation points, a plurality of durations, or a plurality of frequencies on the nonlinear characteristic.

32. The sense presenting method according to claim 27, wherein the evoked illusionary tactile force sensation presents at least one of a sense of force or a sense of torque by using a nonlinear characteristic, even when an integral of physical quantities is zero.

33. The sense presenting method according to claim 27, wherein the evoked illusionary tactile force sensation has a non-zero sensory quantity by using a nonlinear characteristic, even when an integral of physical quantities is zero.

34. The sense presenting method according to claim 27, wherein the evoked illusionary tactile force sensation presents at least one of a sensation or an illusion that is different from a physically applied physical quantity, force, or motion, and that does not exist physically.

35. The sense presenting method according to claim 27, wherein the evoked illusionary tactile force sensation presents at least one of a sensation of force or a sensation of a motion that is different from a physically applied force or motion, and that does not exist physically.

36. The sense presenting method according to claim 27, wherein the evoked illusionary tactile force sensation controls at least one of resistance, friction, or a sensation based on the illusionary tactile force sensation in accordance with a motion of a finger or a body.

37. The sense presenting method according to claim 27, wherein the nonlinear sensory characteristic includes a plurality of different operation points including a first operation point and a second operation point.

38. The sense presenting method according to claim 27, wherein the evoking is generated or controlled based on an illusionary tactile force sense evoking function.

39. The sense presenting method according to claim 27, wherein:
the evoked illusionary tactile force sensation causes a physical reaction via an object, and
the object includes at least one of an illusionary tactile force sense device, a tactile force sense device, a real object, a display member, or a virtual object.

40. The sense presenting method according to claim 27, wherein the at least one of the acceleration pattern, the control pattern, the physical quantity pattern, or the control algorithm are created or controlled based on an illusionary tactile force sense evoking function that evokes an illusionary tactile force sensation.

41. The sense presenting method according to claim 27, wherein the at least one of the acceleration pattern, the control pattern, the physical quantity pattern, or the control algorithm changes at least one of vibration, force, voltage, electricity, sound, sound image, video, or momentum.

42. The sense presenting method according to claim 27, wherein the control algorithm is created or controlled based on at least one of a viscoelastic material property, a hysteresis material property, an oscillation circuit property, a stress property in response to an applied force, or property of a material having a nonlinear shear property.

43. The sense presenting method according to claim 27, wherein the at least one of the acceleration pattern, the control pattern, the physical quantity pattern, or the control algorithm are stored in a memory mounted in the illusionary tactile force sense interface device, and is read from the memory by a drive of a CPU.

44. The sense presenting method according to claim 27, wherein the data includes content data, and an illusionary tactile force sense evoking function is created based on the content data related to an illusionary tactile force sensation or a tactile force sense.

45. The sense presenting method according to claim 27, wherein the at least one of the acceleration pattern, the control pattern, or the physical quantity pattern are created or controlled based on at least one of an elastic material property, a spring property, a capacitor property, a coil property, a resistor property, a viscoelastic material property, an oscillation circuit property, a stress property, or a shear property.

46. The sense presenting method according to claim 27, wherein the control algorithm creates or controls the at least one of the acceleration pattern, the control pattern, or the physical quantity pattern based on at least one of an elastic material property, a spring property, a coil property, a resistor property, a capacitor property, a viscoelastic material property, an oscillation circuit, a stress property, or a shear property.

47. The sense presenting method according to claim 27, wherein the evoked sensation is obtained by a change of at least one of a shape, an arrangement, a position, a direction, a phase, a place of an illusionary tactile force sense interface device, a tactile force sense interface device, an illusionary tactile force sense device, a tactile force sense device, a real object, a display member, or a virtual object.

48. The sense presenting method according to claim 27, wherein the data is obtained by a communication.

49. The sense presenting method according to claim 27, wherein a sensation of a real object is added to a sensation presented by the illusionary tactile force sensation.

50. The sense presenting method according to claim 27, wherein:
the data is fed back, and
a motor, or an actuator, or a device, or an interface that presents illusionary tactile force sense information is controlled or driven based on the fed-back data.

51. The sense presenting method according to claim 27, wherein the sensation of forces comprises at least one of forces or components of motion that do not exist physically.

52. The sense presenting method according to claim 27, wherein the sensation of forces is generated without a force component that acts in a fixed direction.

* * * * *